(12) United States Patent
Nakamura et al.

(10) Patent No.: US 7,660,756 B2
(45) Date of Patent: Feb. 9, 2010

(54) CLIENT TERMINAL DEVICE, STORAGE MEDIUM PRODUCT, BANK SERVER APPARATUS, INFORMATION TRANSMITTING METHOD, INFORMATION TRANSMITTING PROGRAM, AND INFORMATION TRANSMITTING/RECEIVING PROGRAM

(75) Inventors: Yoshiyuki Nakamura, Kanagawa (JP); Tetsuya Anno, Kanagawa (JP)

(73) Assignee: Sony Corporation, Tokyo (JP)

( * ) Notice: Subject to any disclaimer, the term of this patent is extended or adjusted under 35 U.S.C. 154(b) by 1329 days.

(21) Appl. No.: 10/140,907

(22) Filed: May 8, 2002

(65) Prior Publication Data
US 2002/0188565 A1 Dec. 12, 2002

(30) Foreign Application Priority Data

| May 9, 2001 | (JP) | ............................. 2001-139013 |
| May 9, 2001 | (JP) | ............................. 2001-139014 |
| May 9, 2001 | (JP) | ............................. 2001-139015 |
| May 9, 2001 | (JP) | ............................. 2001-139016 |

(51) Int. Cl.
*G06Q 40/00* (2006.01)
(52) U.S. Cl. .................. 705/35; 715/795; 715/741; 726/5; 710/5
(58) Field of Classification Search .................. 705/35; 710/5; 715/41, 95; 726/5
See application file for complete search history.

(56) References Cited

U.S. PATENT DOCUMENTS

| 6,076,167 | A | * | 6/2000 | Borza | .............................. 726/5 |
| 6,173,339 | B1 | * | 1/2001 | Yorimitsu | ....................... 710/5 |
| 6,600,500 | B1 | * | 7/2003 | Yamamoto | ................... 715/795 |
| 6,812,938 | B2 | * | 11/2004 | Pinnell | ........................ 715/741 |

* cited by examiner

*Primary Examiner*—Frantzy Poinvil
*Assistant Examiner*—Samica L Norman
(74) *Attorney, Agent, or Firm*—Finnegan, Henderson, Farabow, Garrett & Dunner, L.L.P.

(57) ABSTRACT

The invention provides an Internet banking system which can present services more familiar to daily life of individual users, and a bank server apparatus, etc. which can limit available banking services depending on user attributes. From the viewpoint of security, the invention reduces risks of information leak from a client terminal device to third persons and unauthorized accesses from third persons. Banking software for connection to the bank server apparatus is installed in the client terminal device. The banking software can display a screen transfer, etc. in the off-line condition. The banking software prepares transaction instruction data from information entered by the user on the displayed screen and temporarily holds it in the client terminal device. When the client terminal device is connected to the bank server apparatus, the held data is uploaded to the bank server apparatus. In the client terminal device, application software can be utilized in linkage with the banking software so as to display the contents of an electronic bankbook. As examples of the application software, household account-book software, petty cashbook software, etc. can be provided to users.

13 Claims, 35 Drawing Sheets

FIG. 16

| USER ID | DATE OF BIRTH | AGE |
|---|---|---|
| 1234 | ○×△ | 29 |
| 5665 | □□□ | 42 |
| 3356 | ▽×○ | 15 |

156 = USER ID, 157 = DATE OF BIRTH, 158 = AGE, 155

FIG. 17

| AGE | ORDINARY DEPOSIT | FIXED DEPOSIT | TRANSFER | INVESTMENT FUND |
|---|---|---|---|---|
| 6 – 11 | ○ | × | × | × |
| 12 – 14 | ○ | ○ | × | × |
| 15 – 17 | ○ | ○ | ○ | × |
| 18 – | ○ | ○ | ○ | ○ |

ORDINARY DEPOSIT
- ACCOUNT BALANCE /
  SPECIFICS OF INCOME/OUTGO

LOG-OUT

6 - 11 AGES

FIG. 19

ORDINARY DEPOSIT
- ACCOUNT BALANCE /
  SPECIFICS OF INCOME/OUTGO

FIXED DEPOSIT
- OPEN FIXED DEPOSIT ACCOUNT
- CLOSE FIXED DEPOSIT ACCOUNT
- SPECIFICS OF FIXED DEPOSIT

LOG-OUT

12 - 14 AGES

FIG. 20

- ORDINARY DEPOSIT
  - ACCOUNT BALANCE / SPECIFICS OF INCOME/OUTGO
- FIXED DEPOSIT
  - OPEN FIXED DEPOSIT ACCOUNT
  - CLOSE FIXED DEPOSIT ACCOUNT
  - SPECIFICS OF FIXED DEPOSIT
- TRANSFER
  - TRANSFER
  - TRANSFER RECORDS
  - CANCEL TRANSFER PREENGAGEMENT

LOG-OUT

15 - 17 AGES

FIG. 21

- ORDINARY DEPOSIT
  - ACCOUNT BALANCE / SPECIFICS OF INCOME/OUTGO
- FIXED DEPOSIT
  - OPEN FIXED DEPOSIT ACCOUNT
  - CLOSE FIXED DEPOSIT ACCOUNT
  - SPECIFICS OF FIXED DEPOSIT
- INVESTMENT FUND
  - PURCHASE OF INVESTMENT FUND
  - SELLING OF INVESTMENT FUND
  - PURCHASE/SELLING RECORDS
  - SPECIFICS OF TRUSTED INVESTMENT FUND
- TRANSFER
  - TRANSFER
  - TRANSFER RECORDS
  - CANCEL TRANSFER PREENGAGEMENT

LOG-OUT

18 AGE OR OVER

FIG. 31

INFORMATION OF PREVIOUS USAGE

- NAME      MR. TARO YAMANAKA       ■ ACCOUNT NO.  1234567
- OFFICE NO.  001

USAGE INFORMATION

PREVIOUS LOG-IN DATE/TIME  2001/3/7  23:58
  PC PREVIOUSLY USED  VBSC-3000 (IN COMPANY)

RECENT TRANSACTIONS

| TRANSACTION DATE | TRANSACTION ITEM | PC USED | CHANNEL USED |
|---|---|---|---|
| 2001/2/15 | TRANSFER | VBSC-3000 | WEB |
| 2001/2/20 | OPEN FIXED DEPOSIT ACCOUNT | SUNNY POWER PC | WEB |
| 2001/3/2 | CANCEL INVESTMENT FUND | SUNNY POWER PC | WEB |

*AUTOMATIC UPDATE AND AUTOMATIC DIRECT DEBIT ARE NOT INCLUDED. PREVIOUS TRANSACTION IS NOT YET COMPLETED BECAUSE OF SYSTEM ABNORMALITY. SEE TRANSACTION RECORDS.

INFORMATION REGARDING LOG-IN PASSWORD

SETTING DATE OF PREVIOUS LOG-IN PASSWORD  2000/9/15

MANY DAYS HAVE LAPSED FROM SETTING OF CURRENT LOG-IN PASSWORD. YOU ARE RECOMMENDED TO UPDATE LOG-IN PASSWORD AFTER ABOUT 30 DAYS FROM PREVIOUS SETTING FOR SAFER TRANSACTION.

IF YOU HAVE ANY QUESTIONS ON THIS PAGE,
PLEASE CONTACT THE FOLLOWING PHONE NUMBER.

BANK CALL CENTER   0120-*-**
  MAIL ADDRESS       BANK@******

[CONFIRAMATION AND END]

SCREEN FOR REGISTRATION OF PC USED

THIS SCREEN REGISTERS PC CURRENTLY USED.

- NAME        MR. TARO YAMANAKA
- OFFICE NO.  001         ■ ACCOUNT NO.  1234567

ENTER INFORMATION OF PC TO BE USED
FROM NOW, AND CLICK "REGISTER" BUTTON.

292

- PCS CURRENTLY REGISTERED
    FIRST PC   VBSC-3000 (IN COMPANY)
    SECOND PC  SUNNY POWER PC (AT HOME)

293

- PC TO BE REGISTERED NOW
    DETAILS OF REGISTRATION   | HC5002 (LIVING ROOM AT HOME) |
    (MAKER, MODEL, ETC.)

| CANCEL | | REGISTER |

294    295

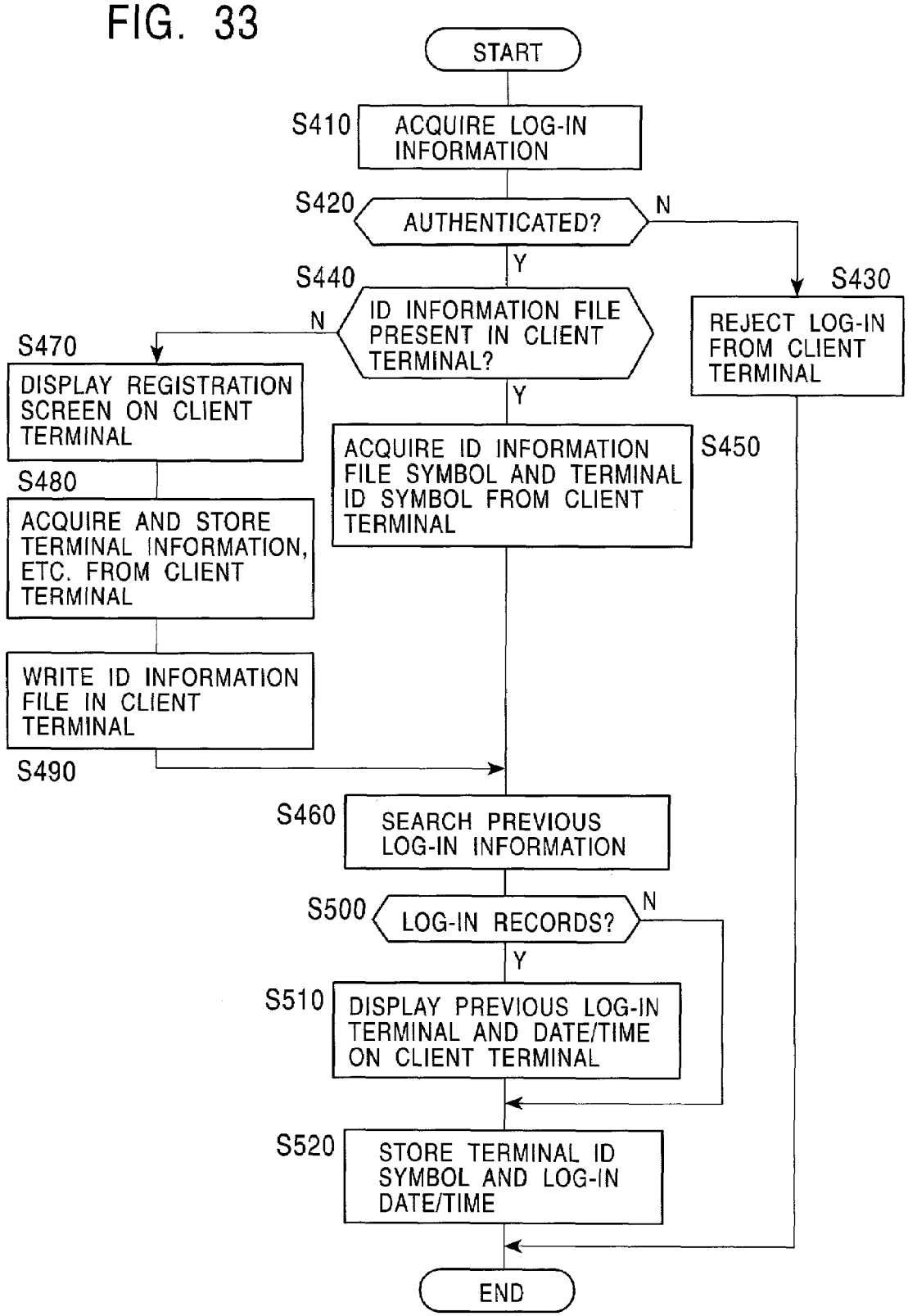

COMPLETION OF REGISTRATION AND RECEIPT OF
BANK ACCOUNT FOR TRANSFER

DETAILS OF BANK ACCOUNT FOR TRANSFER

■ REGISTRATION NO. 30 ← 356

■ NAME OF TRANSFEREE   FIRST BANK ← 357

■ BRANCH OFFICE NAME   SHINAGAWA ← 358

■ DEPOSIT TYPE   ORDINARY ← 359

■ ACCOUNT NO.   123456 ← 360

■ NAME OF RECEIVER   TARO TAKAHASHI ← 361

■ NAME OF TRANSFERER   KAZUO TANAKA ← 362

■ PHONE NUMBER   012-333-4567 ← 363

364 — | CONFIRMATION |

FIG. 36

COMPLETION OF REGISTRATION AND RECEIPT OF
BANK ACCOUNT FOR TRANFER
355

DETAILS OF BANK ACCOUNT FOR TRANFER

■ REGISTRATIO
371
■ NAME OF TR                              SHINAGAWA
BANK
■ DEPOSIT TYP     TIMEOUT OCCURRED.
                  WINDOW IS CLOSED, FOLLOWED
■ NAME OF RE      BY LOG-OUT.                123456
                  372        373
■ NAME OF TR    CONFIRMATION   CANCEL

■ PHONE NUMBER    012-333-4567

CONFIRMATION

CLIENT TERMINAL DEVICE, STORAGE MEDIUM PRODUCT, BANK SERVER APPARATUS, INFORMATION TRANSMITTING METHOD, INFORMATION TRANSMITTING PROGRAM, AND INFORMATION TRANSMITTING/RECEIVING PROGRAM

BACKGROUND OF THE INVENTION

1. Field of the Invention

The present invention relates to a bank system using the Internet.

2. Description of the Related Art

With recent rapid development of the Internet, it has become possible to make various commercial transactions on the Internet.

Utilization of the Internet has also progressed in banking transactions. Users are now able to, from personal computers (abbreviated to "PCs" hereinafter) at home, log in to bank server apparatuses (referred to as "bank servers" hereinafter) installed in banks for transferring money to another bank account, confirming the balance of a bank account, taking out a loan, opening a new bank account, and closing a bank account.

In such a case, each user first accesses to the bank server. Responsive to access, the bank server transmits log-in screen information to the user PC via the Internet. The user PC has a browser installed therein beforehand, and the browser displays, on the PC, a screen defined by the received screen data.

The user enters a log-in account and a password on the log-in screen displayed by the browser, whereupon the log-in account and the password are transmitted to the bank server. Then, the bank server authenticates the user's log-in.

Corresponding to data sent from the user PC, the bank server transmits information of screens, such as a transfer screen and a balance confirmation screen, to the user PC.

Looking at the displayed screen, the user is able to confirm the balance, for example. Also, the user can instruct the bank server to perform various transactions (various processes on a bank account) by entering necessary items on the transfer screen, etc. and sending them to the bank server.

When trading with banks through Internet banking, however, it has been conventional only to display screen data transmitted from the bank server on a client terminal device (referred to as a "client terminal" hereinafter) using a browser, or to transmit data entered by the user on a predetermined screen to the bank server. Thus, the user cannot prepare, in the off-line condition, data instructing transactions with the bank server.

Also, there has not been practiced application software, such as household account-book software, reflecting the contents of an electronic bankbook (deposit bankbook in the electronic form) that are updated upon transactions with the bank server.

Further, when accounts are opened in the same bank under the names of individual family members, for example, the accounts under the different names have been treated independently of each other. Therefore, even in such a trivial matter that the parent transfers some little money to an account under the child name, the same process as in the ordinary case of transferring money to another bank account has been required.

Accordingly, a first object of the present invention is to provide an Internet banking system which can present services more familiar to daily life of individual users.

Recently, Internet terminals have been installed in elementary and middle schools, and how to access the Internet has been educated to pupils. Thus, the skill for utilizing the Internet has been popularized as a capability generally required for living in society regardless of ages.

However, services provided from the bank server include one that should be avoided from allowing access from any unrestricted persons depending on attributes of accessing users, such as represented by a case of setting up a large amount of loan when the user is a pupil in an elementary school.

Accordingly, a second object of the present invention is to provide a bank server, etc. which can limit available banking services depending on user attributes.

By utilizing the Internet environment, a client is able to access the bank server from any of client terminals, i.e., PCs installed at home and in job site, as well as a portable terminal.

Although the user can access a bank account from a plurality of client terminals, information indicating at what time the previous log-in has been made from which one of the client terminals has not been presented in the past at the time of logging-in to the bank server from the user.

Therefore, it has been hard for the user to confirm the past access records, thus giving rise to a problem from the viewpoint of security.

In other words, there has been a problem that even if a third person fraudulently access a user's bank account from any of terminals belonging to the user, the user is hardly aware of the unauthorized access.

Accordingly, a third object of the present invention is to reduce risks of information leak from a client terminal to third persons and unauthorized accesses from third persons when servicing bank business via the Internet.

From the viewpoint of security, user accessibility to the bank server from many desired places increases opportunities that entry items inputted by a user from the client terminal are exposed to the eyes of third persons.

Various items of information to be kept secret from third persons, such as the log-in account, the user's bank account number, the bank account number to which money is transferred, and the amount of money transferred, are displayed on the client terminal. Therefore, a possibility that information is leaked to third persons is increased in comparison with a conventional case of dealing with the bank account from a bank office, ATM, etc.

Also, when a user moves away from an operating place while keeping a client terminal logged-in to a bank server, there is a possibility that any third person fraudulently accesses the bank server after the user has left the operating place.

Further, in some of conventional bank servers, line connection is forcibly cut off if a certain period of time lapses from the start of displaying a screen on the client terminal. In such a server, however, the certain period of time is fixedly set for all various kinds of screens such as a log-in screen and a transaction screen. Further, in spite of the server forcibly logging out the client terminal and cutting off the line connection, a screen image remains displayed on the client terminal.

Screens to be displayed on the client terminal include various forms ranging, for example, from a log-in screen that is preferably erased in the shortest possible time after entry of necessary items has been completed in time as short as possible, to a transfer screen that has many entry items such as the name of the transferee bank, the bank account number to which money is transferred, and the amount of money transferred, and hence requires a long display time to be set.

However, setting of the display time depending on the kinds of screens has not been made in the past.

Accordingly, a fourth object of the present invention is to enable a timeout period to be set for each screen and to further reduce risks of information leak to third persons and unauthorized accesses from third persons.

SUMMARY OF THE INVENTION

To achieve the above objects, according to one aspect of the present invention, there is provided a client terminal device connected to a bank server apparatus, the client terminal device comprising a unit for creating information transmitted to the bank server apparatus when the client terminal device is not connected to the bank server apparatus; a unit for holding information created by the creating unit; and a unit for transmitting a part of the information held by the holding unit, which is not yet transmitted to the bank server apparatus, to the bank server apparatus when the client terminal device is connected to the bank server apparatus.

In the above client terminal device, preferably, the information transmitted by the transmitting unit is at least one of information for instructing a transaction made on at least one account, information created with software operating in linkage with a transaction made on the account, and information created with software operating not in linkage with a transaction made on the account.

The above client terminal device preferably further comprises a unit for receiving information transmitted from the bank server apparatus, the receiving unit receiving information held in the bank server apparatus when the client terminal device is connected to the bank server apparatus.

In the above client terminal device, preferably, the information received by the receiving unit is at least one of information regarding a transaction made on at least one account, information created with software operating in linkage with a transaction made on the account, and information created with software operating not in linkage with a transaction made on the account.

In the above client terminal device, preferably, the account is given as a plurality of virtual accounts set for one account.

In the above client terminal device, preferably, the plurality of virtual accounts correspond in a one-to-one relation to users.

In the above client terminal device, preferably, each of the users corresponding in a one-to-one relation to the plurality of virtual accounts is able to create, using the creating unit, information for instructing a transaction made on the virtual account corresponding to the relevant user.

In the above client terminal device, preferably, the holding unit holds information created on arbitrary one or more of the plurality of virtual accounts when the client terminal device is not connected to the bank server apparatus; and the transmitting unit transmits all of the information held by the holding unit to the bank server apparatus when the client terminal device is connected to the bank server apparatus.

According to another aspect of the present invention, the client terminal device according to the first aspect, preferably, comprises a base unit connected to the bank server apparatus via a network; a portable unit wirelessly communicating with the base unit to receive entry of information from a user and to present information to the user, the portable unit being freely carried with the user; and a storage medium disposed in the base unit or the portable unit, the storage medium storing a program that operates the client terminal device to execute a function of creating information transmitted to the bank server apparatus when the client terminal device is not connected to the bank server apparatus; a function of storing and holding the information created by the creating function in the base unit or the portable unit; and a function of transmitting a part of the information held by the holding function, which is not yet transmitted, to the bank server apparatus when the base unit is connected to the bank server apparatus.

In the client terminal device according to another aspect of the present invention, preferably, the information transmitted by the transmitting function is at least one of information for instructing a transaction made on at least one account, information created with software operating in linkage with a transaction made on the account, and information created with software operating not in linkage with a transaction made on the account.

In the client terminal device set according to another aspect of the present invention, preferably, the storage medium further stores a program for operating the client terminal device to execute a function of receiving information transmitted from the bank server apparatus.

In the client terminal device according to another aspect of the present invention, preferably, the information received by the receiving function is at least one of information regarding a transaction made on the account, information created with software operating in linkage with a transaction made on the account, and information created with software operating not in linkage with a transaction made on the account.

In the client terminal device according to another aspect of the present invention, preferably, the storage medium is a nonvolatile semiconductor memory detachably attached to the portable unit.

According to still another aspect of the present invention, there is provided a bank server apparatus connected to the client terminal device set forth above, the bank server apparatus comprising a unit for creating information transmitted to the client terminal device; a unit for holding the information created by the creating unit; and a unit for transmitting a part of the information held by the holding unit, which is not yet transmitted, to the client terminal device and receiving information transmitted from the client terminal device when the client terminal device is connected to the bank server apparatus.

In the above bank server, preferably, the information transmitted by the transmitting unit is at least one of information regarding a transaction made on an account to which the client terminal device accesses, information created with software operating in linkage with a transaction made on the account, and information created with software operating not in linkage with a transaction made on the account; and the information received by the receiving unit is at least one of information for instructing a transaction made on the account, information created with software operating in linkage with a transaction made on the account, and information created with software operating not in linkage with a transaction made on the account.

In the above bank server, preferably, the account to which the client terminal device accesses is given as a plurality of virtual accounts set for one account.

According to still another aspect of the present invention, there is provided a method for transmitting information to a bank server apparatus, the method comprising a first step of creating information transmitted to the bank server apparatus when connection to the bank server apparatus is not established; a second step of holding the information created in the first step; and a third step of transmitting a part of the information held in the second step, which is not yet transmitted to the bank server apparatus, to the bank server apparatus when the connection to the bank server apparatus is established.

According to still another aspect of the present invention, there is provided a method comprising a first step of creating information transmitted to a client terminal device; a second step of holding the information created in the first step; a third step of establishing connection to the client terminal device; and a fourth step of transmitting the information held in the second step to the client terminal device and receiving information transmitted from the client terminal device when the connection to the client terminal device is established in the third step.

According to still another aspect of the present invention, there is provided a program for operating a computer to execute a function of transmitting information to a bank server apparatus, the program rendering the computer to execute a function of creating information transmitted to the bank server apparatus when connection to the bank server apparatus is not established; a function of holding the information created by the creating function; and a function of transmitting a part of the information held by the holding function, which is not yet transmitted to the bank server apparatus, to the bank server apparatus when the connection to the bank server apparatus is established.

According to still another aspect of the present invention, there is provided a program for operating a computer to execute a function of creating information transmitted to a client terminal device; a function of holding the information created by the creating function; a function of establishing connection to the client terminal device; and a function of transmitting the information held by the holding function to the client terminal device and receiving information transmitted from the client terminal device when the connection to the client terminal device is established by the connecting function.

According to still another aspect of the present invention, there is provided a computer-readable storage medium product storing an information transmitting program for operating a computer to execute a function of transmitting information to a bank server apparatus, the program rendering the computer to execute a function of creating information transmitted to the bank server apparatus when connection to the client terminal device is not established; a function of holding the information created by the creating function; and a function of transmitting a part of the information held by the holding function, which is not yet transmitted to the bank server apparatus, to the bank server apparatus when the connection to the bank server apparatus is established.

According to still another aspect of the present invention, there is provided a computer-readable storage medium product storing an information transmitting/receiving program for operating a computer to execute a function of creating information transmitted to a client terminal device; a function of holding the information created by the creating function; a function of establishing connection to the client terminal device; and a function of transmitting the information held by the holding function to the client terminal device and receiving information transmitted from the client terminal device when the connection to the client terminal device is established by the connecting function.

According to still another aspect of the present invention, there is provided a client terminal device comprising a unit for communicating with a bank server apparatus; a providing unit for providing banking services from the bank server apparatus to a user with the communicating unit; and a unit for limiting contents of the banking services, which are provided to the user by the providing unit, depending on the user.

In the client terminal device set forth just above, preferably, the limiting unit limits the contents of the banking services depending on an attribute of the user.

In the client terminal device set forth just above, preferably, the attribute is a user's age.

The client terminal device set forth just above, preferably, further comprises a unit for setting the contents limited by the limiting unit.

According to still another aspect of the present invention, there is provided a program for operating a client terminal device to execute a function of communicating with a bank server apparatus; a function of providing banking services from the bank server apparatus to a user with the communicating function; and a function of limiting contents of the banking services, which are provided to the user by the providing function, depending on the user.

According to still another aspect of the present invention, there is provided a storage medium product readable by a client terminal device, the storage medium storing the above program.

Thus, that storage medium product is constituted as a storage medium in which the banking service providing program is stored.

The storage medium product is preferably a nonvolatile semiconductor memory detachably attached to the client terminal device.

According to still another aspect of the present invention, there is provided a method comprising the steps of a first step of communicating with a bank server apparatus; and a second step of providing banking services from the bank server apparatus to a user via communication in the first step, wherein contents of the banking services, which are provided to the user in the second step, are limited depending on the user.

According to still another aspect of the present invention, there is provided a bank server apparatus comprising a unit for accepting a log-in from a user; a unit for limiting contents of banking services, which are provided to the user, depending on the user who has logged in and has been accepted by the log-in accepting unit; and a unit for providing banking services to the user, the banking services having contents limited by the limiting unit.

The above bank server set forth just above, preferably, further comprises a unit for acquiring an attribute of the user who has logged in and has been accepted by the log-in accepting unit, wherein the limiting unit limits contents of the banking services depending on the attribute of the user acquired by the attribute acquiring unit.

In the above bank server set forth just above, preferably, the attribute of the user acquired by the attribute acquiring unit is user's age.

According to still another aspect of the present invention, there is provided a method comprising a first step of accepting a log-in from a user; a second step of limiting contents of banking services, which are provided to the user, depending on the user who has logged in and has been accepted in the first step; and a third step of providing the banking services to the user, the banking services having contents limited in the second step.

According to still another aspect of the present invention, there is provided a program for operating a bank server apparatus to execute a function of accepting a log-in from a user; a function of limiting contents of banking services, which are provided to the user, depending on the user who has logged in and has been accepted by the log-in accepting function; and a function of providing the banking services to the user, the banking services having contents limited by the limiting function.

According to still another aspect of the present invention, there is provided a computer-readable storage medium product storing a banking service providing program for operating a bank server apparatus to execute a function of accepting a log-in from a user; a function of limiting contents of banking services, which are provided to the user, depending on the user who has logged in and has been accepted by the log-in accepting function; and a function of providing the banking services to the user, the banking services having contents limited by the limiting function.

According to still another aspect of the present invention, there is provided a server apparatus comprising a unit for accepting a log-in from one or more client terminal devices corresponding to one account; a unit for acquiring ID information for identifying the client terminal device that previously logged in to the one account when the accepting unit accepts a log-in from one of the client terminal devices; a unit for acquiring display information regarding the client terminal device, which previously logged in to the one account, using the ID information acquired by the ID information acquiring unit, the display information being displayed on the client terminal device that has logged in at this time and has been accepted by the accepting unit; and a unit for transmitting the display information acquired by the display information acquiring unit to the client terminal device.

Herein, a log-in to an account means an operation of establishing such a state that a client terminal device can access a transaction database present in a custom service system, e.g., a transaction database provided in a server apparatus, and transaction information specified by, e.g., the account number can be read and written.

In the above server apparatus, preferably, the information transmitted by the display information transmitting unit includes the ID information acquired by the ID information acquiring unit.

The above server apparatus, preferably, further comprises a unit for, when accepting a log-in from the client terminal device to the one account by the accepting unit, receiving the ID information for identifying the client terminal device from the client terminal device; and a unit for holding the ID information received by the ID information receiving unit, wherein the ID information acquiring unit acquires, from the ID information holding unit, the ID information for identifying the client terminal device that previously logged in to the one account.

The above server further comprises a unit for, when accepting a log-in from the client terminal device to the one account by the accepting unit, acquiring confirmation information for confirming whether the client terminal device holds the ID information for identifying the client terminal device; a unit for acquiring information for writing, in the client terminal device, the ID information for identifying the client terminal device; and a unit for transmitting the write information acquired by the write information acquiring unit to the client terminal device, wherein the write information acquired by the write information acquiring unit is transmitted to the client terminal device by the write information transmitting unit when it is confirmed from the confirmation information acquired by the confirmation information acquiring unit that the client terminal device does not hold the ID information for identifying the client terminal device.

The above server apparatus, preferably, further comprises a unit for acquiring a date or a date and time at which a previous log-in to the one account was accepted, wherein the transmitting unit transmits the date or the date and time acquired by the previous log-in date/time acquiring unit to the client terminal device that has logged in and has been accepted at this time.

In the above server apparatus, preferably, the ID information is made up of signs other than signs entered by a user at the time of logging-in, and contains account ID information for identifying the one account.

In the above server apparatus, preferably, the number of the client terminal devices, which are allowed to have the same account ID information, is limited to a predetermined number or below.

The above server apparatus, preferably, further comprises a unit for holding a name arbitrarily set by a user for the client terminal device, wherein the display information contains the name of the client terminal device held by the name holding unit.

According to still another aspect of the present invention, there is provided a method comprising a first step of accepting a log-in from one or more client terminal devices corresponding to one account; a second step of acquiring ID information for identifying the client terminal device that previously logged in to the one account when a log-in from one of the client terminal devices is accepted in the first step; a third step of acquiring display information regarding the client terminal device, which previously logged in to the one account, using the ID information acquired in the second step, the display information being displayed on the client terminal device that has logged in at this time and has been accepted in the first step; and a fourth step of transmitting the display information acquired in the third step to the client terminal device.

According to still another aspect of the present invention, there is provided a program for operating a computer to execute a function of accepting a log-in from one or more client terminal devices corresponding to one account; a function of acquiring ID information for identifying the client terminal device that previously logged in to the one account, when a log-in from one of the client terminal devices is accepted by the accepting function; a function of acquiring display information regarding the client terminal device, which previously logged in to the one account, using the ID information acquired by the ID information acquiring function, the display information being displayed on the client terminal device that has logged in at this time and has been accepted by the accepting function; and a function of transmitting the display information acquired by the display information acquiring function to the client terminal device.

According to still another aspect of the present invention, there is provided a program for logging in to one account set in a server apparatus, the program operating a client terminal device to execute a function of logging in to the one account set in the server apparatus; a function of holding ID information for identifying and determining, among from other client terminal devices, a client terminal device that has logged in to the one account; a function of transmitting the ID information held by the holding function to the server apparatus; a function of receiving, from the server apparatus, display information for displaying information identifying the client terminal device that previously logged in to the one account; and a function of displaying the display information received by the display information receiving function.

According to still another aspect of the present invention, there is provided a computer-readable storage medium product storing a program for operating a computer to execute a function of accepting a log-in from one or more client terminal devices corresponding to one account; a function of acquiring ID information for identifying the client terminal device that previously logged in to the one account, when a log-in from one of the client terminal devices is accepted by the accepting function; a function of acquiring display information regarding the client terminal device, which previously logged in to the one account, using the ID information acquired by the ID information acquiring function, the display information being displayed on the client terminal device that has logged in at this time and has been accepted by the accepting function; and a function of transmitting the display information acquired by the display information acquiring function to the client terminal device.

According to still another aspect of the present invention, there is provided a computer-readable storage medium product storing a program for logging in to one account set in a server apparatus, the program operating a client terminal device to execute a function of logging in to the one account set in the server apparatus; a function of holding ID information for identifying and determining, among from other client terminal devices, a client terminal device that has logged in to the one account set in said server apparatus; a function of transmitting the ID information held by the holding function to the server apparatus; a function of receiving, from the server apparatus, display information for displaying information identifying the client terminal device that previously logged in to the one account; and a function of displaying the display information received by the display information receiving function.

According to still another aspect of the present invention, there is provided a server apparatus including a unit for transmitting, to a client terminal device, screen data for displaying a screen on a display of the client terminal device, the screen data having a program built therein to operate the client terminal device to execute a function of determining whether a predetermined condition is satisfied; and a function of changing at least a part of the screen into an indiscernible state when the predetermined condition is satisfied by the condition determining function.

In other words, the screen data contains, in the form of, e.g., source code, a program for operating the client terminal device to execute a condition determining function of determining whether a predetermined condition is satisfied, and a screen changing function of changing at least a part of the screen into an indiscernible state when the predetermined condition is satisfied by the condition determining function.

In the server apparatus set forth just above, preferably, the condition determining function determines that the predetermined condition is satisfied, if a predetermined time lapses from reception of the screen data by the client terminal device.

In the server apparatus set forth just above, preferably, the condition determining function determines that the predetermined condition is satisfied, if the number of times of reentry made on an entry column set in the screen reaches a predetermined number.

In the server apparatus set forth just above, preferably, the information changed by the screen changing function contains input information entered from the client terminal device and displayed on the display.

In the server apparatus set forth just above, preferably, the screen changing function erases the screen displayed on the display.

In the server apparatus set forth just above, preferably, the predetermined time is set for each set of the screen data.

The server apparatus set forth just above, preferably, further comprises a unit for acquiring at least one of the number of entry columns set in the screen and an attribute of the screen; a unit for calculating the predetermined time based on at least one of the number of entry columns and the attribute acquired by the number-of-columns/attribute acquiring unit; a unit for creating the program using the predetermined time calculated by the calculating unit; and a unit for adding the program created by the creating unit to the screen data.

In the server apparatus set forth just above, preferably, the screen data further contains a program for operating the client terminal device to execute an alarm displaying function of displaying, on the display, alarm information indicating that the end of the predetermined time is coming closer, before the lapse of the predetermined time.

In the server apparatus set forth just above, preferably, the screen data further contains a program for operating the client terminal device to execute a function of acquiring, from a user, extension information indicating extension of the predetermined time in the client terminal device; and a function of extending the predetermined time when the extension information is acquired by the extension information acquiring function.

In the server apparatus set forth just above, preferably, the screen data transmitted by the screen data transmitting unit further contains a program for operating the client terminal device to execute a function of transmitting, from the client terminal device to the server apparatus, a signal indicating that the predetermined condition is satisfied, when the condition determining function determines that the predetermined condition is satisfied; and wherein the server apparatus further comprises a unit for receiving information transmitted from the client terminal device by the transmitting function and indicating that the predetermined condition is satisfied; and a unit for cutting off line connection between the client terminal device and the server apparatus when the information receiving unit receives the information indicating that the predetermined condition is satisfied.

The server apparatus set forth just above, preferably, further comprises a unit for acquiring a connection time set for each set of the screen data; a unit for counting time lapsed from transmission of the screen data by the screen data transmitting unit; and a unit for cutting off line connection between the client terminal device and the server apparatus when the time counted by the time counting unit reaches the connection time acquired by the connection time acquiring unit.

According to still another aspect of the present invention, there is provided a server apparatus comprising a unit for transmitting, to a client terminal device, screen data for displaying a screen on a display of the client terminal device; a unit for acquiring a connection time set for each set of the screen data; a time counting unit for counting time lapsed from transmission of the screen data to the client terminal device; and a unit for cutting off line connection between the client terminal device and the server apparatus when the time counted by the time counting unit reaches the connection time acquired by the connection time acquiring unit.

According to still another aspect of the present invention, there is provided a method comprising a first step of incorporating, in screen data transmitted to a client terminal device, a condition determining program for executing a condition determining function of determining whether a predetermined condition is satisfied in the client terminal device; a second step of incorporating, in the screen data, a screen changing program for executing a screen changing function of changing at least a part of the screen displayed on the client terminal device into an indiscernible state when the condition determining function determines that the predetermined condition is satisfied in the client terminal device; and a third step of transmitting, to the client terminal device, the screen data in which the condition determining program is incorporated in the first step and the screen changing program is incorporated in the second step.

According to still another aspect of the present invention, there is provided a method comprising a first step of acquiring, from a server apparatus, screen data in which a program is incorporated; a second step of displaying the screen data on a display; a third step of executing, based on the program acquired in the first step, a condition determining function of determining whether a predetermined condition is satisfied; and a fourth step of executing, based on the program acquired in the first step, a screen changing function of changing at least a part of a screen displayed using the screen data into an indiscernible state when the condition determining function determines that the predetermined condition is satisfied.

According to still another aspect of the present invention, there is provided a program including screen data displayed on a client terminal device and operating the client terminal device to execute a function of determining whether a predetermined condition is satisfied; and a function of changing at least a part of a screen displayed on the client terminal device into an indiscernible state when the condition determining function determines that the predetermined condition is satisfied.

According to still another aspect of the present invention, there is provided a program for operating a server apparatus to execute a function of distributing a screen displaying program to a client terminal device, the program including screen data displayed on the client terminal device and operating the client terminal device to execute a function of determining whether a predetermined condition is satisfied; and a function of changing at least a part of a screen displayed on the client terminal device into an indiscernible state when the condition determining function determines that the predetermined condition is satisfied.

The above distribution program is, e.g., a server program installed in a server apparatus for transmitting the screen data to the client terminal device.

According to still another aspect of the present invention, there is provided a computer-readable storage medium product storing a program for including screen data displayed on a client terminal device and operating the client terminal device to execute a function of determining whether a predetermined condition is satisfied; and a function of changing at least a part of a screen displayed on the client terminal device into an indiscernible state when the condition determining function determines that the predetermined condition is satisfied.

According to still another aspect of the present invention, there is provided a computer-readable storage medium product storing a program for operating a server apparatus to execute a function of distributing a screen displaying program to a client terminal device, the program including screen data displayed on the client terminal device and operating the client terminal device to execute a function of determining whether a predetermined condition is satisfied; and a function of changing at least a part of a screen displayed on the client terminal device into an indiscernible state when the condition determining function determines that the predetermined condition is satisfied.

BRIEF DESCRIPTION OF THE DRAWINGS

FIGS. 6A and 6B are flowcharts showing operation of two-way communication between the client terminal and the bank server in the first embodiment, in which FIG. 6A shows operation of the client terminal and FIG. 6B shows operation of the bank server;

FIGS. 8A and 8B are flowcharts showing operation of two-way communication between the client terminal and the bank server in the second embodiment, in which FIG. 8A shows operation of the client terminal and FIG. 8B shows operation of the bank server;

FIG. 16 shows an age table;

FIG. 17 shows a function limiting table;

FIG. 18 shows a banking service select screen for users of 6 to 11 ages;

FIG. 19 shows a banking service select screen for users of 12 to 14 ages;

FIG. 20 shows a banking service select screen for users of 15 to 17 ages;

FIG. 21 shows a banking service select screen for users of 18 ages or over;

FIGS. 22A and 22B are flowcharts for explaining operations of various module of a banking service program, in which FIG. 22A shows operation of the bank server and FIG. 22B shows operation of the client terminal;

FIG. 31 shows a previous log-in information display screen;

FIG. 32 shows a client terminal registration screen;

FIG. 33 is a flowchart for explaining operation of a previous log-in information providing server;

FIG. 35 shows a transferee registration confirming screen;

FIG. 36 shows an alarm window;

DESCRIPTION OF THE PREFERRED EMBODIMENTS

First Embodiment

A first embodiment of the present invention will be described below in detail with reference to FIGS. 1 to 6.

Figure 1:
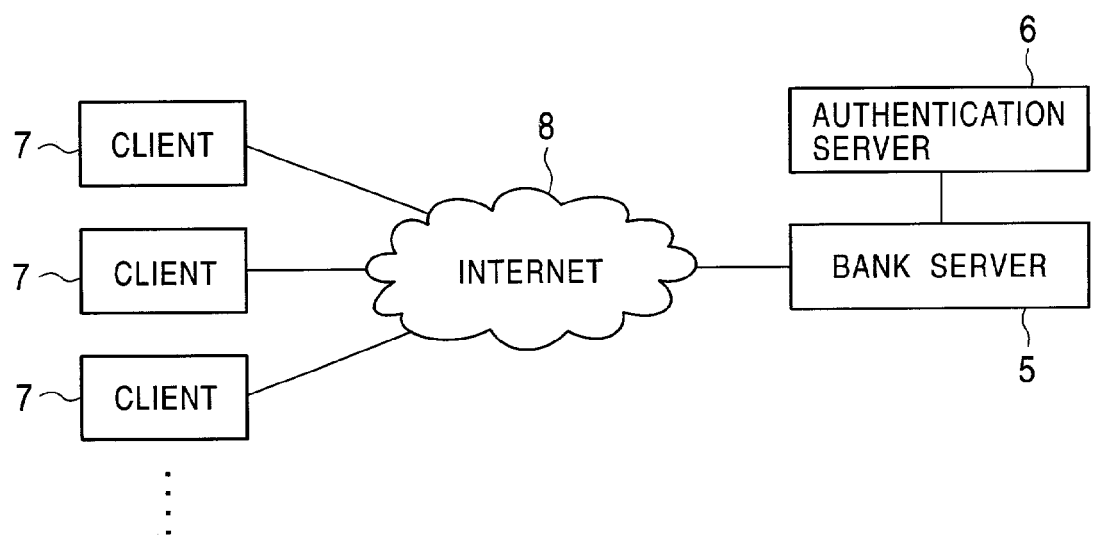
FIG. 1 is a block diagram showing one example of configuration of a network system to which a bank server and client terminals according to a first embodiment are applied.

FIG. 1 is a block diagram showing one example of configuration of a network system to which a bank server 5 and client terminals 7, 7, . . . according to a first embodiment are applied.

The bank server 5 is a server operated by a bank and is connected to the Internet 8. The bank server 5 provides, to a user having logged in, various kinds of services such as confirmation of the deposit balance, transfer of money, opening of a new bank account, closing of a fixed deposit account, and exchange with foreign currency.

The bank server 5 stores various screen data, such as a balance confirmation screen, which is presented to the user on the client terminal 7. The screen data is described in computer language called HTML (Hyper Text Markup Language), for example.

An authentication server 6 authenticates log-in accounts, passwords, etc. sent from the client terminals 7, 7, . . . for user authentication.

The user who has not been authenticated by the authentication server 6 cannot log in the bank server 5.

The client terminals 7, 7, . . . are also connected to the Internet 8 for communication with the bank server 5.

The client terminals 7, 7, . . . are each constituted as a PC (personal computer), a cellular phone, a word processor with the communicating function, or a digital TV set with a built-in modem.

The user can receive various banking services provided from the bank server 5 by logging in to the bank server 5 from any one of the client terminals 7, 7, . . . .

Each of the client terminals 7, 7, . . . includes a browser installed therein beforehand, and can display screen data in the HTML format transmitted from the bank server 5 using the browser.

The user is able to communicate with the bank server 5 by entering data, such as the transferee bank account number, on the displayed screen.

The Internet 8 is constructed by, e.g., a telephone line, a cable TV network, a satellite line, or an optical fiber network.

The client terminals 7, 7, . . . and the bank server 5 communicate with each other using a protocol, e.g., TCP/IP (Transmission Control Protocol/Internet Protocol).

Although the client terminals 7, 7, . . . are directly connected to the Internet 8 in FIG. 1, they may be connected to the Internet 8 via an Internet connection agency called a provider.

Also, while the client terminals 7, 7, . . . and the bank server 5 are connected via the Internet 8, the present invention is not limited to such an arrangement. For example, they may be connected via any of various communication networks such as a dedicated line, LAN (Local Area Network), WAN (Wide Area Network), and a satellite communication network.

Figure 2A:
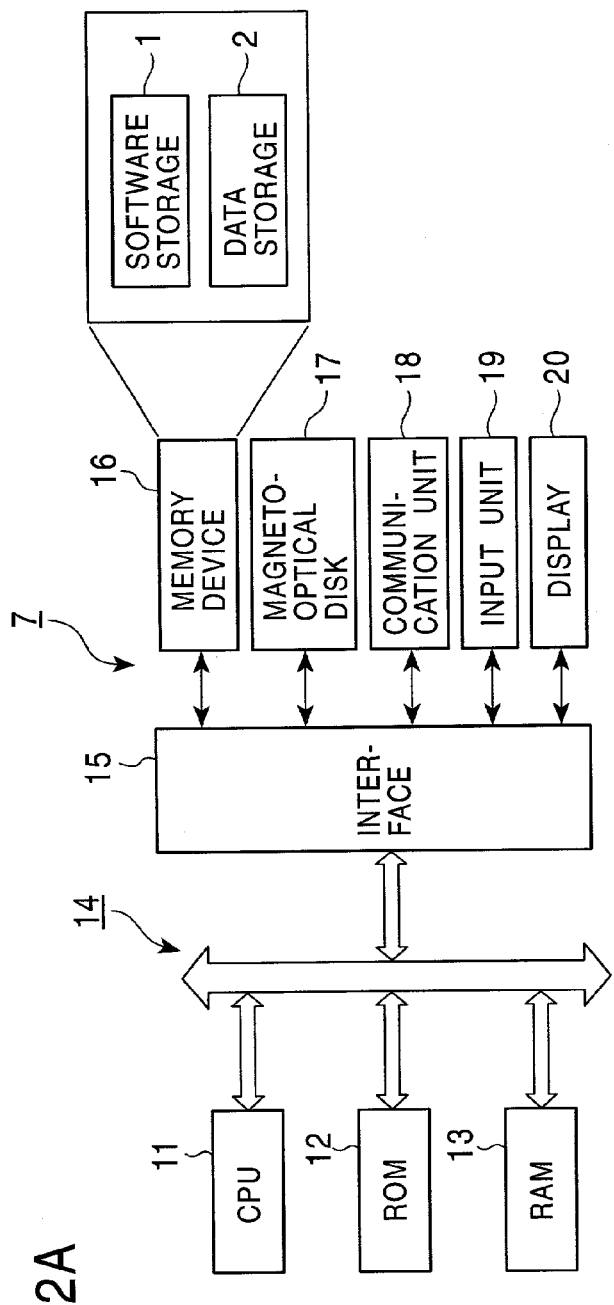
FIG. 2A is a block diagram showing one example of configuration of the client terminal.
Figure 2C:
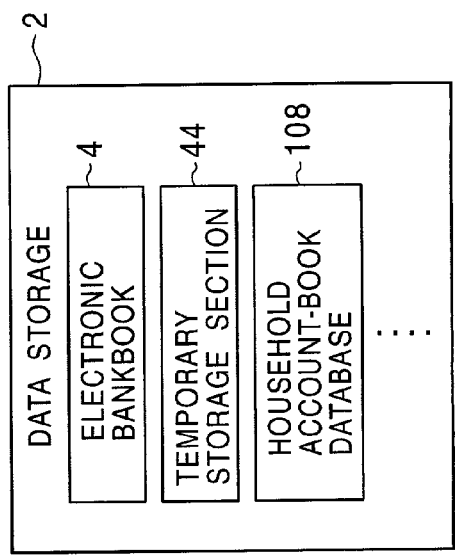
FIG. 2C is an illustration schematically showing a database stored in a data storage of the memory device.

FIG. 2A shows one example of configuration of the client terminal 7. In this embodiment, the client terminal 7 is constituted as, by way of example, a PC.

The following description is made of one of the plurality of client terminals 7, 7, . . . .

A CPU (Central Processing Unit) 11 executes various processes, calculations, condition determinations, and control of various devices such as a display, in accordance with programs stored in a ROM (Read Only Memory) 12, programs loaded in a RAM (Random Access Memory) 13, etc. As examples of the various processes executed by the CPU 11, instruction data that is prepared off-line by the user for a transaction made on a bank account is stored in a temporary storage section 44. Also, upon the user logging in to the bank server 5, the data stored in the temporary storage section 44 is transmitted to the bank server 5. Further, an electronic bankbook 4 is updated in accordance with the data of settled transactions received from the bank server 5.

The ROM 12 is a read only memory in which basic programs and parameters for operating the client terminal 7 are stored.

The RAM 13 is a memory for storing programs and data required by the CPU 11 to execute the various processes. The contents stored in the RAM 13 can be changed by the CPU 11.

An interface 15 connects various devices, such as a memory device 16, a magneto-optical disk 17, a communication unit 18, an input unit 19 and a display 20, to the CPU 11, etc., for interfacing between those devices and the CPU 11, etc.

The bus line 14 is a transmission medium used when transmitting and receiving data, control signals, etc. between the interface 15 and the CPU 11, the ROM 12, the RAM 13, etc.

The memory device 16 comprises a storage medium constructed by, e.g., a hard disk, a nonvolatile semiconductor memory, a magneto-optical disk, a magnetic tape, or a combination of two or more selected from among them, and a storage medium driver for reading and writing data from and in the storage medium. Various programs and data, such as banking business software and the electronic bankbook 4, are stored in the memory device 16.

The storage medium may be constructed in a detachable manner from the storage medium driver. In this case, the user can store the electronic bankbook 4 in a detachable nonvolatile semiconductor memory, for example, and carry it with him.

The memory device 16 includes a software storage 1 in which various kinds of software are stored, and a data storage 2 in which various kinds of databases are stored. The contents stored in the software storage 1 and the data storage 2 will be described later with reference to FIGS. 2B and 2C.

Generally, the magneto-optical disk 17 has an access rate lower than that of the memory device 16, but is used for backup of programs and data because it is detachable from the client terminal 7.

The communication unit 18 is a device for connecting the client terminal 7 to the Internet 8. When connecting the client terminal 7 to the public line, the communication unit 18 is constituted by, e.g., a modem.

The input unit 19 comprises a keyboard, a mouse and so on. The keyboard is used to, for example, enter characters on various screens displayed by the bank server 5.

The mouse is a pointing device and is able to input data by clicking it with a pointer put on a displayed icon or button. In addition to the mouse, a touch panel, a tablet or the like may also be used as a pointing device.

The display 20 is constituted by, e.g., a CRT (Cathode Ray Tube) display, a liquid crystal display, or a plasma display.

The display 20 displays various screens downloaded from the bank server 5, data entered by the user from the keyboard or the like, etc.

Figure 2B:
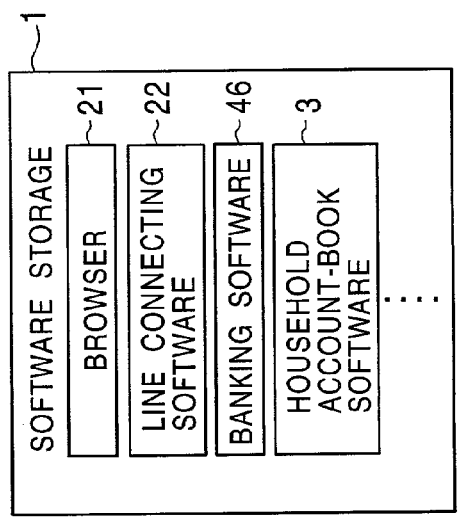
FIG. 2B is an illustration schematically showing software stored in a software storage of a memory device.

FIG. 2B schematically shows software stored in the software storage 1 of the memory device 16. The software storage 1 stores therein a browser 21, line connection software 22, banking software 46, household account-book software 3, and other application software (not shown) including petty cashbook software, calendar software, deposit target achievement software, child growth recording software, university examination advice software, and menu guidance software.

The browser 21 is a program for displaying a file in the HTML format on the display 20.

A file in the HTML format is one in which a document structure, a location of an image or the like, a link destination, etc. are described using a tag (one kind of reserved word). Various screens such as a transfer screen can be each defined with a file in the HTML format. A screen defined with a file in the HTML format is displayed on the display 20, etc. using the browser.

The line connection software 22 is software cooperating with the CPU 11 and the communication unit 18 so that the client terminal 7 is connected to the Internet 8 (or the provider when connected to the Internet 8 via the provider).

The banking software 46 is software dedicated for connecting the client terminal 7 to the bank server 5. Using the banking software 46, the user is able to utilize banking services such as instructing transfer to the bank server 5 and confirming the account balance.

The household account-book software 3 and other application software, such as the calendar software and the petty cashbook software, are ones provided from a bank for presenting, to the user, both services related to banking business or services not related to banking business.

The banking software 46 and the application software will be described later in more detail.

The data storage 2 includes the electronic bankbook 4, the temporary storage section 44, and a household account-book database 108. The data storage 2 further includes, though not shown, databases corresponding to other application software, such as the petty cashbook software and the calendar software, stored in the software storage 1.

The electronic bankbook 4 is a database in which the account balance and specifics of income/outgo are recorded, and is equivalent to a deposit bankbook commonly used. The electronic bankbook 4 is updated by the CPU 11 in accordance with the banking software 46.

The temporary storage section 44 temporarily stores, e.g., instruction data for transaction made on a bank account, such as transfer instruction data, and data prepared by the application software and transmitted to the bank server 5, those data being prepared by the user in the off-line condition. The data stored in the temporary storage section 44 is transmitted to the bank server 5 in batch upon the client terminal 7 logging in to the bank server 5. The temporary storage section 44 will be described later in more detail.

The household account-book database 108 is one in which data regarding the household account-book software 3 is stored. Daily incomes and outgoes in housekeeping entered by the user are accumulated in the household account-book database 108.

The data storage 2 further stores, though not shown, databases in which data related to other application software, such as the petty cashbook software and the calendar software, is stored.

Figure 3:
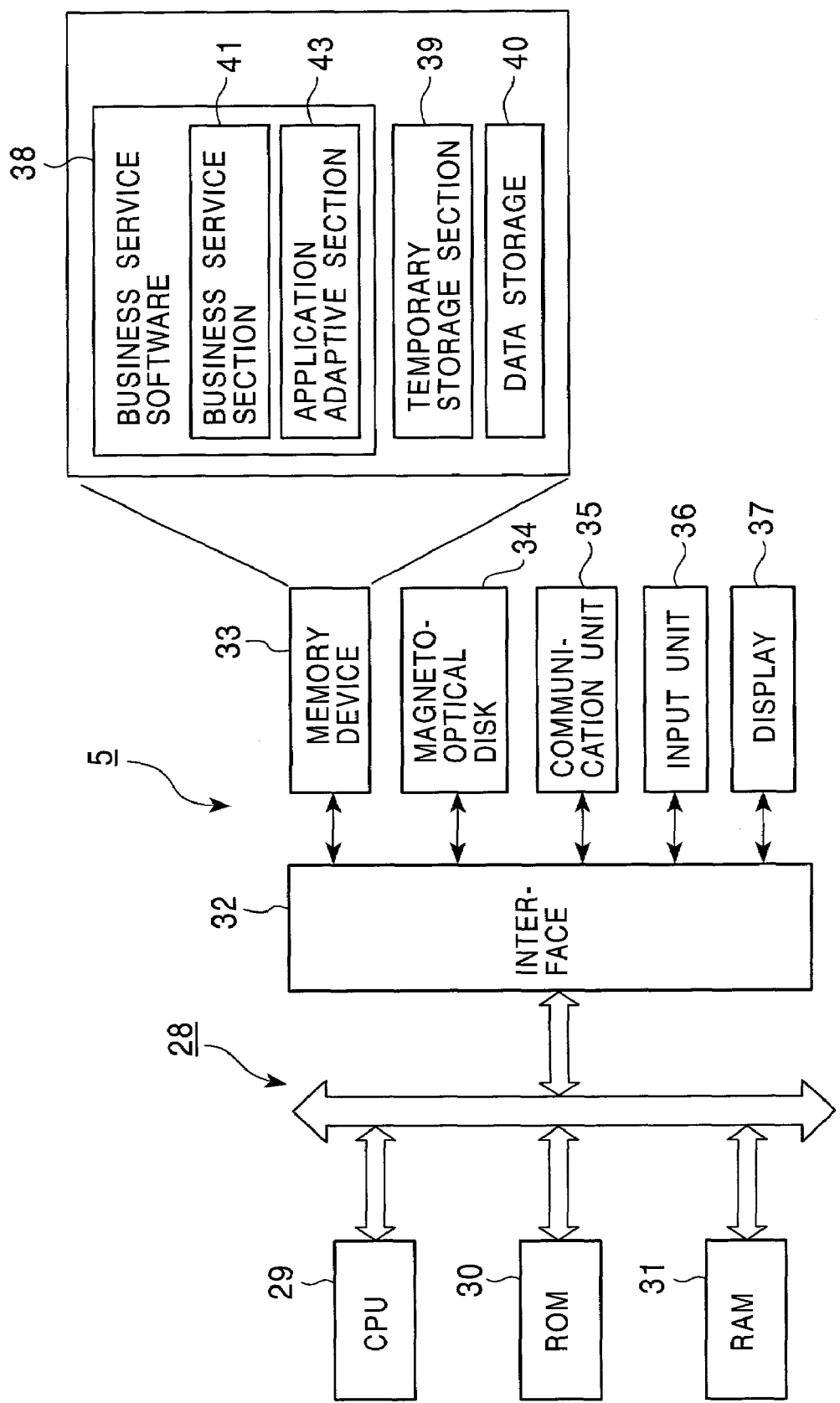
FIG. 3 is a block diagram showing one example of configuration of a bank server.

FIG. 3 is a block diagram showing one example of configuration of the bank server 5.

The bank server 5 is constituted by, e.g., a computer having high-speed and high-level information processing functions, such as a workstation.

The bank server 5 has basically the same construction as that of the client terminal 7. Functions of a CPU 29 and a display 37 are the same as those of the CPU 11 and the display 20 of the client terminal 7.

A memory device 33 stores therein business service software 38, etc. and includes a temporary storage section 39 and a data storage 40.

As with the memory device 16 of the client terminal 7, the memory device 33 comprises a storage medium constructed by, e.g., a hard disk, a nonvolatile semiconductor memory, a magneto-optical disk, a magnetic tape, or a combination of two or more selected from among them, and a storage medium driver for reading and writing data from and in the storage medium.

The business service software 38 is software for presenting various services to the client terminal 7 from the bank server 5.

The business service software 38 comprises a business service section 41 for providing banking services to the user, and an application adaptive section 43 for providing various services regarding application software distributed to clients from the bank.

More specifically, the business service section 41 executes various transactions such as performing a balance confirmation process, a transfer process, an account opening process, etc. in accordance with instruction data sent from the client terminal 7, crediting an interest in a bank account, and debiting a preset amount of money to the bank account.

The application adaptive section 43 executes data processing in relation to the application software, such as analyzing household account data sent from the client terminal 7 corresponding to the household account-book software 3 and transmitting analyzed data to the client terminal 7, or analyzing test results sent from the user corresponding to the university examination advice software, generating a success or failure judgment, and transmitting it to the client terminal 7.

The temporary storage section 39 temporarily holds data that is transmitted to the client terminal 7 upon the client terminal 7 logging in to the bank server 5.

Information regarding various transactions, such as a direct debit, transfer, and a credit of interest, which are made on the user's bank account by the business service section 41 while the user is not logging in to the bank server 5, is recorded in a user ledger (virtually prepared in the data storage 40) and at the same time temporarily stored in the temporary storage section 39.

Various data generated by the application adaptive section 43 corresponding to the application software is also accumulated in the temporary storage section 39.

The information regarding the settled transactions stored in the temporary storage section 39 is transmitted to the client terminal 7 upon the user logging in to the bank server 5.

The data storage 40 stores therein various databases related to the banking business, such as the user ledger, and various databases related to the application adaptive section 43.

The user ledger is a database in which various transactions made on the user's bank account are stored.

Databases related to the application software include, e.g., a schoolwork performance (test result) database uploaded from the user corresponding to the university examination advice software, and a growth record database for recording weights and heights of children which are updated corresponding to child growth recording software. The uploaded data is analyzed in the application adaptive section 43, and an analyzed result is sent to the temporary storage section 39 and then transmitted to the client terminal 7.

Other programs, such as an OS (Operating System), a program for preventing unauthorized access from the exterior, and a program used by a supervisor for maintenance, are also stored in the memory device 33. Records of transactions made by the bank server 5 and various data, such as user registration data and deposit balance data, are stored in the data storage 40.

Figure 4:
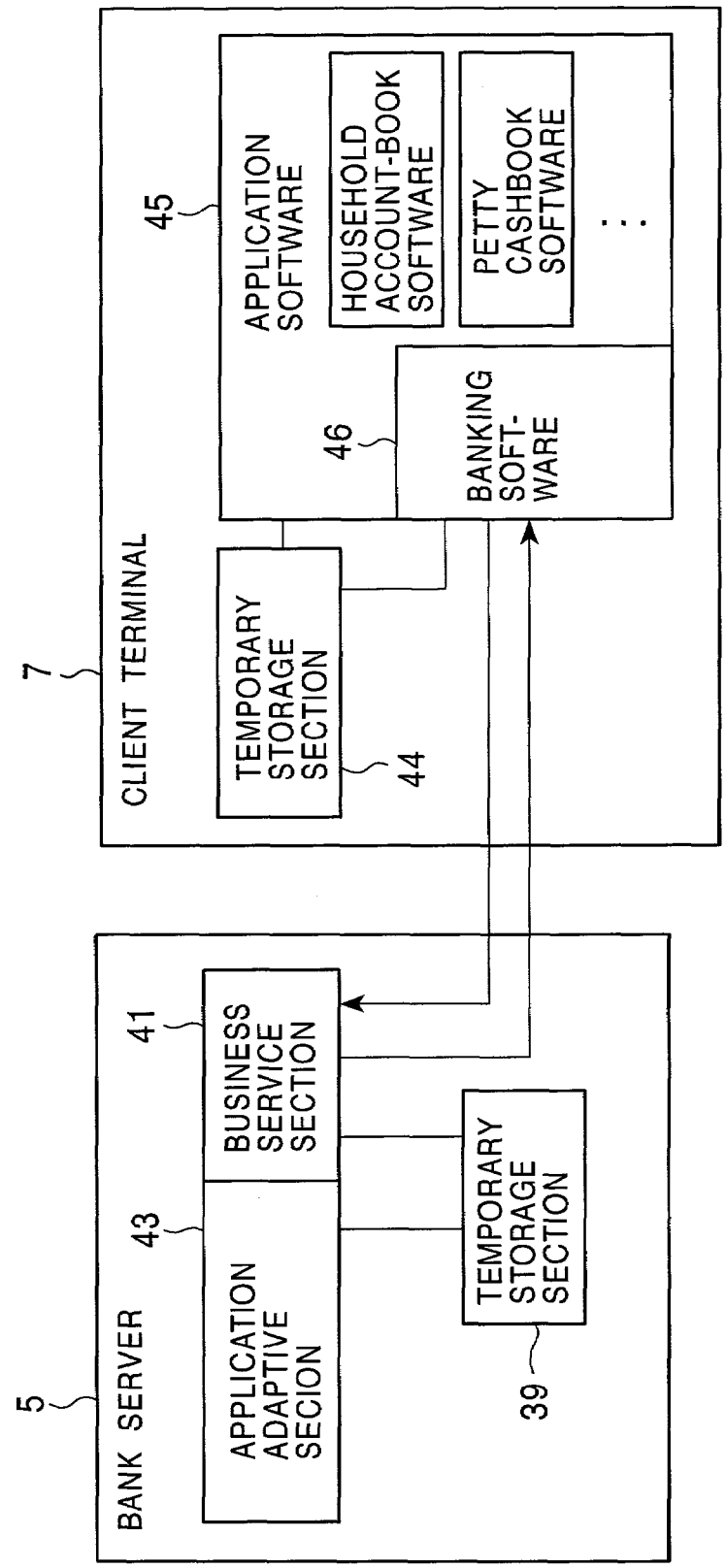
FIG. 4 is a block diagram showing the relationship in data transmission/reception between the bank server and the client terminal in the first embodiment.

FIG. 4 is a block diagram for explaining the relationship in data transmission/reception between the bank server 5 and the client terminal 7.

The client terminal 7 comprises a temporary storage section 44, banking software 46, and application software 45. The application software 45 means ones of various kinds of application software prepared by the bank, which are selected and installed by the user.

The banking software 46 and the application software 45 are loaded in the RAM 13 and develop the predetermined functions under operation of the CPU 11.

The banking software 46 is software dedicated for communicating with the bank server 5.

The banking software 46 provides an interface for displaying various screens, such as a log-in screen, a balance confirmation screen, a transfer screen, a fixed account closing screen, and a new account opening screen, so that display data, e.g., the account balance, is presented to the user, and for acquiring entry data, such as the account number and the amount of money transferred, from the user.

Further, the banking software 46 outputs the data entered by the user to the temporary storage section 44 and then reads and transmits the data stored in the temporary storage section 44 to the bank server 5 upon connection of the client terminal 7 to the bank server 5.

In addition, the banking software 46 receives data held in the temporary storage section 39 of the bank server 5 upon connection of the client terminal 7 the bank server 5.

Based on the received data, the banking software 46 updates the electronic bankbook 4 and data for use in the application software 45.

In this embodiment, the banking software 46 includes data for various screens to be displayed on the display 20, such as the balance confirmation screen. Then, with data transfer between the bank server 5 and the client terminal 7, the client terminal 7 receives the display data transmitted from the bank server 5, and the bank server 5 receives the entry data transmitted from the client terminal 7.

Further, the various screen data for, e.g., the balance confirmation screen, is also prepared in the bank server 5 and employed by the user who logs in to the bank server 5 using a general browser instead of the banking software 46.

The above operations have been described as functions of the banking software 46 for convenience of explanation, but those functions are actually developed by the CPU 11 of the client terminal 7 operating in accordance with the banking software 46. In the following description, operations of the CPU 11 of the client terminal 7 and the CPU 29 of the bank server 5 are likewise described as software operations for convenience of explanation.

Using the banking software 46, the user is able to display various screens, such as a transfer screen, a fixed account closing screen, and a new account opening screen, on the display 20 while the client terminal 7 is kept off-line.

Then, the user is able to enter necessary items on those screens and prepare data to be transmitted to the bank server 5. The data entered by the user is converted into the data format adapted for transmission to the bank server 5 and is temporarily stored in the temporary storage section 44. Incidentally, the user can accumulate plural pieces of data in the temporary storage section 44.

The temporary storage section 44 is nonvolatile and keeps data held therein even after the user turns off the power for the client terminal 7.

The data stored in the temporary storage section 44 is transmitted to the bank server 5 upon the user logging in to the bank server 5 from the client terminal 7.

The application software 45 includes household account-book software linked with data of the electronic bankbook 4, petty cashbook software, calendar software, deposit target achievement software, and other various kinds of application software which are not directly related to banking business, such as child growth recording software, university examination advice software, and menu guidance software.

Those pieces of application software cooperate with the banking software 46 to develop their functions, and are distributed to users from the bank in the form stored in any of various recording media, e.g., a CD-ROM. Alternatively, the application software may be downloaded from the bank server 5 or any other suitable server in response to a download request from each user.

The bank prepares various kinds of application software depending on user needs.

For example, the household account-book software has the function equivalent to general commercially available one, and is linked with the banking software 46.

Therefore, results of transactions made on the user's bank account by the bank server 5 is reflected on the household account-book software.

More specifically, the banking software 46 downloads the data accumulated in the temporary storage section 39 of the bank server 5 and updates the electronic bankbook 4 (i.e., the database storing data of the deposit bankbook). On the other hand, the updated contents of the electronic bankbook 4 are read by the household account-book software and reflected on the household account-book.

It is assumed, for example, that a gas charge of 5000 yen is debited to the bank account on February 5. Then, "gas charge of 5000 yen (direct debit to account)" is automatically displayed in the outgo column of February 5 in the household account-book. Corresponding to the automatically displayed item, the sum of outgoes is also automatically calculated.

The input data of the household account-book software is stored in the database prepared in the client terminals 7, but it may be held in the bank server 5 when the user makes a special agreement with the bank. This enables the application adaptive section 43 to check daily outgoes in housekeeping and to provide various peripheral services, such as household consultation, to the user.

For example, it is possible to give the user an advice for buildup of property in consideration of a housing loan and education expenses.

The petty cashbook software is software oriented for, e.g., school children and enabling the children to record daily incomes and outgoes. As with the household account-book software, the petty cashbook software is linked with the electronic bankbook 4 so that transactions made on the user's bank account are displayed in the petty cashbook software as well.

The calendar software displays a screen that is divided into small boxes corresponding to days. Using the calendar software, the user is able to write daily schedules on the screen such that, for example, "P.M. 2 ballet lessen" is put in the box of February 6 (Monday).

In linkage with the banking software, the dates and amounts of direct debits of public utilities charges, for example, can also be displayed in corresponding calendar boxes. Further, the transfer screen can be displayed upon the user locating a mouse pointer in match with the relevant calendar box and clocking a right button.

When the user enters the name of the transferee bank, the bank account number to which money is transferred, the amount of money transferred, etc. on the transfer screen, the banking software creates transaction data for making transfer of the input amount of money from the user account on the day corresponding to the calendar box pointed by the mouse. The created data is held in the temporary storage section 44 and is transmitted to the bank server 5 upon the client terminal 7 logging in to the bank server 5. At the same time, "transferee Taro Saito 10,000 yen", for example, is displayed as a transfer schedule in the calendar box corresponding to the relevant day.

The deposit target achievement software operates in cooperation with, e.g., the petty cashbook software. Using this software, a child can set such a target as, for example, depositing 10,000 yen per month and building up 50,000 yen in total to buy a radio-controlled car. The target can be set by entering a numerical value in a target setting column that is displayed upon initiation of the deposit target achievement software.

When the child displays a cashbook screen using the petty cashbook software, a target achievement window is displayed and the progress of deposit achievement is displayed in the graphic form. The deposit data as base for displaying an achievement graph is obtained by reading the data of the electronic bankbook 4.

In addition to the application software related to transactions with the bank, other application software not directly related to the bank business is also prepared.

For example, the child growth recording software allows the user to enter the age, sex, weight and height of each child, as well as the date and time of the measurement. The entered data is stored and accumulated in the application adaptive section 43 of the bank server 5. The application adaptive section 43 analyzes the accumulated growth records of the child, computes data indicating whether the growth of the child is quicker or slower than other general children, and transmits a computed result to the client terminal 7. Further, various advisable information necessary for healthy child growth, such as a proper sleeping time, can also be transmitted to the client terminal 7.

The university examination advice software allows the user to input a test result for each subject and a user's target university.

The user's test result for each subject is held in the application adaptive section 43 of the bank server 5. The application adaptive section 43 analyzes the user's test result for each subject and the progress in attainments to generate, e.g., an advice in studies and a success/failure probability, followed by transmitting them to the client terminal 7.

The menu guidance software receives a cooking menu from the bank server 5 and displays the menu on the display 20. Food materials used for cooking of the menu and the recipe are also transmitted. The menu is stored in the application adaptive section 43 and updated everyday.

There are prepared various sets of menus including one in which an emphasis is placed on preventing diseases of adult people, such as sugar diabetes and hyperpiesia, and another in which an emphasis is placed on a growing child. The user can select desired one of those various sets of menus.

Thus, the bank server 5 additionally provides services that are not directly related to the bank business, but are familiar with the user's daily life.

The above application software has been described by way of example, and any other suitable application software can also be provided to the user.

Application data prepared by the user using the application software 45, such as weight and height data of the child and deposit target data, is held in the temporary storage section 44 and is transmitted to the bank server 5 along with transaction instruction data created by the banking software 46 upon the client terminal 7 logging in to the bank server 5.

Of the data uploaded to the bank server 5, the data related to the bank business, such as the transaction instruction data, is employed in the business service section 41, and the data not related to the bank business but related to the application software 45 is employed in the application adaptive section 43.

In accordance with instructions from the user, the business service section 41 executes various transactions on the user's bank account, such as transferring money to another bank account, crediting an interest in the account, and closing the account.

The application adaptive section 43 creates, e.g., menu data, university examination success/failure judgment data, deposit target achievement data, and child growth recording data corresponding to the application software 45 utilized by the user.

Information regarding various transactions made on the user's bank account by the bank server 5, such as transfer, a direct debit and a credit of interest, and the data created by the application adaptive section 43, while the client terminal 7 is in the off-condition state, are temporarily stored in the temporary storage section 39 and transmitted to the client terminal 7 when the client terminal 7 is connected to the bank server 5.

As described above, upon connection of the client terminal 7 to the bank server 5, the data accumulated in the client terminal 7 is transmitted in batch to the bank server 5, whereas the data accumulated in the bank server 5 is transmitted in batch to the client terminal 7. Through such two-way communication, data in both sides can be updated to the latest one.

Figure 5:
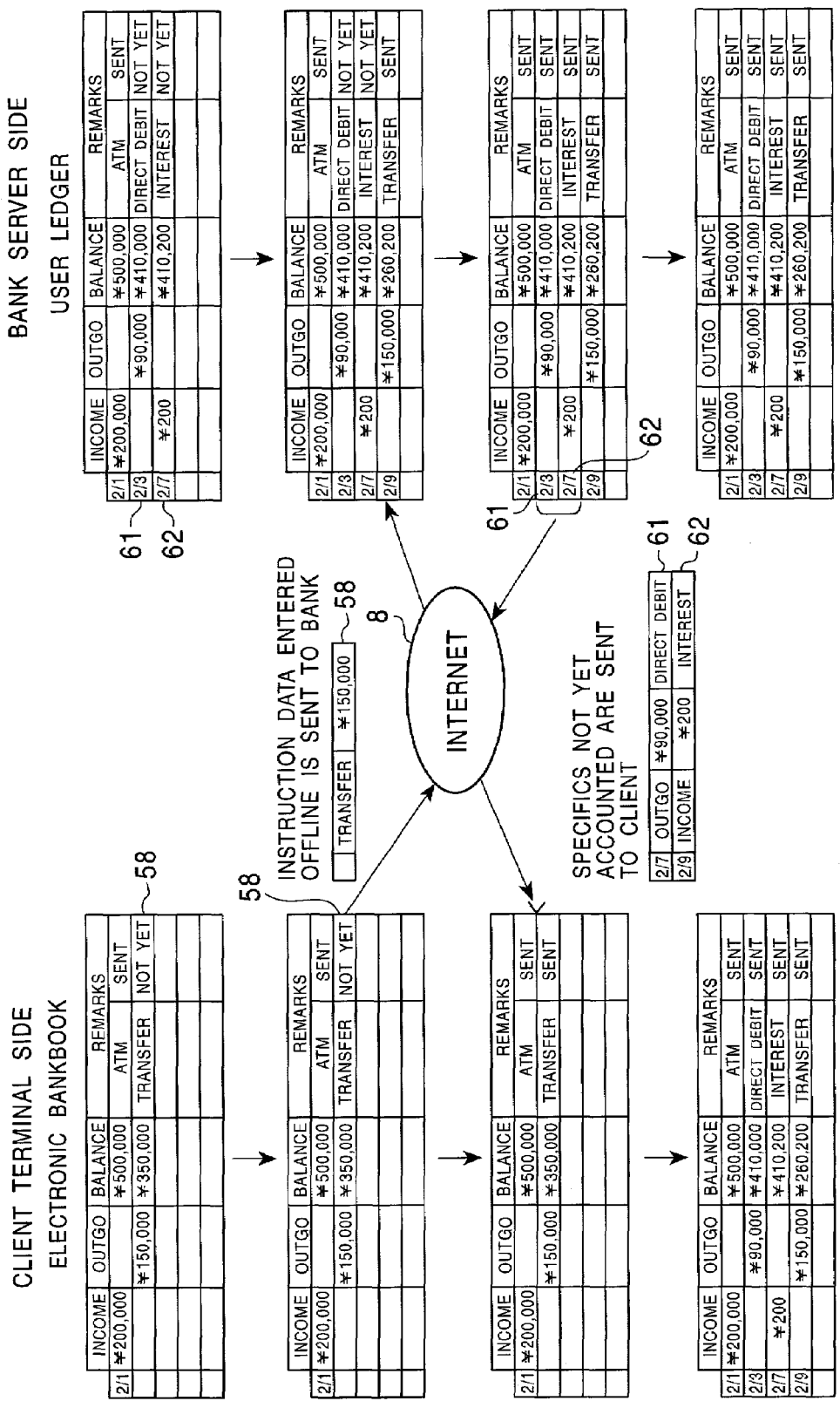
FIG. 5 is a representation schematically showing how respective data accumulated in the client terminal and the bank server are exchanged.
Figure 6:
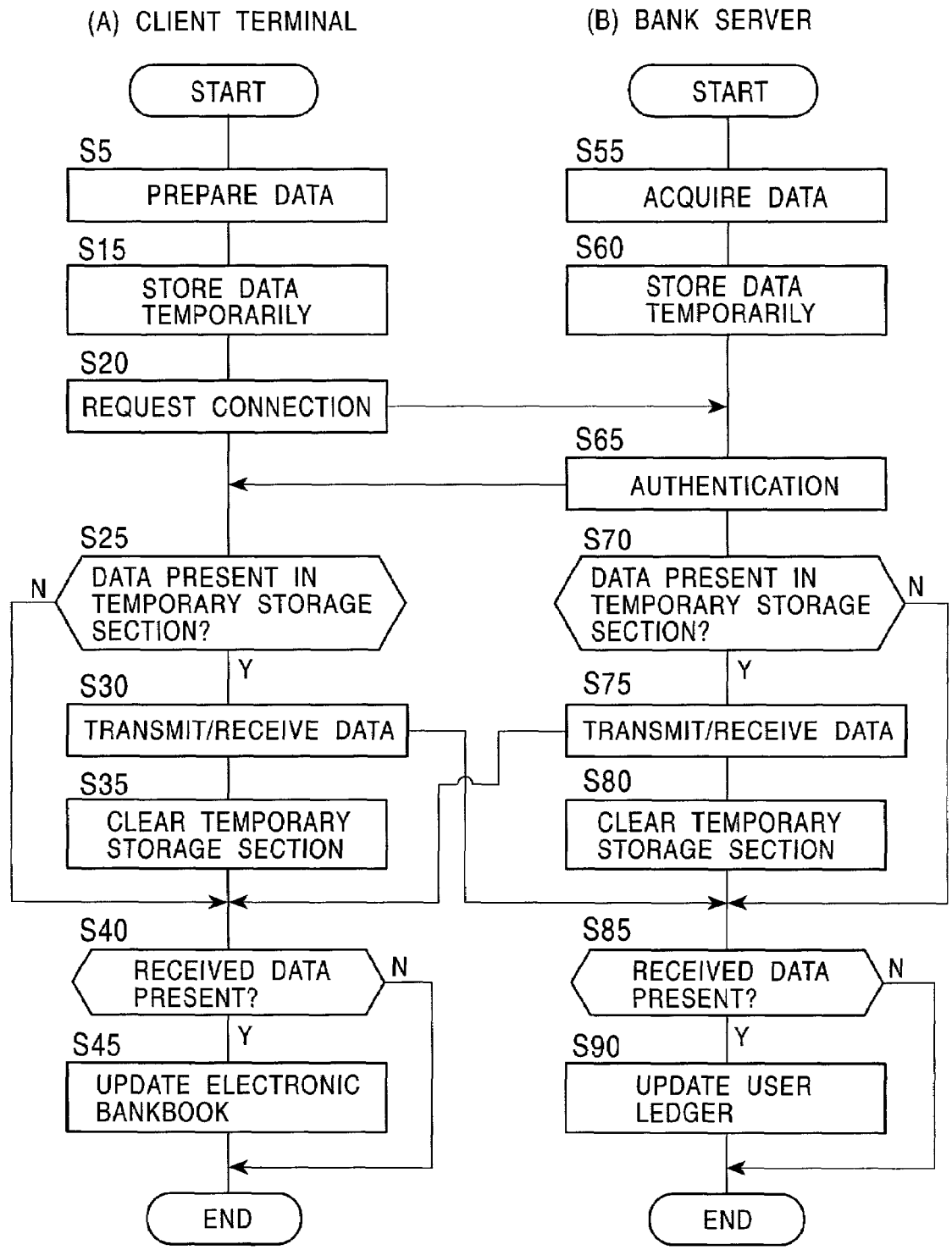

FIG. 5 schematically shows how respective data accumulated in the client terminal 7 and the bank server 5 are exchanged.

The left side in FIG. 5 represents the contents of the electronic bankbook 4 (see FIG. 2) stored in the data storage 2 of the client terminal 7. The electronic bankbook 4 is updated and managed by the banking software 46.

On the other hand, the right side in FIG. 5 represents the contents of the user ledger stored in the data storage 40 (FIG. 3) of the bank server 5.

The uppermost tables in FIG. 5 represent the electronic bankbook 4 and the user ledger before the user logs in to the bank server 5 from the client terminal 7. The lowermost tables in FIG. 5 represent the electronic bankbook 4 and the user ledger after data exchange has been made between the client terminal 7 and the bank server 5 upon the user logging in to the bank server 5.

Second and third tables in FIG. 5 counting from the top represent processes of data exchange between the client terminal 7 and the bank server 5 immediately after the user has logged in to the bank server 5.

In the uppermost electronic bankbook 4, transfer instruction data 58 is not yet transmitted to the bank server 5. This means that transfer instruction data prepared by the user (using the transfer screen displayed by the banking software 46), while the client terminal 7 is in the off-line condition, is stored in the temporary storage section 44.

On the other hand, in the uppermost user ledger, data indicating a direct debit 61 and a credit of interest 62 made to and in the user's bank account is not yet transmitted to the client terminal 7. This means that when those transactions are made on the user's bank account, the business service section 41 creates the data and holds it in the temporary storage section 39.

When the user logs in to the bank server 5 from the client terminal 7, the transfer instruction data 58 held in the temporary storage section 44 of the client terminal 7 is first transmitted to the bank server 5, whereupon the user ledger is updated (see the second table counting from the top). The transfer date is given as the logging-in date.

In this embodiment, it is assumed that the logging-in was made on February 9. Therefore, the transfer instruction data 58 is treated in the user ledger as having executed the transfer on February 9.

The bank server 5 may be provided with the function of receiving transfer instruction data that indicates scheduled date on which transfer is to be executed. In that case, the user designates the predetermined transfer date in future and transmits transfer instruction data including that date to the bank server 5, and the bank server 5 executes the instructed transfer on the designated transfer date.

Then, the bank server 5 transmits the direct debit data 61 and the credit-of-interest data 62, both accumulated in the temporary storage section 39, to the client terminal 7. In accordance with the received direct debit data 61 and credit-of-interest data 62, the client terminal 7 updates the electronic bankbook 4 (see the third table counting from the top).

The date of issuance of the transfer instruction data 58 (i.e., the date of logging-in from the client terminal 7 to the bank server 5) is recorded to be later than the date of execution of the above transactions by the bank server 5. Finally, in the electronic bankbook 4 at the lowermost position in FIG. 5, items are sorted in the order of date.

Thus, each time the user logs in to the bank server 5 from the client terminal 7, the electronic bankbook 4 and the user ledger are both updated to states reflecting the latest data.

In this embodiment, after the data accumulated in the temporary storage section 44 of the client terminal 7 has been transmitted to the bank server 5, the data accumulated in the temporary storage section 39 of the bank server 5 is transmitted to the client terminal 7. However, the present invention is not limited to that arrangement, respective data may be transmitted and received in the order reversed to that mentioned above.

FIGS. 6A and 6B are flowcharts showing operation of two-way communication between the client terminal 7 and the bank server 5 in the first embodiment. FIG. 6A shows operation of the client terminal 7 and FIG. 6B shows operation of the bank server 5.

The operation of the client terminal 7 will first be described with reference to FIG. 6A.

The following operation is executed by the CPU 11 of the client terminal 7 in accordance with the banking software 46.

The user displays a desired screen, such as a transfer screen or an account closing screen, on the display 20 in the off-line condition, and enters data instructing a transaction to be made on the user's bank account in accordance with the displayed screen (step 5). The user also enters data regarding the application software, such as the height of the child in the child growth recording software or test results in the university examination advice software, in the off-line condition.

Then, the CPU 11 stores, in the temporary storage section 44, the transaction instruction data and the application software data both prepared by the user, and holds those data therein (step 15).

When the user logs in to the bank server 5 using the client terminal 7, a connection request is issued from the client terminal 7 to the bank server 5 (step 20). More specifically, the log-in account and the password are entered on the log-in screen displayed on the display 20, and are transmitted to the bank server 5.

After logging in to the bank server 5, the CPU 11 searches whether there is data accumulated in the temporary storage section 44 (step 25).

If data is accumulated in the temporary storage section 44 (Y in step 25), the CPU 11 transmits the accumulated data to the bank server 5 and receives data from the bank server 5 if there is data to be received (step 30).

The temporary storage section 44 is then cleared (step 35).

If no data is accumulated in the temporary storage section 44 (N in step 25), or after the temporary storage section 44 has been cleared in step 35, the CPU 11 confirms whether there is data received from the bank server 5 (the data being stored in the data storage 2) (step 40).

If received data is present (Y in step 40), the electronic bankbook 4 and the database regarding the application software are updated based on the received data (step 45).

If no received data is present (N in step 40), data transmission and reception with respect to the bank server 5 are ended.

Subsequently, the user receives, from the bank server 5, banking service such as confirmation of the account balance and service regarding the application software, while the client terminal 7 and the bank server 5 are kept on-line.

The operation of the bank server 5 will next be described with reference to FIG. 6B.

The following operation is executed by the CPU 29 of the bank server 5 in accordance with the business service software 38.

First, the CPU 29 obtains data of transactions, such as a direct debit and a credit of interest, which have made on the user's bank account (step 55), and holds the acquired data in the temporary storage section 39 (step 60). If there is data regarding the application software to be transmitted to the client terminal 7, that data is also accumulated in the temporary storage section 39.

Then, upon receiving a connection request from the client terminal 7, the CPU 29 instructs the authentication server 6 (see FIG. 1) to make authentication of the user (step 65).

When the user is authenticated by the authentication server 6 and the client terminal 7 logs in to the bank server 5, the CPU 29 confirms whether there is data accumulated in the temporary storage section 39 (step 70).

If data is accumulated in the temporary storage section 39 (Y in step 70), the CPU 29 transmits the accumulated data to the client terminal 7 and receives data from the client terminal 7 if there is data to be received (step 75). Thereafter, the CPU 29 clears the temporary storage section 39 (step 80).

If no data is accumulated in the temporary storage section 39 (N in step 70), or after the temporary storage section 39 has been cleared in step 80, the CPU 29 confirms whether there is data received from the client terminal 7 (the data being stored in the memory device 33) (step 85).

If received data is present (Y in step 85), the user ledger is updated in accordance with the received data (step 90). Also, if data regarding the application software is received, the received data is employed in the application adaptive section 43. In the latter case, for example, user's test results are received and a success/failure probability in university examination is calculated using the received test results.

The first embodiment described above has advantages given below.

The user is able to prepare transfer instruction data on the user's bank account without connecting the client terminal 7 to the bank server 5.

Also, since data transmitted to the bank server 5 can be accumulated in the client terminal 7, plural pieces of data prepared by the user can be transmitted in batch to the bank server 5 upon the user logging in to the bank server 5 from the client terminal 7. It is therefore possible to cut down a connection time of the communication line and to save the communication cost.

Further, a time required for downloading various screen data, such as transfer screen data, from the bank server 5 can be saved.

Each time the user logs in to the bank server 5 from the client terminal 7, data accumulated on both sides are transmitted and received in two-way directions. Hence, whenever the user logs in to the bank server 5, the electronic bankbook 4 and the user ledger can be both updated to states reflecting the latest data.

The client terminal 7 can include the application software 45 operating in linkage with the banking software 46, and therefore the bank can provide services more familiar with users.

In addition, since the bank server 5 is also able to provide, to users, services not directly related to the bank business, access frequency of each user to the bank server 5 can be increased.

While in this embodiment the banking software 46 is described as software dedicated for communicating with the bank server 5, the present invention is not limited to that arrangement. For example, the banking software 46 may also be used to access, e.g., servers of other banks and stock companies or general homepages.

As an alternative, the banking software 46 may be constituted to be linked with general commercially available application software.

Furthermore, as with an ordinary bank server, the user is also able to communicate with the bank server 5 while the client terminal 7 is kept in the state logged in to the bank server 5.

Second Embodiment

A second embodiment will be described below with reference to FIGS. 7 and 8.

A network configuration comprising a bank server 5 and a client terminal 7, a hardware configuration of the bank server 5, and a hardware configuration of the client terminal 7 are the same as those in the first embodiment shown in FIGS. 1, 2 and 3. A description of those configurations is hence omitted here.

Figure 7:
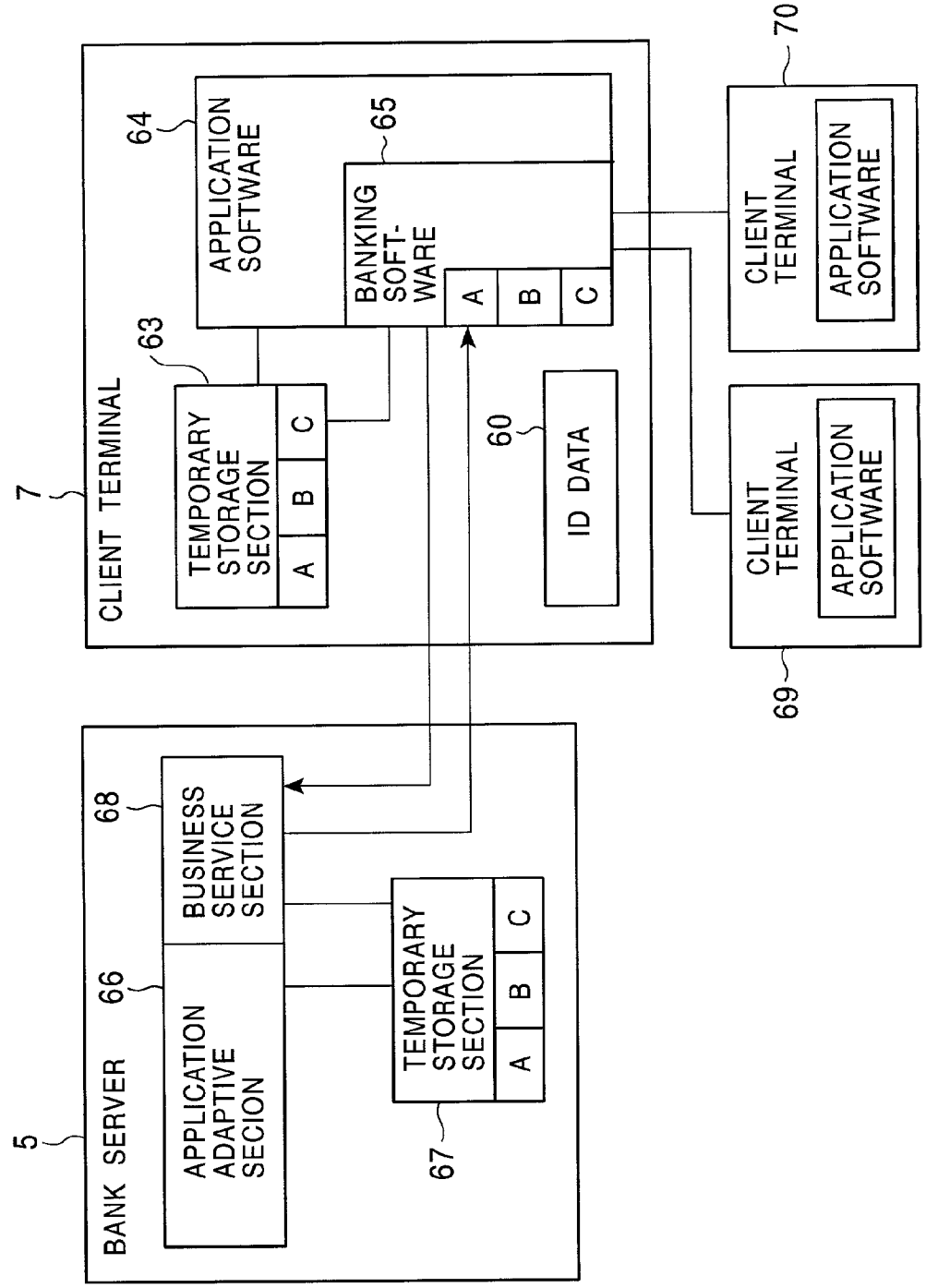
FIG. 7 is a block diagram showing the relationship in data transmission/reception between the bank server and the client terminal in a second embodiment.
Figure 8:
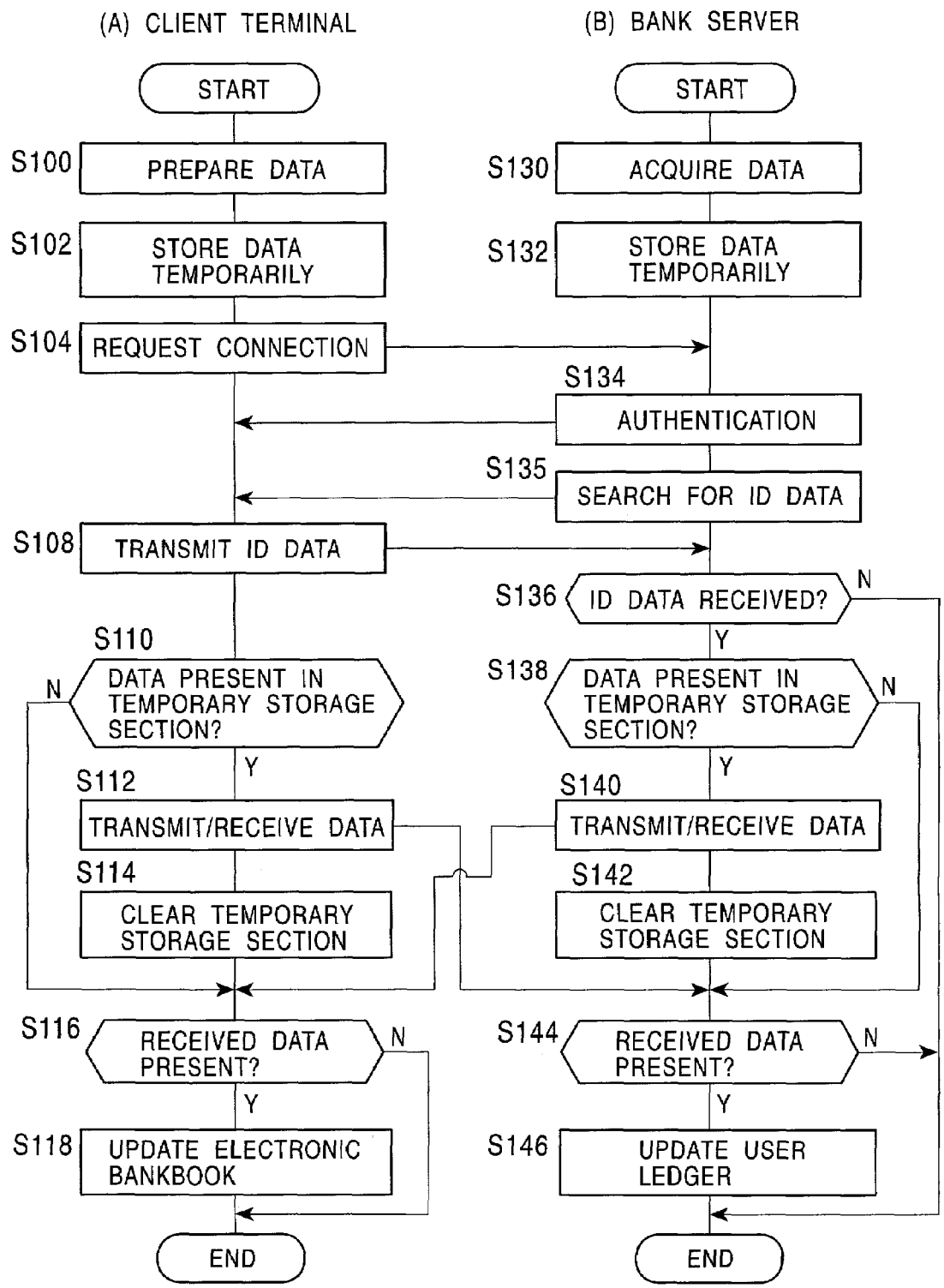

FIG. 7 is a block diagram for explaining the relationship in data transmission/reception between the bank server 5 and the client terminal 7 in the second embodiment.

While in the first embodiment transaction instruction data is accumulated and transmitted/received with respect to one account, the second embodiment is intended to execute a similar operation with respect to multiple accounts.

The second embodiment treats, by way of example, data with respect to three accounts. In FIG. 7, A denotes a father's account, B denotes a mother's account, and C denotes a child's account. Also, it is assumed that the client terminal 7 is a father's terminal, a client terminal 69 is a mother's terminal, and a client terminal 70 is a child's terminal.

A temporary storage section of the client terminal 7 is constituted to be able to accumulate transaction instruction data and application data for each of the three accounts.

For example, when a father is going to transfer money from his own account to another account, he starts banking software 65 up to display a transfer screen on the display 20, and enters the name of the transferee bank, the account number, the amount of money transferred, and other items necessary for the transfer in accordance with the displayed screen.

When the father enters those data while he is not logging in to the bank server 5, the entered data is stored in a storage A of a temporary storage section 63.

Further, when the father prepares data to be uploaded to the bank server 5 using an application 64, e.g., stock investment analyzing software, that data is also stored in the storage A of the temporary storage section 63.

The client terminal 7 is connected to both the client terminal 69 and the client terminal 70 via LAN for communication between them.

When a mother is going to operate the banking software 65, the client terminal 69 is connected to the client terminal 7 using LAN, allowing the mother to operate the banking software 65 from the client terminal 69.

When the mother prepares data instructing a transaction to be made on her account, the prepared data is stored in a storage B of the temporary storage section 63.

The client terminal 69 includes application software for the mother, such as household account-book software. When data prepared by the mother using the application software is uploaded to the bank server 5, the prepared data is sent to the client terminal 7 via the LAN. In the client terminal 7, the received data is stored in the storage B of the temporary storage section 63.

Each user is required to enter a secret number (password) prior to starting to utilize the banking software 65, and is prohibited from making an operation on another user's account.

Also, the banking software 65 identifies each user based on a log-in account entered by the user. Further, an electronic bankbook for each user is stored in the memory device 16 of the client terminal 7.

Similarly, the client terminal 70 for the child is connected to the client terminal 7 via LAN, and data prepared by the child is stored in a storage C of the temporary storage section 63.

While the storages A, B and C are schematically shown in FIG. 7 as being separate from each other, respective data for the father, the mother and the child may be accumulated without being separated from each other by adding, to data headers, information for discriminating which data belongs to which person.

Thus, the data accumulated in the separated form for each of the users is transmitted in batch to the bank server 5 upon one of the users logging in to the bank server 5 from the client terminal 7. Incidentally, the client terminals 69, 70 are connected to the client terminal 7 and then connected to the bank server 5 with the banking software 65.

A business service section 66 of the bank server 5 receives the data transmitted from the client terminal 7 in the separated form for each of the users, and executes respective transactions designated for the individual user's accounts.

The client terminal 7 stores therein ID data 60 for identifying itself from the other client terminals. The ID data 60 is written in the client terminal 7 by the bank server 5 using a cookie or the like.

Upon logging-in from the client terminal 7, the bank server 5 searches for the ID data 60. This search enables the bank server 5 to identify the fact that the log-in has been made from the client terminal 7.

A temporary storage section 67 of the bank server 5 includes a storage A for storing data related to transactions made on the father's account, a storage B for storing data related to transactions made on the mother's account, and a storage C for storing data related to transactions made on the child's account.

The bank server 5 stores data indicating the contents of transactions, which have been made on the user's accounts while the client terminal 7 is not connected to the bank server 5, in the storages A, B and C of the temporary storage section 67 in the separated form for each of the users.

The storages A, B and C also store therein data created by an application adaptive section 68 corresponding to the application software for the individual users.

In the bank server 5, the father's account, the mother's account and the child's account are registered as one group. Also, in the bank server 5, the group and the client terminal, in which account data of the group is accumulated, are stored in a correspondent relation.

Upon logging-in from the client terminal 7, the bank server 5 recognizes the client terminal 7 based on the ID data 60. As a result, the bank server 5 can recognize which group's account data is stored in the recognized client terminal 7.

Then, the bank server 5 acquires the data accumulated in the temporary storage section 63 from the client terminal 7. After acquiring that data, the bank server 5 transmits, data of the accounts belonging to the group, which is accumulated in the temporary storage section 67, in batch to the client terminal 7.

On the other hand, the banking software 65 receives the data transmitted from the bank server 5 and updates respective electronic bankbooks 4 of the father, the mother and the child individually in accordance with the received data.

When any other client terminal than those registered in the bank server 5 attempts to log in to the bank server 5, the bank server 5 does not download the data accumulated in the temporary storage section 67.

Further, data transmitted from the bank server 5 to the application software for the individual users is temporarily held in the client terminal 7 and then downloaded to the client terminals 69, 70 upon connection of the client terminals 69, 70 to the client terminal 7.

Thus, in the second embodiment, information regarding a plurality of accounts and application software for multiple users can be accumulated, and upon one of the users logging in to the bank server 5, it is possible to simultaneously update not only data for the user who has logged in, but also data for the other users.

FIGS. 8A and 8B are flowcharts showing operation of two-way communication between the client terminal 7 and the bank server 5 in the second embodiment. FIG. 8A shows operation of the client terminal 7 and FIG. 8B shows operation of the bank server 5.

The operation of the client terminal 7 will first be described with reference to FIG. 8A.

The following operation is executed by the CPU 11 of the client terminal 7 in accordance with the banking software 64.

Each user employing the client terminal 7 displays a desired screen, such as a transfer screen or an account closing screen, on the display 20 in the off-line condition, and enters data instructing a transaction to be made on the user's bank account in accordance with the displayed screen (step 100). Each user also enters data regarding the application software, such as the height of the child in the child growth recording software or test results in the university examination advice software, in the off-line condition.

Then, the CPU 11 stores, in the temporary storage section 63, the transaction instruction data and the application software data both prepared by each user, and holds those data therein (step 102).

When the user logs in to the bank server 5 using the client terminal 7, a connection request is issued from the client terminal 7 to the bank server 5 (step 104). More specifically, the log-in account and the password are entered on the log-in screen displayed on the display 20, and are transmitted to the bank server 5. When the user logs in to the bank server 5 from the client terminal 69 or 70, the log-in is made through the client terminal 7.

Subsequently, the bank server 5 searches for the ID data 60 stored in the client terminal 7, and the CPU 11 transmits the ID data 60 to the bank server 5 (step 108).

Then, the CPU 11 searches whether there is data accumulated in the temporary storage section 63 (step 110).

If data is accumulated in the temporary storage section 63 (Y in step 110), the CPU 11 transmits the accumulated data to the bank server 5 in batch and receives data from the bank server 5 if there is data to be received (step 112).

The temporary storage section 63 is then cleared (step 114).

If no data is accumulated in the temporary storage section 63 (N in step 110), or after the temporary storage section 44 has been cleared in step 114, the CPU 11 confirms whether there is data received from the bank server 5 (the data being stored in the data storage) (step 116).

If received data is present (Y in step 116), the respective electronic bankbooks of the users and the databases regarding the application software for the users are updated (step 118).

If no received data is present (N in step 116), data transmission and reception with respect to the bank server 5 are ended.

Subsequently, the user receives, from the bank server 5, banking service such as confirmation of the account balance and service regarding the application software, while the client terminal 7 and the bank server 5 are kept on-line.

The operation of the bank server 5 will next be described with reference to FIG. 8B.

The following operation is executed by the CPU 29 of the bank server 5 in accordance with the business service software 38.

First, the CPU 29 obtains data of transactions, such as a direct debit and a credit of interest, which have been made on the bank accounts of the individual users registered in the client terminal 7 (step 130), and holds the acquired data in the temporary storage section 67 (step 132). If there is data regarding the application software to be transmitted to the client terminal 7, that data is also accumulated in the temporary storage section 67.

Then, upon receiving a connection request from the client terminal 7, the CPU 29 instructs the authentication server 6 (see FIG. 1) to make authentication of the user (step 134).

Subsequently, the CPU 29 searches for the ID data 60 in the client terminal 7 (step 135).

If the bank server 5 does not acquire the ID data 60 from the client terminal 7 (N in step 136), this means that the client terminal connected to the bank server 5 is one other than the client terminal 7. Hence, the bank server 5 does not perform data transmission and reception with respect to the connected client terminal.

When the ID data 60 is received from the client terminal 7 (Y in step 136), the CPU 29 confirms whether there is data accumulated in the temporary storage section 67 (step 138).

If data is accumulated in the temporary storage section 67 (Y in step 138), the CPU 29 transmits the accumulated data to the client terminal 7 and receives data from the client terminal 7 if there is data to be received (step 140). Thereafter, the CPU 29 clears the temporary storage section 67 (step 142).

If no data is accumulated in the temporary storage section 67 (N in step 138), or after the temporary storage section 67 has been cleared in step 142, the CPU 29 confirms whether there is data received from the client terminal 7 (the data being stored in the memory device) (step 144).

If received data is present (Y in step 144), respective user ledgers are updated in accordance with the received data (step 146). Also, if data regarding the application software is received, the received data is employed in the application adaptive section 66.

The second embodiment described above has advantages given below.

The advantages resulting from the feature that the user can operate the client terminal 7 off-line are the same as those in the first embodiment. In addition, the following advantages are obtained which are resulting from the feature that a plurality of users are able to utilize the client terminal 7.

When a plurality of users utilize the client terminal 7, respective bank accounts of the users can be managed such that the users are surely avoided from interfering with each other.

Further, respective data for the users utilizing the client terminal 7 are updated in batch when one of the users logs in to the bank server 5.

While in the second embodiment the banking software 65 is installed in the client terminal 7 and the client terminals 69, 70 log in to the bank server 5 through the client terminal 7, the present invention is not limited to that arrangement. For example, the client terminals 69, 70 and any other suitable client terminal may be constituted to be able to log in to the bank server 5 directly. In that case, since the bank server 5 can recognize the client terminal 7 based on the ID data 60, the bank server 5 downloads the data accumulated in the temporary storage section 67 only upon logging-in from the client terminal 7.

Third Embodiment

A third embodiment will be described below with reference to FIGS. 9 to 11.

The second embodiment represents the case in which a father, a mother and a child have their own independent accounts in the bank server 5, the third embodiment represents the case in which a father's account, a mother's account, a child's account, etc. are virtually set for one account.

A network comprising a client terminal 7 and a bank server 5, the client terminal 7, and the bank server 5 have the same configurations as those in the first embodiment shown in FIGS. 1, 2 and 3. A description of those configurations is hence omitted here.

Also, in this third embodiment, a plurality of accounts are treated in the same manner as in the second embodiment except that a plurality of virtual accounts are generated from one account and crediting/debiting between the virtual accounts is discriminated from crediting/debiting between the one account and another account.

More specifically, each of the temporary storage section 63 of the client terminal 7 and the temporary storage section 67 of the bank server 5 (see FIG. 7) has storages A, B and C for virtual accounts A, B and C.

When the client terminal 7 logs in to the bank server 5 to make a transaction on one of the virtual accounts, the client terminal 7 transmits data accumulated in the temporary storage section 63 to the client terminal 7, whereas the bank server 5 transmits data accumulated in the temporary storage section 67 to the client terminal 7. In accordance with the data received from the bank server 5, the client terminal 7 updates the electronic bankbooks 4 corresponding to the virtual accounts.

Figure 9:
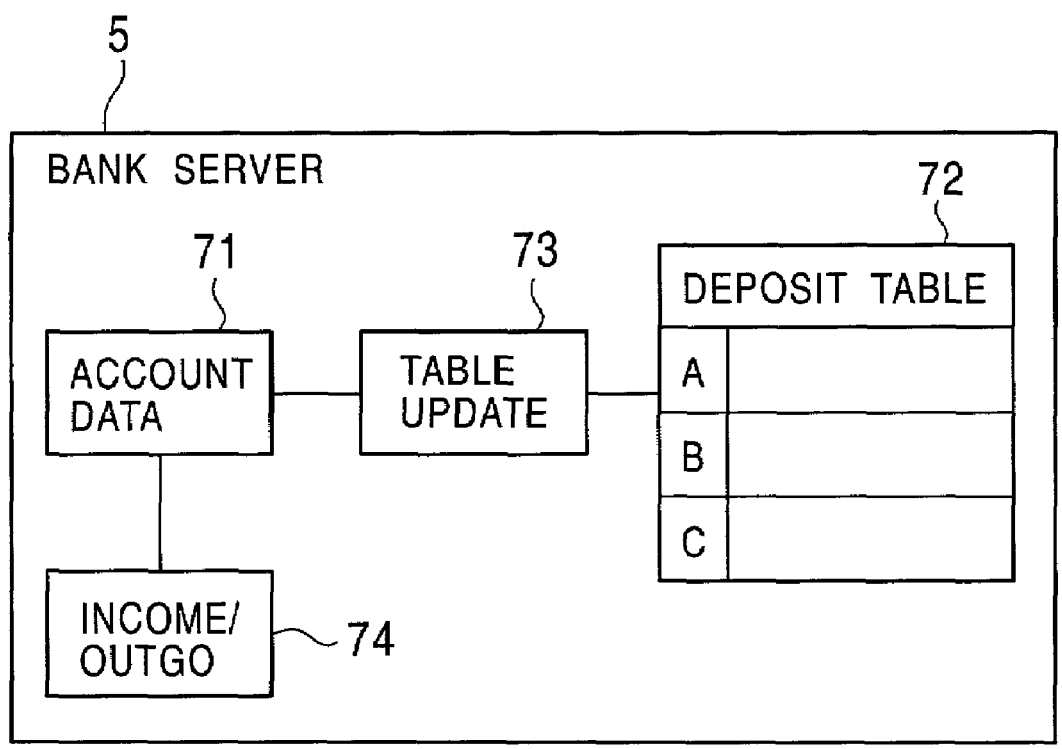
FIG. 9 is a block diagram for explaining the case of setting virtual accounts in the bank server.

FIG. 9 is a block diagram for explaining the case of setting virtual accounts in the bank server 5.

In FIG. 9, three virtual accounts A, B and C are set for one account 71. The account numbers of the virtual accounts are discriminated by adding respective branch numbers to the account number of the one account. For example, assuming that the account number of the one account is 1234, the account number of the virtual account A is assigned with 1234-00, the account number of the virtual account B is assigned with 1234-01, and the account number of the virtual account C is assigned with 1234-02.

The data in the one account 71 represents the total of deposit amounts in a plurality of virtual accounts set in association with the one account.

The individual amounts of money deposited in the virtual accounts belonging to the one account are stored in a deposit table 72. For example, assuming that 1,000,000 yen is deposited in the one account, the account data 71 is given by 1,000,000 yen. Then, a breakdown of 1,000,000 yen is stored in the deposit table 72 for each of the virtual accounts A, B and C such that the virtual account A gives 500,000 yen, the virtual account B gives 300,000, and the virtual account C gives 200,000.

A table update section 73 is a module for updating the balances stored in the deposit table 72 corresponding to transfer between the virtual accounts or transfer from the virtual account to another bank account.

An income/outgo section 74 is a module for updating the account data 71 when money is transferred from one of the virtual accounts to another bank account.

It is assumed, for example, that one account is set for a family and each of family members (father, mother, daughter, and son younger than the daughter) has a virtual account.

When money is transferred between the virtual accounts set in association with the one account, e.g., in the case in which the father allows his son some little money by transfer, the table update section 73 updates the deposit table 72. In that case, the income/outgo section 74 does not update the account data 71, and the deposit amount in the one account is not changed.

Also, when money is transferred from one of the virtual accounts to another bank account, e.g., in the case in which the father transfers the price for purchasing a car to an account of an automobile dealer company, the income/outgo section 74 subtracts the amount of money transferred from the account data 71, and the table update section 73 subtracts the amount of money transferred from the balance of that virtual account.

Further, when a certain amount of money is transferred to one of the virtual accounts from another bank account, the transferer adds the branch number to the transferee's account number so that the bank server 5 can recognize based on the branch number in which one of the virtual accounts transferred money is to be credited.

For example, when a salary is transferred to the father's virtual account, the income/outgo section 74 updates the account data 71 and the table update section 73 updates the deposit table 72.

Thus, by setting a plurality of accounts in association with one account, it is possible to provide services such as discounting a transfer charge between the virtual accounts from that between ordinary accounts, and obtaining money from another virtual account when the balance in one of the virtual accounts becomes minus.

Figure 10:
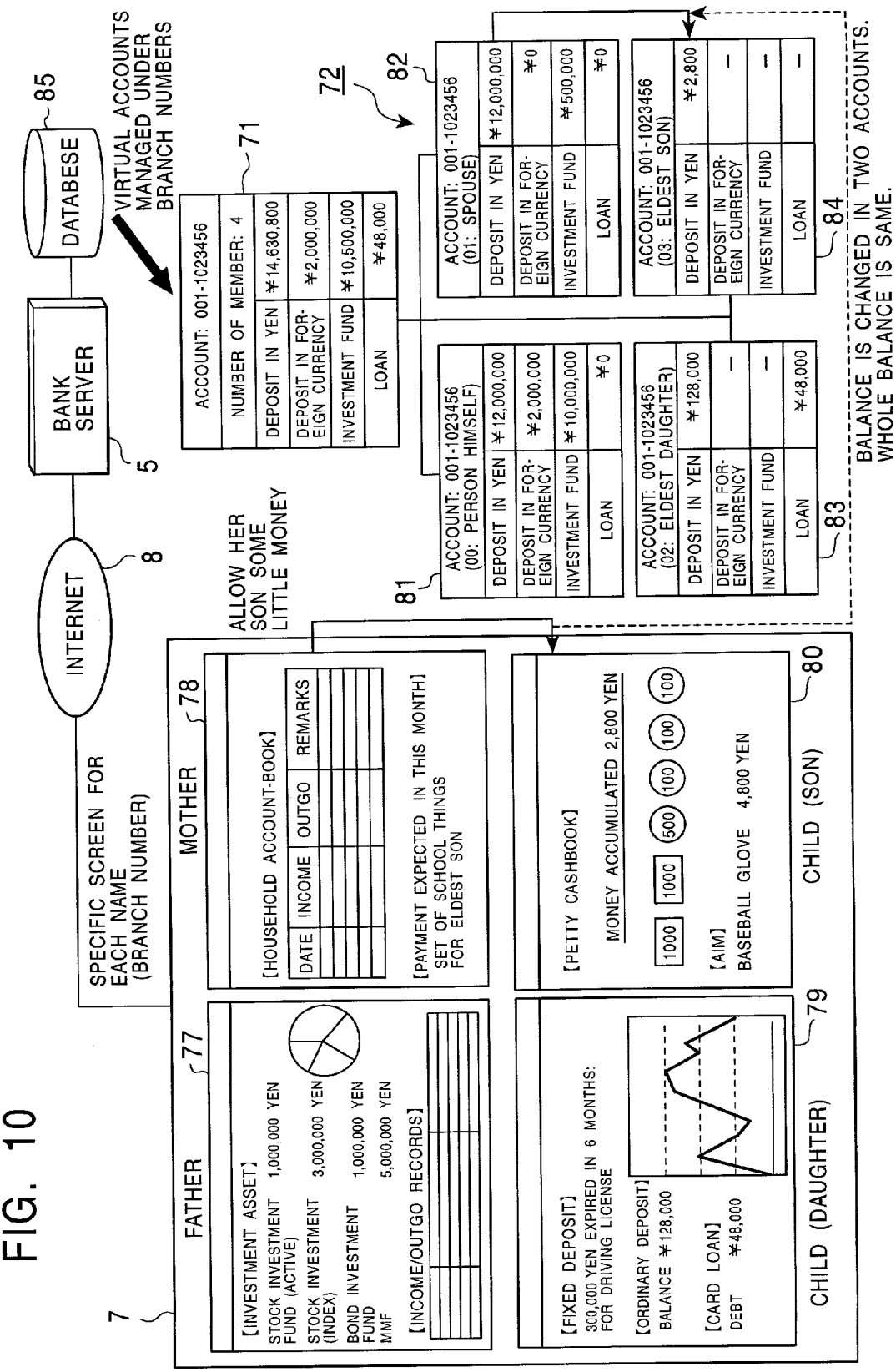
FIG. 10 is a representation schematically showing movement of money between virtual accounts when a mother allows her son some little money.

FIG. 10 schematically shows movement of money between the virtual accounts when the mother allows her son some little money.

The following description is made, by way of example, in connection with the case in which one account is opened for a family and each of family members (father, mother, daughter, and son younger than the daughter) has a virtual account.

The client terminal 7 displays a screen formed by the application software 64 (FIG. 7) that is set beforehand for each of the family members. For example, the father utilizes investment property software 77, the mother utilizes household account-book software 78, the daughter utilizes deposit analyzing software 79, and the son utilizes petty cashbook software 80.

The bank server 5 has a database 85 for managing respective deposit data of the accounts, and the deposit table 72 recording the account data 71 for the family and details of the individual virtual accounts is stored in the database 85.

The balances in the virtual accounts for the father, the mother, the daughter and the son are stored in tables 81, 82, 83 and 84, respectively.

It is now assumed that the mother transfers 2,800 yen to the son's account. On the transfer screen displayed by the banking software 65, the mother enters the family account number added with the branch number assigned to the son, as the transferee account number, and further enters 2800 as an amount of money transferred.

The entered transfer instruction data is stored in the temporary storage section 63. The transfer instruction data stored in the temporary storage section 63 is transmitted to the bank server 5 upon one of the family members logging in to the bank server 5 from the client terminal 7.

The bank server 5 recognizes the transmitted transfer instruction data as indicating transfer between the virtual accounts, and instructs the table update section 73 to subtract 2,800 yen from the balance of the deposit in yen denoted in the mother table 82 and to add 2,800 yen to the balance of the deposit in yen denoted in the son table 84. In this case, since money is transferred as a deposit exchange within the deposit table 72, the account data 71 is not changed.

Figure 11:
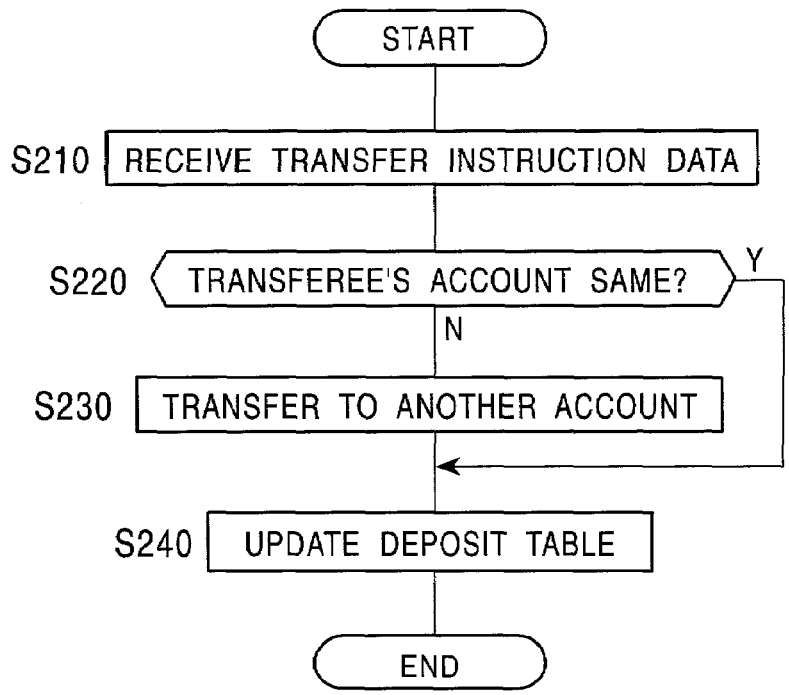
FIG. 11 is a flowchart for explaining operation of the bank server executed when transfer instruction data is received by the bank server.

FIG. 11 is a flowchart for explaining operation of the bank server 5 executed in the third embodiment when transfer instruction data is transmitted to the bank server 5.

First, the bank server 5 receives transfer instruction data from the client terminal 7 (step 210).

Then, the bank server 5 determines whether the received transfer instruction data indicates transfer between the virtual accounts belonging to the one account or transfer from one virtual account to another bank account (step 220).

If the transfer instruction data indicates transfer between the virtual accounts belonging to the one account (Y in step 220), the table update section 73 updates the deposit table 72 (step 240).

If it indicates transfer from one virtual account to another bank account (N in step 220), the income/outgo section 74 updates the account data 71 after transfer from the one account, to which the virtual account belongs, to another bank account (step 230), and then the table update section 73 updates the deposit table 72 (step 240).

In the third embodiment described above, one account is opened for a plurality of persons, e.g., members of a family, and specifics of transactions for the individual members are managed as the balances in respective virtual accounts set in association with the one account.

Therefore, users can utilize the bank server 5 with a feeling similar to that in using a purse through services such as discounting a transfer charge between the virtual accounts for easier movement of deposit between the virtual accounts, and lending/borrowing a deposit between the virtual accounts.

As a result of users utilizing the bank server 5 with a feeling similar to that in using a purse, it becomes a daily work to access the bank server 5 from users.

Also, when a child is living far away from a home, money can be more easily sent to the child. Further, when a child is in short of money during travel, the child can easily borrow money from a family account.

Additionally, transactions made on accounts for family members can be processed in batch upon one of the family members connecting the bank server.

Fourth Embodiment

A fourth embodiment will be described below with reference to FIGS. 12 and 13.

As seen from expanding use of cellular phones, for example, terminal devices have been personalized more and more recently. Such a trend is put into practice, by way of example, such that one base unit connected to the Internet is installed at home and a portable terminal capable of being freely carried within a house is connected to the base unit via wireless LAN. Any of family members is able to employ the portable terminal and to utilize it as a personal unit specific to each family member.

Figure 12:
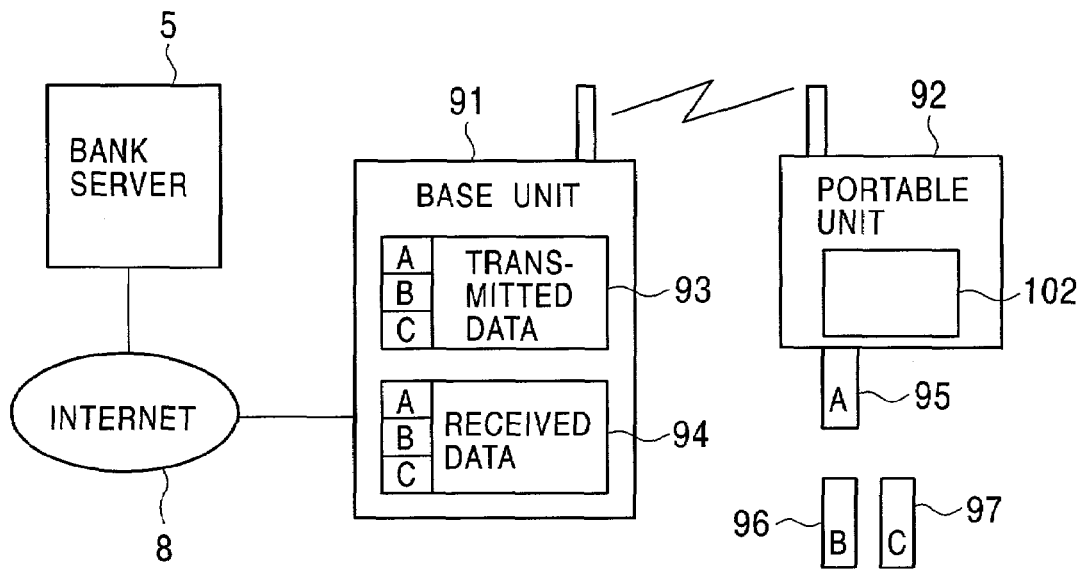
FIG. 12 is a block diagram showing one example of configuration of a system according to a third embodiment.

FIG. 12 shows one example of configuration of a system according to a fourth embodiment.

A bank server 5 and the Internet 8 have the same configurations as those in the second embodiment.

A client terminal comprises a base unit 91 and a portable unit 92.

The base unit 91 is installed at home, for example, and is connected to the Internet 8. The portable unit 92 is a small-size and light-weight unit and can be freely carried with users. The base unit 91 and the portable unit 92 are capable of communicating with each other in a wireless way.

The base unit 91 has terminal ID data as with the client terminal 7 in the second embodiment, and the bank server 5 can recognize the base unit 91 distinctively from other client terminals.

The base unit 91 is able to communicate with the bank server 5 via the Internet 8.

The base unit 91 includes a transmitted-data temporary storage section 93 for storing and accumulating transmitted data for each account, and a received-data temporary storage section 94 for storing and accumulating received data that has been transmitted from the bank server 5 upon one of the users logging in to the bank server 5 using the base unit 91.

The portable unit 92 has a display 102. The display 102 is in the form of a touch panel. The user can obtain information displayed on the display 102, and can enter various data from the portable unit 92 by touching a desired location on the display with a touch pen or a finger.

The display 102 is provided with a memory attachment portion in the form of a slot, and each user can attach a personally owned memory 95 to the memory attachment portion.

Figure 13:
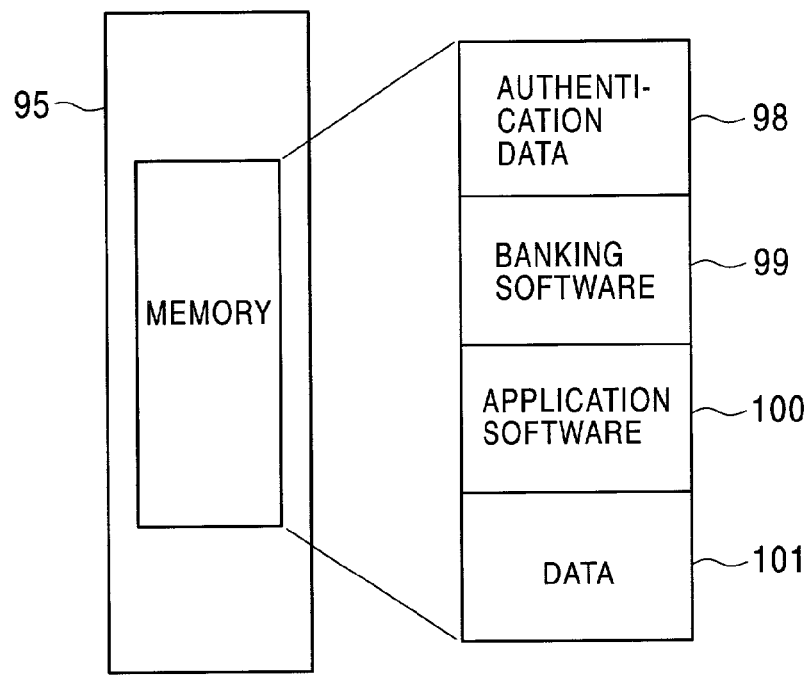
FIG. 13 is an illustration schematically showing a memory configuration.

The memory 95 is a nonvolatile memory formed by a semiconductor, and is constituted as shown in FIG. 13.

More specifically, the memory 95 stores therein, e.g., authentication data 98 used by an authentication server 6 (see FIG. 1) for user authentication, banking software 99 for communicating with the bank server 5, application software 100 such as household account-book software and petty cashbook software, and data 101 for use in the electronic bankbook 4 and the application software 100.

The portable unit 92 in FIG. 12 includes a CPU. When the memory 95 is attached to the portable unit 92, the banking software 99 and the application software 100 both stored in the memory 95 can be booted up in the portable unit 92.

Further, memories are prepared in a one-to-one relation to users. For example, the memory 95 is allocated for an account A, a memory 96 is allocated for an account B, and a memory 97 is allocated for an account C. Each user can utilize the portable unit 92 as a personally dedicated terminal by attaching his or her own memory to the portable unit 92. Additionally, each memory is set such that it is allowed to access only a predetermined account.

Figure 14:
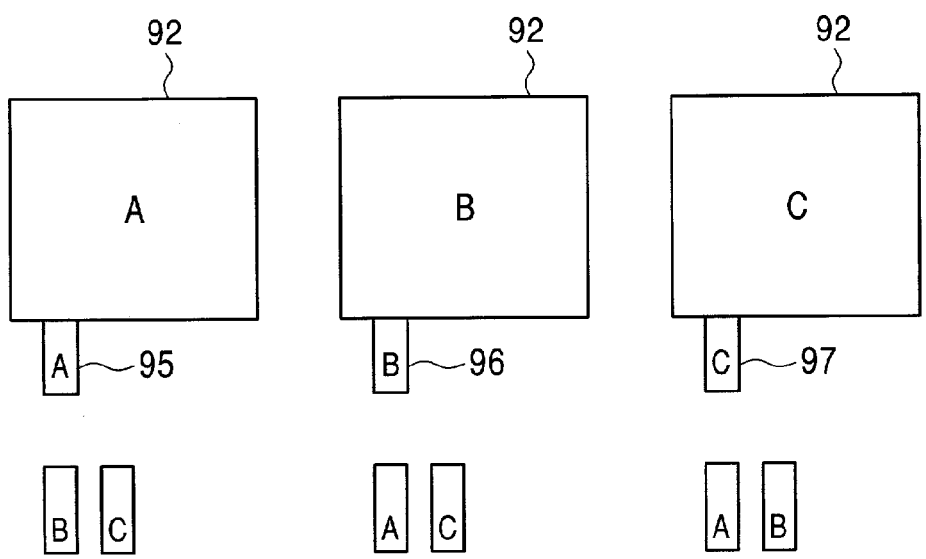
FIG. 14 is an illustration schematically showing that a portable unit serves as a dedicated terminal.

FIG. 14 schematically shows that the portable unit 92 serves as a dedicated terminal.

By attaching the memory 95 to the portable unit 92, the portable unit 92 operates as a terminal dedicated for the owner of the memory 95 accessible to the account A. Likewise, by attaching the memory 96 or 97 to the portable unit 92, the portable unit 92 operates as a terminal dedicated for the owner of the memory 96 or 97 accessible to the account B, C.

For example, a father can bring the portable unit 92 to his study, and after attaching his memory to the portable unit 92, can operate it as his own dedicated terminal for receiving investment fund service. A child can bring the portable unit 92 to his or her room, and after attaching his or her memory to the portable unit 92, can operate it to function as a petty cashbook. A mother can attach her memory to the portable unit 92 in a living room and can enter data in a household account-book.

Thus, when each user attaches his or her memory to the portable unit 92, a terminal dedicated for the user is realized at user's hand.

When one of the users prepares instruction data, e.g., a transfer instruction, on his or her account using the portable unit 92 shown in FIG. 12, the instruction data is transmitted to the base unit 91 via wireless communication and accumulated in the transmitted-data temporary storage section 93.

Similarly, instruction data entered by another user from the portable unit 92 is also held in the transmitted-data temporary storage section 93.

Then, upon one of the users logging in to the bank server 5 via the base unit 91, the base unit 91 transmits the instruction data accumulated in the transmitted-data temporary storage section 93 to the bank server 5.

On the other hand, after receiving the instruction data from the base unit 91, the bank server 5 transmits, to the base unit 91, information regarding transactions having been made on the accounts that are registered in the base unit 91.

The base unit 91 stores and holds the data received from the bank server 5 in the received-data temporary storage section 94.

The received data stored in the received-data temporary storage section 94 is transmitted to the portable unit 92 when the memory is attached to the portable unit 92 and data is communicated between the portable unit 92 and the base unit 91. The received data is further transmitted from the portable unit 92 to the attached memory, whereby data of the electronic bankbook 4, etc. stored in the memory is updated.

For example, by attaching the memory 95 to the portable unit 92 and establishing communication between the portable unit 92 and the base unit 91, the received data stored in an area A of the received-data temporary storage section 94 in the base unit 91 is transmitted to the portable unit 92. Then, the received data is sent from the portable unit 92 to the memory 95, whereby the data 101 in the memory 95 is updated.

With the fourth embodiment described above, each user can log in to the bank server 5 via wireless communication using the portable unit 92.

Also, each user can be assigned with a memory including the authentication data 98, the banking software 99, the application software 100, and the data 101.

By attaching the memory to the portable unit 92, the portable unit 92 can be realized as a terminal to provide a personal environment dedicated for one relevant user.

Since a personal terminal can be handily realized for each of plural users, there is no need of installing a client terminal occupying a relatively large installation space.

Further, since transmitted-data is accumulated in the transmitted-data temporary storage section 93, the user can prepare instruction data for the bank server 5 in the off-line condition.

Since data received from the bank server 5 is held in the received-data temporary storage section 94, the user can update data in his or her memory by setting the memory to the portable unit 92 and establishing communication with the base unit 91.

Fifth Embodiment

A fifth embodiment of the present invention will be described below in detail with reference to FIGS. 15 to 22. A network configuration comprising a bank server 5 and a client terminal 7, a hardware configuration of the bank server 5, and a hardware configuration of the client terminal 7 are the same as those in the first embodiment shown in FIGS. 1, 2 and 3. A description of those configurations is hence omitted here.

Figure 15:
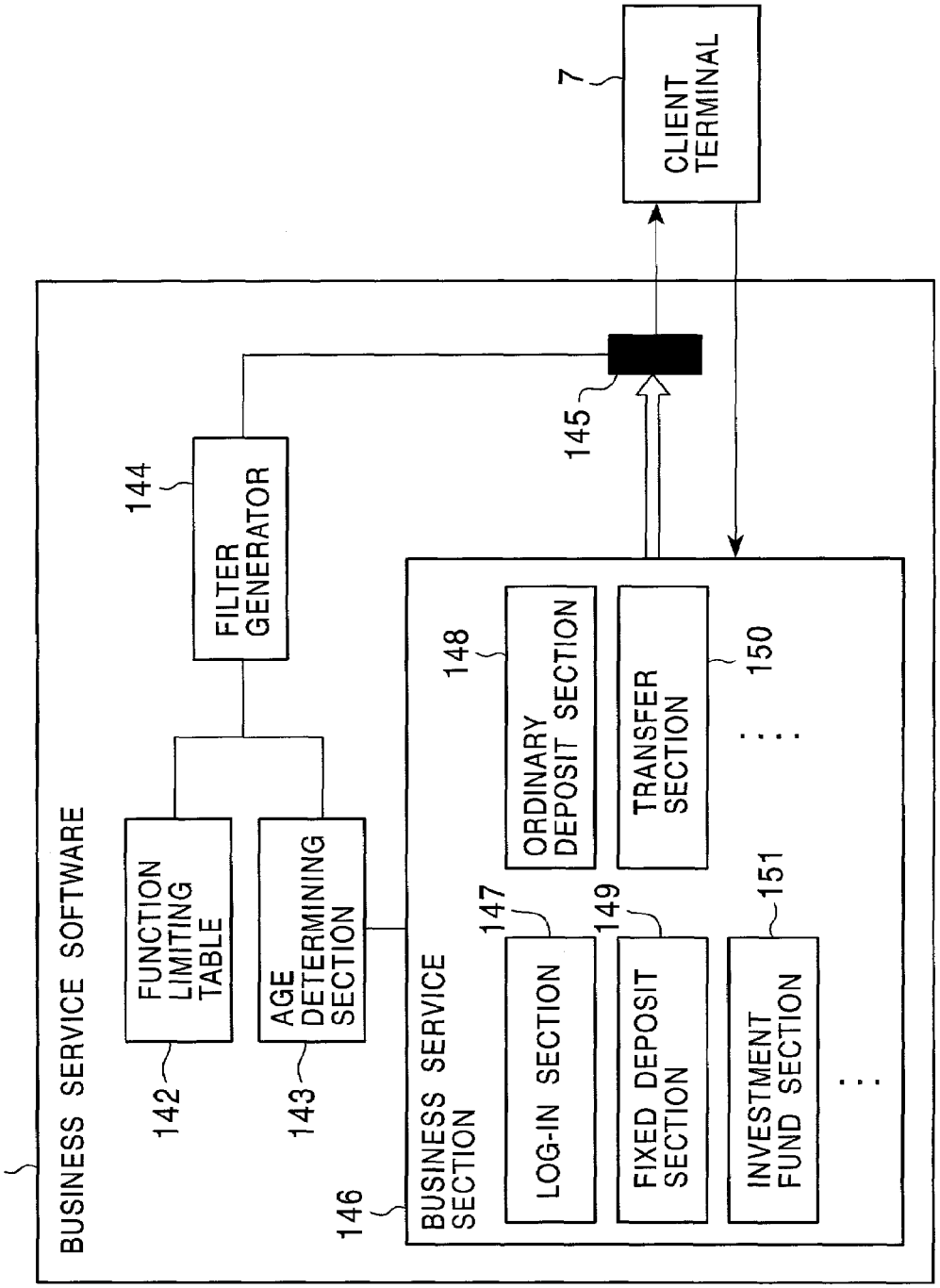
FIG. 15 is a block diagram schematically showing one example of configuration of business service software.
Figure 22:
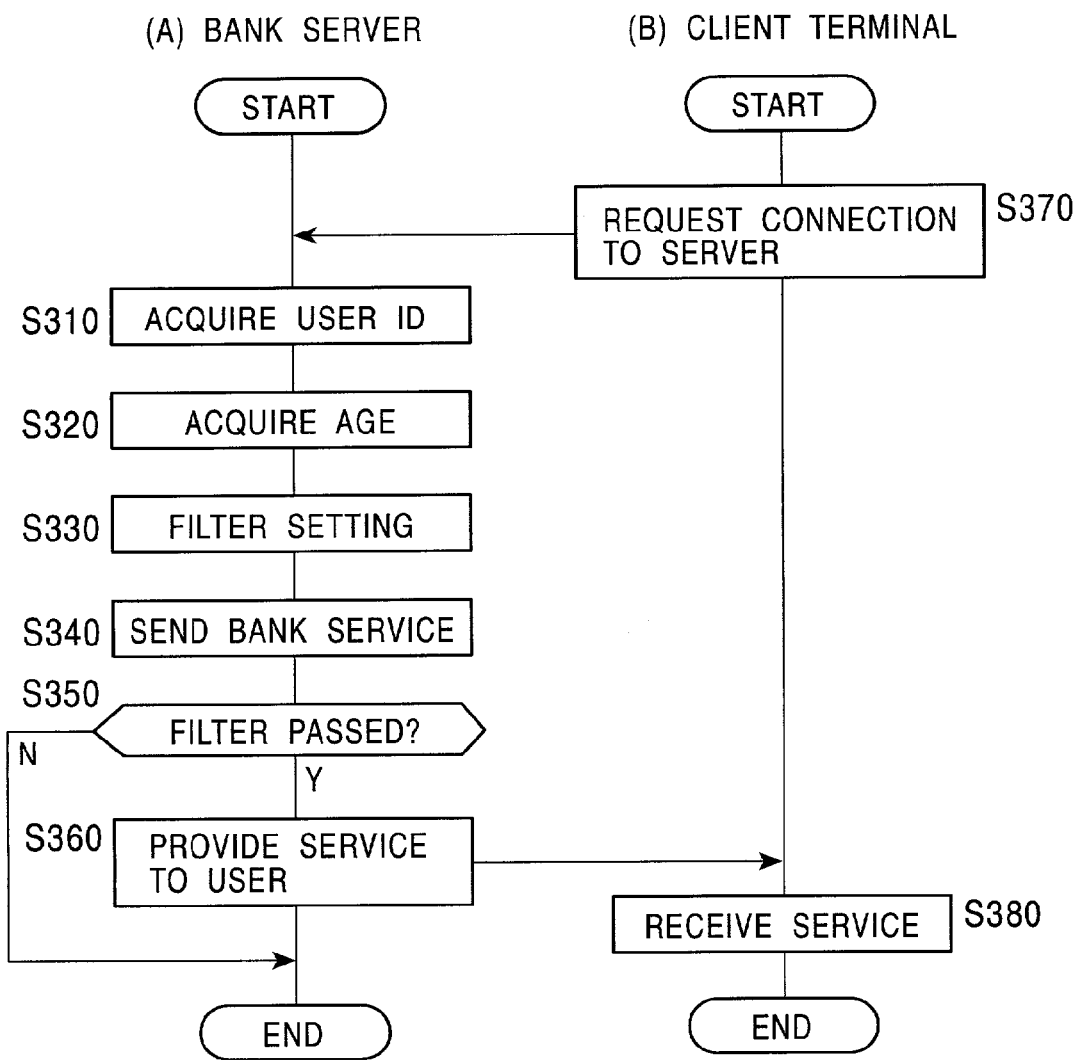

FIG. 15 is a block diagram for explaining an outline of module configuration of business service software 38.

A business service section 146 includes various modules for providing banking services, the modules being classified depending on service types.

A log-in section 147 is a module operated when the user logs in to the bank server 5. The log-in section 147 cooperates with the authentication server 6 and performs authentication of the user who is going to log in to the bank server 5.

When logging in to a bank system (constituted by the bank server 5 and the authentication server 6), the user issues a connection request to the bank server 5. In response to the connection request, the log-in section 147 displays a log-in screen on the client terminal 7, and acquires a user's log-in account and password that are entered by the user.

The bank server 5 transmits the user's log-in account and password to the authentication server 6 (see FIG. 1).

When both the log-in account and the password are authenticated by the authentication server 6, the user is allowed to log in to the bank server 5. Also, the authentication server 6 has a table including passwords and user IDs in a correspondent manner so that the user ID of the user who has logged in to the bank server 5 can be specified.

The log-in section 147 has the function of receiving the user ID from the authentication server 6 and then transmitting it to an age determining section 143 upon the user logging in to the bank system.

Also, the age determining section 143 has the function of determining the user's age from the user ID.

An ordinary deposit section 148 is a module for providing, to each user, banking services to show data so that the user can confirm the balance of the user's account, specifics of incomes/outgoes, and so on.

The ordinary deposit section 148 displays an account balance screen, an income/outgo specifics screen, etc. on a display 20 (see FIG. 2) of the client terminal 7.

Those displayed data are obtained from data recorded in a not-shown client (user) ledger (i.e., a database in which transactions made on the user's account, such as transfer and a direct debit, and changes of the account balance are recorded).

A fixed deposit section 149 is a module for providing, to each user, banking services such as opening a fixed deposit account, closing a fixed deposit account, and showing specifics of fixed deposit.

For providing those banking services, the fixed deposit section 149 displays a fixed-deposit-account opening account screen, a fixed-deposit-account opening account screen, a fixed deposit specifics screen, etc. on the display 20 of the client terminal 7. The user can open and close the account by entering necessary items in predetermined column of corresponding ones of those displayed screens, and then transmitting the entered items to the bank server 5.

A transfer section 150 is a module for providing transfer service from the user's bank account to another bank account. The transfer section 150 displays a transfer screen on the display 20 of the client terminal 7. The user enters the name of the transferee bank, the account number, the amount of money transferred, etc. on the displayed transfer screen, and transmits those data to the bank server 5. In accordance with the data received from the user, the transfer section 150 executes a transfer transaction.

Additionally, the transfer section 150 is also able to present user records to the user, and to reserve transfer or cancel reserved transfer in accordance with an instruction from the user.

An investment fund section 151 is a module for selling investment funds to users. With the aid of the investment fund section 151, the user can, for example, purchase investment funds, sell investment funds, confirm trading records, and confirm specifics of investment funds possessed by the user.

The investment fund section 151 displays respective screens corresponding to those services on the display 20 of the client terminal 7.

More specifically, each of the above-mentioned screens displayed by the bank server 5 on the display of the client terminal 7 is displayed such that the bank server 5 transmits a file in the HTML format, which defines each screen, to the client terminal 7 and a CPU 11 (see FIG. 2) of the client terminal 7 displays the transmitted file, as a corresponding screen, using a browser 21 (see FIG. 2).

The age determining section 143 acquires, from the log-in section 147, the user ID of the user who has logged in to the bank server 5, and determines the user's age. It then outputs the determined age to a filter generator 144.

FIG. 16 shows an age table 155 contained in the age determining section 143.

The age table 155 has a user ID column 156, a date-of-birth column 157, and an age column 158.

The user ID column 156 records user IDs of all users registered in the authentication server 6. The date-of-birth column 157 records the dates of birth of users corresponding to the user IDs in the user ID column 156. The date of birth of each user is submitted to the bank side at the time of user registration. While the user's age is used as a user attribute in this embodiment, any other suitable attribute may also be used. In that case, the user submits such an attribute to the bank side at the time of user registration.

The age column 158 records the ages of individual users at that time, which are calculated by the age determining section 143 from the dates of birth of the users.

Upon acquiring the user ID from the log-in section 147, the age determining section 143 searches the user ID column 156 based on the acquired user ID.

After searching for that user ID, the age determining section 143 acquires the user's age from the corresponding age column 158. Then, the age determining section 143 outputs the acquired user's age to the filter generator 144.

A function limiting table 142 (FIG. 15) stores kinds of banking services that are available for users depending on ages.

FIG. 17 shows the contents of the function limiting table 142.

An age column 161 records ranges of the user's ages. In this embodiment, the user's age is divided into four ranges, by way of example, of from 6 to 11, from 12 to 14, from 15 to 17, and 18 or over.

An ordinary deposit column 62, a fixed deposit column 63, a transfer column 64, and an investment fund column 65 stores whether the service is available or not for each of the age ranges.

In FIG. 17, mark ○ means that the service is available, and mark x means that the service is not available.

As shown in FIG. 17, users with ages of 6 to 11 can receive only ordinary deposit service from the bank server 5.

Users with ages of 12 to 14 can receive ordinary deposit service and fixed deposit service from the bank server 5.

Users with ages of 15 to 17 can further receive transfer service from the bank server 5.

Users with ages of 18 or over are not subjected to any limitation in available service and can further receive investment fund service from the bank server 5.

The filter generator 144 acquires the user's age from the age determining section 143. Then, it searches the function limiting table 142 based on the acquired user's age and designates one or more kinds of banking services available for the relevant user.

The filter generator 144 generates a filter 145 using information designating one or more kinds of banking services available for the user, which is acquired from searching the function limiting table 142.

The filter 145 is a module for filtering data transmitted from the bank server 5 to the client terminal 7, and allowing only data regarding the banking services available for the user to pass through it.

For example, when the user's age is in the range of 12 to 14, the filter 145 allows data regarding the ordinary deposit service and the fixed deposit service, but blocks off data regarding the transfer service and the investment fund service.

On the side of the client terminal 7, the ordinary deposit section 148 and the fixed deposit section 149 are available, but the transfer section 150 and the investment fund section 151 are not available.

Therefore, the relevant user can utilize the services provided by the ordinary deposit section 148 and the fixed deposit section 149, but cannot utilize the services provided by the transfer section 150 and the investment fund section 151.

FIG. 18 shows a banking service select screen displayed on the display 20 of the client terminal 7 when the user's age is in the range of 6 to 11.

The banking service select screen is displayed by a banking-service select screen display section (not shown) contained in the business service software 38.

When the user clicks a left button of a mouse while a pointer is put on a desired one of various banking services displayed on the banking service select screen, the client terminal 7 is connected to the module that provides the desired banking service. After establishment of the connection, the user can utilize the desired banking service in accordance with information presented to the client terminal 7 from the module.

When the user is 6 to 11 years old, data other than the ordinary deposit service is blocked off by the filter 145, and therefore only information regarding the ordinary deposit service is displayed on the banking service select screen.

Thus, the relevant user is allowed to access the ordinary deposit section 148, but not allowed to access the fixed deposit section 149, the transfer section 150 and the investment fund section 151 and cannot utilize the banking services provided by the latter three modules.

FIG. 19 shows a banking service select screen displayed on the display 20 of the client terminal 7 when the user's age is in the range of 12 to 14.

When the user is 12 to 14 years old, data regarding the transfer service and the investment fund service is blocked off by the filter 145, and therefore only information regarding the ordinary deposit service and the fixed deposit service is displayed on the banking service select screen. Thus, the relevant user is allowed to access the ordinary deposit section 148 and the fixed deposit section 149, but not allowed to access the transfer section 150 and the investment fund section 151.

FIG. 20 shows a banking service select screen displayed on the display 20 of the client terminal 7 when the user's age is in the range of 15 to 17.

When the user is 15 to 17 years old, data regarding the investment fund service is blocked off by the filter 145, and therefore the data regarding the investment fund service is not displayed. Thus, the relevant user is allowed to access the ordinary deposit section 148, the fixed deposit section 149 and the transfer section 150, but not allowed to access and the investment fund section 151.

FIG. 21 shows a banking service select screen displayed on the display 20 of the client terminal 7 when the user's age is 18 or over.

When the user is 18 years old or over, no data is blocked off by the filter 145, and therefore the user is allowed to access all of the ordinary deposit section 148, the fixed deposit section 149, the transfer section 150 and the investment fund section 151.

While the bank server 5 is described in this embodiment as providing the ordinary deposit service, the fixed deposit service, the transfer service and the investment fund service, the present invention is not limited to that embodiment. For example, the bank server 5 may also provide loan service for setting a fund loan and any other suitable service.

FIGS. 22A and 22B are flowcharts for explaining operations of the various modules of the business service software 38. FIG. 22A shows operation of the bank server 5 and FIG. 22B shows operation of the client terminal 7.

First, the user issues a connection request to the bank server 5 from the client terminal 7 (step 370).

Upon receiving the connection request from the client terminal 7, the bank server 5 displays the log-in screen on the client terminal 7 and prompts the user to enter a log-in account and a password.

Then, the bank server 5 receives the log-in account and the password entered by the user, and the authentication server 6 (FIG. 1) executes user authentication. The authentication server 6 determines the user ID based on the password and transmits the user ID to the bank server 5.

It is here assumed that the user authentication is successfully made by the authentication server 6.

The log-in section 147 acquires the user ID from the authentication server 6 (step 310).

Then, the age determining section 143 acquires the user ID from the log-in section 147, searches the age table 155, and acquires the user's age (step 320).

Then, the filter generator 144 acquires the user's age from the age determining section 143. Based on the acquired user's age, the age determining section 143 searches the function limiting table 142, designates one or more kinds of banking services to be limited from being provided to the user, and sets the filter 145 (step 330).

The bank server 5 sends predetermined data regarding the banking services to the client terminal 7 (step 340).

The filter 145 selects data of the banking services, which is allowed to pass the filter, in accordance with the function limiting table 142 (step 350).

If the data transmitted from the bank server 5 to the client terminal 7 is not to be limited in accordance with the function limiting table 143 (Y in step 350), that data is transmitted to the client terminal 7 and provided to the user (step 360). If the data transmitted from the bank server 5 to the client terminal 7 is to be limited in accordance with the function limiting table 142 (N in step 350), that data is blocked off by the filter 145 and is not transmitted to the client terminal 7.

On the side of the client terminal 7, the user can utilize the banking services that are transmitted after being subjected to filtering in the bank server 5 (step 380).

With the fifth embodiment described above, advantages given below are obtained.

The functions of the bank server 5 available for the user can be limited depending on the user's age. For example, children with ages of 6 to 11 are prohibited from receiving services such as transfer and purchasing/selling of investment funds. It is therefore possible to avoid the occurrence of problems resulting from users making trades that are not fit for the user attributes.

Also, by preparing the kinds of banking services available from the bank server 5 in an increased number and providing the service limiting function depending on ages and any other suitable user attribute than ages, various kinds of the banking services can be optionally provided to appropriate users.

Further, since the function of limiting the banking services available for users is provided in the bank server 5, the service limiting function can be developed regardless of which client terminal the user employs.

While the fifth embodiment employs the user's age as a user attribute for classifying users in selection of the banking services provided to each user, the present invention is not limited to that embodiment. For example, the available kinds of banking services may be selected depending on other user attributes such as the balance of the user's account, preference, hobby and occupation of the user, and a family make-up of the user.

Moreover, setting conditions of the filter 145 may be changed with user setting so that, for example, a father is able to previously select the banking services available for his child.

The filter 145 may be separately set for each user.

It is to be noted that the present invention is not limited to the fifth embodiment described above, but may be modified in various forms without departing from the scope of the invention defined in claims.

Sixth Embodiment

In the fifth embodiment, the function of limiting the banking services available for the user is provided in the bank server 5. In this sixth embodiment, the service limiting function is provided in the client terminal 7.

A network configuration comprising a client terminal 7 and a bank server 5 is the same as that shown in FIG. 1. Hardware configurations of the client terminal 7 and the bank server 5 are the same as those shown in FIGS. 2 and 3, respectively.

Figure 23:
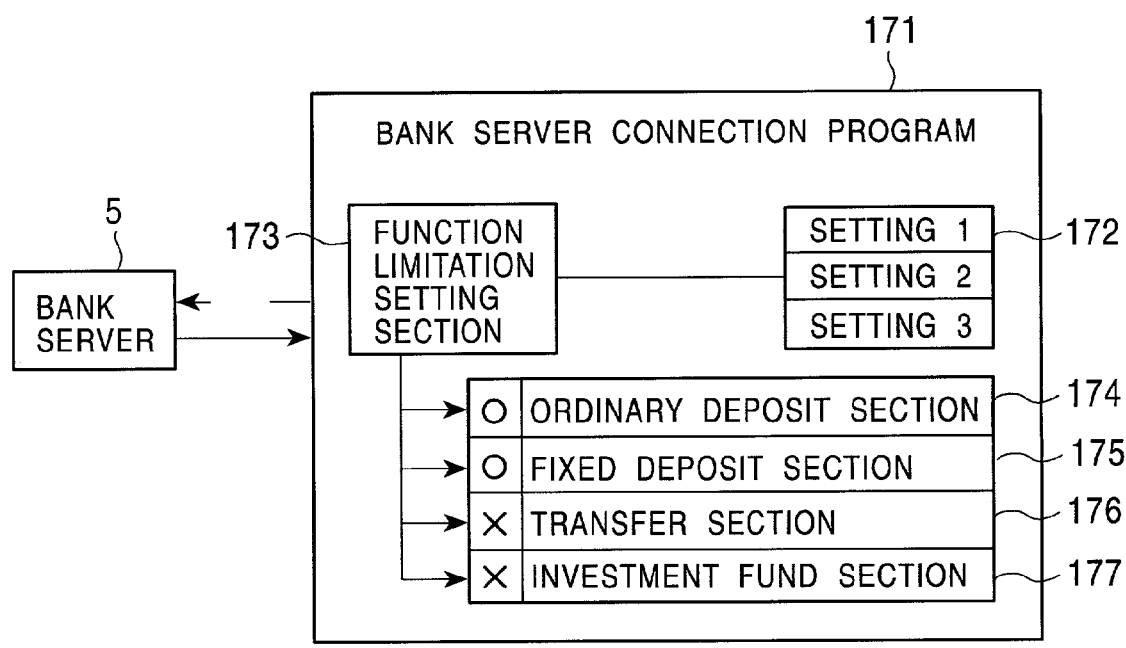
FIG. 23 is a block diagram for explaining one example of configuration of a bank server connection program in a sixth embodiment.

FIG. 23 is a block diagram for explaining one example of configuration of a bank server connection program 171 stored in a memory device 16 (see FIG. 2) of the client terminal 7.

In the fifth embodiment, each set of screen data (file in the HTML format) transmitted from the bank server 5 is displayed on the display 20 by the browser 21 (see FIG. 2). In this sixth embodiment, however, the bank server connection program 171 installed in the client terminal 7 displays various screens such as the transfer screen.

Then, the bank server 5 and the client terminal 7 transmit data, such as account balance data and transferee's account number, in the encrypted form from one to the other.

The bank server connection program 171 can be started up upon the user entering a password.

After starting up the bank server connection program 171 by entering the password, the user enters a log-in account and a password for the authentication server 6 in a bank system. After authentication of the entered data, connection to the bank server 5 is established.

The bank server connection program 171 includes, by way of example, an ordinary deposit section 174, a fixed deposit section 175, a transfer section 176, and an investment fund section 177 for providing the banking services.

Those sections are employed in the state in which the client terminal 7 is logged in to the bank server 5.

The ordinary deposit section 174 displays an account balance confirmation screen, an income/outgo specifics screen, etc. on the display 20. Then, in accordance with account balance data and income/outgo specifics data transmitted from the bank server 5, the ordinary deposit section 174 displays the account balance and specifics of incomes/outgoes on the account balance confirmation screen and the income/outgo specifics screen, respectively. The banking services provided to the user from the ordinary deposit section 174 is the same as those provided from the ordinary deposit section 148 (FIG. 15) of the bank server 5 in the fifth embodiment.

Similarly, the fixed deposit section 175, the transfer section 176, and the investment fund section 177 display predetermined screens on the display 20 for displaying data transmitted from the bank server 5 to the client terminal 7 on the corresponding screen, or transmitting data entered by the user on those screens to the bank server 5. The contents of the services provided from those sections are the same as those provided from the fixed deposit section 149, the transfer section 150, and an investment fund section 151 (FIG. 15) of the bank server 5 in the fifth embodiment.

A function limitation setting section 173 is a module capable of selectively stopping the functions of the above-described sections 174-177. For example, the function limitation setting section 173 can set the ordinary deposit section 174 and the fixed deposit section 175 to an operable state, while stopping the functions of the transfer section 176 and the investment fund section 177. In FIG. 23, marks ○ put in left columns of the ordinary deposit section 174 and the fixed deposit section 175 mean that these modules are set into an operable state by the function limitation setting section 173. Marks x mean that the corresponding modules are set into an inoperable state by the function limitation setting section 173.

Which module's function is limited by the function limitation setting section 173 can be optionally set in plural ways by a setting unit 172.

The setting unit 172 can select one of plural settings, e.g., three settings 1-3. With the setting 1, by way of example, the ordinary deposit section 174 is enabled, but the other three sections are disabled. With the setting 2, the ordinary deposit section 174 and the fixed deposit section 175 are enabled, whereas the transfer section 176 and the investment fund section 177 are disabled. With the setting 3, the four sections 171-174 are all enabled.

Further, the plural settings set by the setting unit 172 can be associated with passwords entered by individual users for starting up the bank server connection program 171 in a one-to-one relation.

With such an arrangement, when the client terminal 7 is installed at home, for example, the banking services available for individual users can be limited by assigning passwords of a parent (father and mother) to the setting 3, assigning a password of the eldest son to the setting 2, and assigning a password of the second eldest son to the setting 1, respectively.

Thus, by providing an optional setting means allowing the user to select settings effectuated by the setting unit 172 for each of users, it is possible to select settings, for example, such that the father and the mother can receive the banking services of ordinary deposit, fixed deposit, transfer and investment fund, the eldest son can receive the banking services of ordinary deposit and fixed deposit, and the second eldest son can receive the banking service of only ordinary deposit.

The setting of available banking services for each user can be made on the client terminal 7 by a person managing it, for example, the father.

With the sixth embodiment described above, advantages given below are obtained.

Advantages resulting from limiting the kinds of banking services available for individual users are the same as those obtained with the fifth embodiment.

Further, with the sixth embodiment, since the kinds of banking services available on the side of the client terminal 7 can be set in a limited way, a limitation on the available banking services can be set flexibly in match with situations on the user side.

It is to be noted that the present invention is not limited to the sixth embodiment described above, but may be modified in various forms without departing from the scope of the invention defined in claims.

Seventh Embodiment

A seventh embodiment will be described below with reference to FIGS. 24 and 25.

Figure 24:
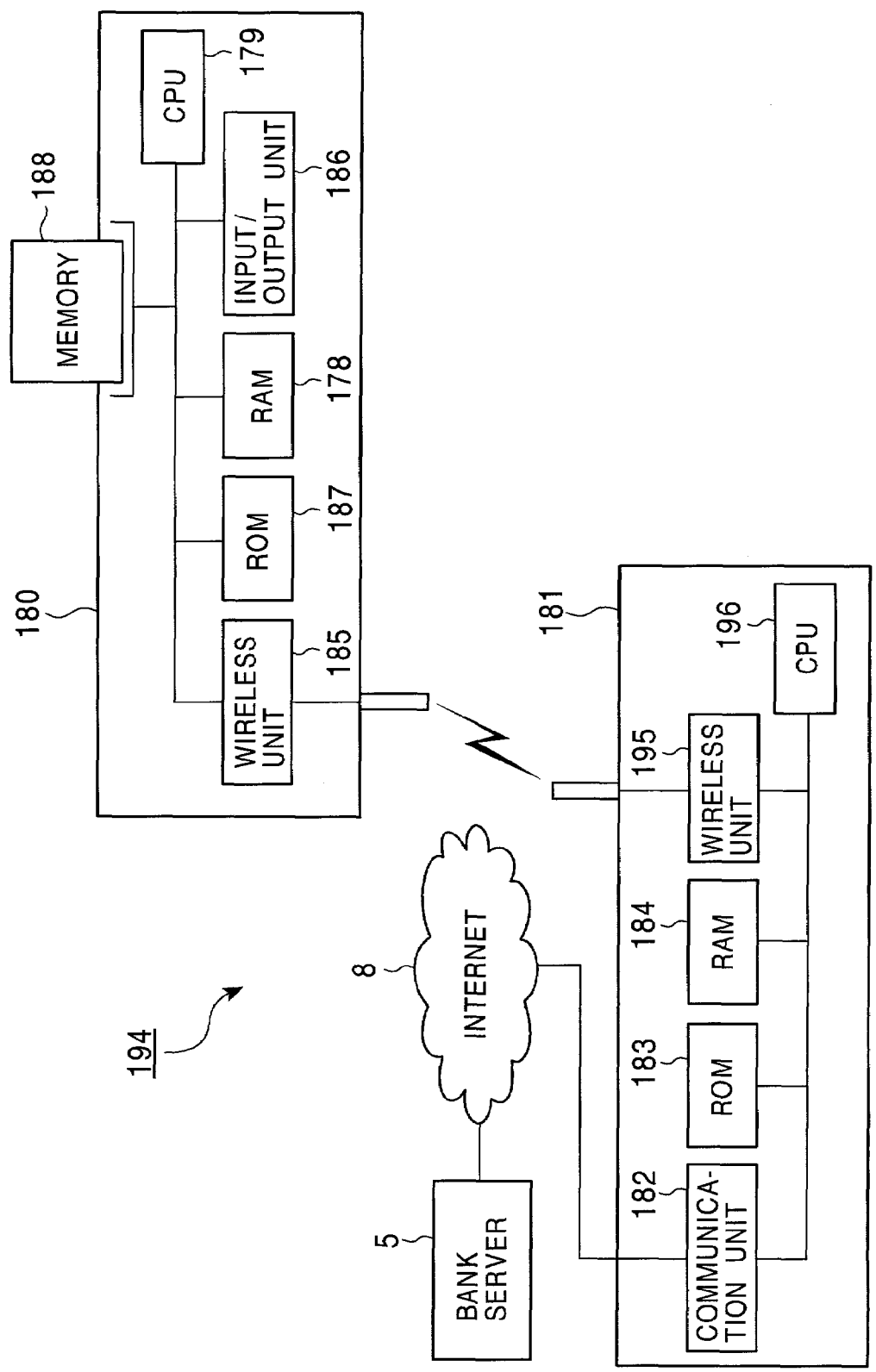
FIG. 24 is a block diagram showing one example of configuration of a network using the bank server, the Internet and the client terminal.

FIG. 24 is a block diagram showing one example of configuration of a network using a bank server 5, the Internet 8 and a client terminal 194.

A hardware configuration of the bank server 5 is the same as that in the first embodiment.

In the seventh embodiment, as with the sixth embodiment, a program installed in the client terminal 194 displays various screens such as a transfer screen.

The client terminal 194 comprises a base unit 181 connected to the Internet 8, and a portable unit 180 capable of communicating with the base unit 181 in a wireless way.

The base unit 181 is installed in a predetermined location. On the other hand, the portable unit 180 is a small-size and light-weight unit and can be freely carried with users. Each user can log in to and out of the bank server 5 from the portable unit 180, while the portable unit 180 can be handled as a personal terminal freely portable with the user.

The portable unit 180 has a memory 188 that can be detachably attached to the portable unit 180 and includes a banking program for communicating with the bank server 5. The memory 188 is assigned in a one-to-one relation to users, and includes a program stored therein for specific use by each user.

Each user can utilize the client terminal 194 in a personal environment dedicated for the user by attaching his or her memory 188 to the portable unit 180.

The portable unit 180 will be described later in more detail.

The base unit 181 serves as a wireless base station for connecting the Internet 8 and the portable unit 180 with each other via wireless communication.

The base unit 181 comprises a communication unit 182, a ROM 183, a RAM 184, a wireless unit 195, a CPU 196, etc.

The communication unit 182 is constituted by, e.g., a modem and connects the base unit 181 with the Internet 8.

The ROM 183 stores therein a program for operating the base unit 181 as a wireless base station, such as driver software for controlling the communication unit 182 and the wireless unit 195.

The RAM 184 provides a working memory for the CPU 196.

The wireless unit 195 processes signals transmitted and received between the base unit 181 and the portable unit 180 in predetermined procedures so that the base unit 181 is connected to the portable unit 180 via wireless LAN.

For example, in the transmitting process, transmission signals are generated in conformity with a predetermined communication protocol after compressing transmitted data. The generated transmission signals are modulated and amplified. Then, the wireless unit 195 transmits the processed signals to the portable unit 180 via wireless communication.

In the receiving process, the wireless unit 195 receives signals transmitted from the portable unit 180, and processes the received signals through predetermined procedures such as demodulation and decompression, thereby converting the received signals into ones usable by the communication unit 182 and the CPU 196.

The CPU 196 operates in accordance with the program stored in the ROM 183 so as to control data transfer in the communication unit 182 with respect to the Internet 8 and control data transfer in the wireless unit 195 with respect to the portable unit 180.

The portable unit 180 comprises a wireless unit 185, a ROM 187, a RAM 178, an input/output unit 186, a CPU 179, a memory 188, a display (not shown), a touch panel pasted to the display, etc. The wireless unit 185 has the same construction and function as those of the wireless unit 195 in the base unit 181, and connects the portable unit 180 to the base unit 181 via wireless communication.

The ROM 187 stores therein basic programs for operating the portable unit 180, such as driver software for the display, the touch panel, the wireless unit 185, and the memory 188.

The RAM 178 provides a working memory for the CPU 179.

The input/output unit 186 outputs display data to the display and receives a data input from the touch panel.

The memory 188 is detachably attached to the portable unit 180 and is assigned in a one-to-one relation to users. The memory 188 is, e.g., a nonvolatile semiconductor memory such as an Electrically Erasable And Programmable Mask ROM. However, the memory 188 is not limited to a semiconductor memory, but may be a different type of storage medium such as a magnetic disk.

The memory 188 stores therein programs and data dedicated for the user who has the relevant memory. Each user can utilize the portable unit 180 in a personal environment dedicated for the user by attaching his or her memory 188 to the portable unit 180 and starting up a desired program stored in the memory 188.

The CPU 179 control various units, such as the input/output unit 186 and the wireless unit 185, in accordance with the programs stored in the ROM 187 and the memory 188.

Figure 25:
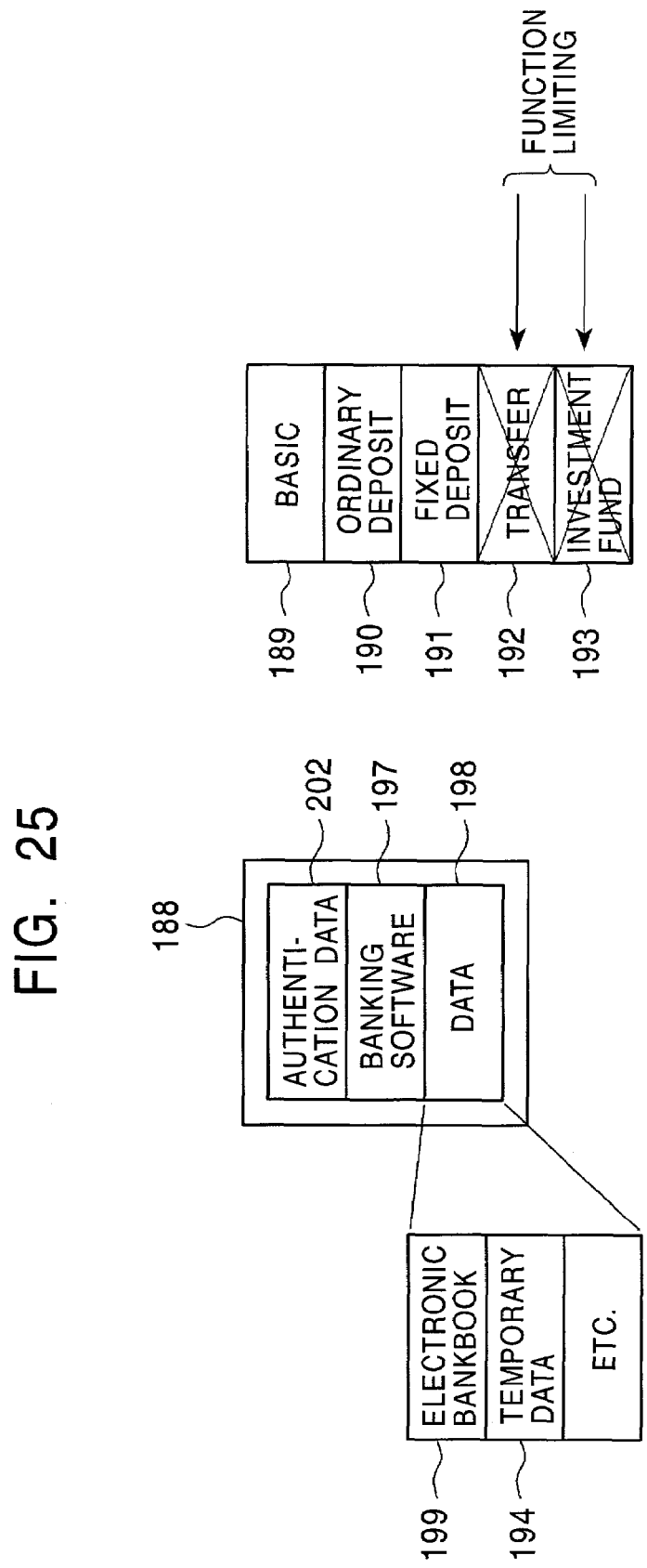
FIG. 25 is an illustration schematically showing one example of memory configuration.

FIG. 25 schematically shows one example of data stored in the memory 188.

The memory 188 stores therein authentication data 202, banking software 197, and data 198.

The authentication data 202 is data that is uniquely allocated for each memory 188 and corresponds to the user's account.

When each user logs in to the bank server 5, the bank server 5 checks whether the authentication data 202 matches with a log-in account and a password entered by the user.

When a person who is not a owner of the memory 188 attempts to log in to the bank server 5 by attaching the memory 188 to the portable unit 180 and entering his or her log-in account and user ID, the bank server 5 reject that log-in.

The banking software 197 is software for providing, to users, banking services prepared in the bank server 5.

The banking software 197 is made up of various modules such as a basic section 189, an ordinary deposit section 190, a fixed deposit section 191, a transfer section 192, and an investment fund section 193.

Those programs can be executed by the CPU 179 upon the memory 188 being attached to the portable unit 180.

The basic section 189 is a module for providing basic functions to operate the banking software 197.

For example, the basic section 189 has the function of operating the CPU 179 to communicate with the bank server 5 and to update an electronic bankbook 199 based on data received from the bank server 5.

Further, the basic section 189 has the function of holding transaction data, e.g., transfer data, as temporary data 194 in a section of the data 198, the transaction data being prepared by the user while the client terminal 194 is operated in the off-line condition with respect to the bank server 5, and the function of transmitting the held data to the bank server 5 upon the user logging in to the bank server 5.

Moreover, the basic section 189 has the function of displaying a log-in screen on the display when the user is going to log in to the bank server 5.

The log-in screen displays a list of characters and numerals on it. The user can enter a log-in account and a password by touching desired ones of the characters and the numerals with a touch pen or a finger.

Additionally, the basic section 189 has the function of displaying a banking service select screen on the display upon the user logging in to the bank server 5. The banking service select screen displays a list of banking services provided by the ordinary deposit section 190, the fixed deposit section 191, the transfer section 192, and the investment fund section 193. The user can select a desired one of the banking services by touching it on the displayed list.

The ordinary deposit section 190 is a module for providing ordinary deposit service to users. For example, the ordinary deposit section 190 displays a balance confirmation screen and a deposit specifics screen on the display. Data displayed on those screens corresponds to the contents stored in the electronic bankbook 199.

The fixed deposit section 191 displays, similarly to the ordinary deposit section 190, a fixed deposit opening screen, a fixed deposit closing screen, a fixed-deposit balance specifics screen, etc. Data displayed on the fixed-deposit balance specifics screen corresponds to the contents stored in the electronic bankbook 199. Data entered on the fixed deposit opening screen and the a fixed deposit closing screen is transmitted to the bank server 5 at once if the base unit 181 is connected to the bank server 5, and is stored as the temporary data 194 in the memory 188 if the base unit 181 is not connected to the bank server 5.

The transfer section 192 is a module for providing transfer service to users.

For example, when a user wants to transfer money, the user selects transfer on the banking service select screen to display a transfer screen.

A list of the names of transferee banks is displayed on the transfer screen. The user can enter a desired one of the names of transferee banks to the input/output unit 86 by touching a corresponding location on the list.

The transfer screen also displays numerals for entering the transferee's account number. The user can enter the transferee's account number to the input/output unit 86 by touching desired ones of the displayed numerals.

Further, the transfer screen displays numerals for entering the amount of money transferred. The user can enter the amount of money transferred to the input/output unit 86 by touching desired ones of the displayed numerals.

The data entered by the user is transmitted to the bank server 5 at once if the client terminal 194 (base unit 181) is connected to the bank server 5, and is stored as the temporary data 194 in the memory 188 if the user employs the client terminal 194 off-line.

The investment fund section 193 is a module for providing, to users, services such as regarding purchase and selling of investment funds and displaying trade records and specifics of owned investment funds.

Trade records and specifics of owned investment funds are displayed based on data recorded in the electronic bankbook 199. When the user enters data instructing purchase or selling of investment funds, the entered data is transmitted to the bank server 5 at once if the client terminal 194 is connected to the bank server 5, and is stored as the temporary data 194 in the memory 188 if the client terminal 194 is in the off-line condition.

The electronic bankbook 199 records therein not only data that is recorded in an ordinary deposit bankbook, such as deposit specifics and the account balance, but also data regarding the other banking services that the user utilizes on the banking software 197, such as owned investment funds.

When the user logs in to the bank server 5 from the client terminal 194, data of settled transactions is transmitted to the client terminal 194 from the bank server 5. The basic section 189 updates the electronic bankbook 199 in accordance with the transmitted data.

In other words, upon the user logging in to the bank server 5, the contents of the electronic bankbook 199 are updated so as to reflect the latest data.

The data of settled transactions transmitted from the bank server 5 is data regarding transactions made on the user's account by the bank server 5 during a period from the previous log-in to the current log-in from the user, such as transfer, a credit of interest and a direct debit to the user's account.

The temporary data 194 includes, as mentioned above, the transaction instruction data that has been prepared by the user using the banking software 97 in the off-line condition with respect to the bank server 5. The temporary data 194 is transmitted to the bank server 5 upon the user logging in to the bank server 5, and then erased after the transmission.

In accordance with the transaction instruction data received from the client terminal 194, the bank server 5 executes transactions such as transfer.

The memory 188 is distributed to each user when the user opens an account in the relevant bank. The bank is able to limit predetermined one or more of the banking service providing functions depending on user attributes.

More specifically, at the time of distributing the memory 188, the bank can set which one of modules built in the banking software 197 for providing the banking services is operable and which one of the modules is inoperable, depending on user attributes. The user cannot change the setting decided by the bank.

With such a service limiting function, it is possible to, for example, set the transfer section 192 and the investment fund section 193 not available when the user is a school child, and set the investment fund section 193 not available when the user is a junior high school student.

Alternatively, several types of memories 188 in each of which one or more predetermined modules are not installed, may be prepared in advance and distributed depending on user attributes. For example, a memory chip including the ordinary deposit section 190 and the fixed deposit section 191, but not including the transfer section 192 and the investment fund section 193 is distributed to a school child.

While the client terminal 194 has been described above only in connection with data transfer with respect to the bank server 5, the client terminal 194 also includes a browser. Therefore, as with an ordinary personal computer, the user can access various servers via the Internet 8 and receive various services provided from those servers.

Further, the base unit 181 includes a TV tuner so that the user can see TV programs on the portable unit 180. The base unit 181 also has an external input terminal so that the user can enjoy video software, etc. on the portable unit 180.

The memory 188 may store, in addition to the banking software 197, other pieces of application software such as household account-book software and calendar software. By linking those pieces of application software with the bank server 5, it is possible to reflect the contents of the electronic bankbook 199 on the household account-book software or to display the scheduled date of transfer debit to the user's account and the amount of money on a calendar.

The seventh embodiment having the above-described construction can provide advantages given below.

Advantages resulting from limiting the available banking services depending on user attributes are the same as those obtained with the fifth embodiment.

Further, since the client terminal 194 is separable into the base unit 181 and the portable unit 180, each user can easily bring the portable unit 180 to a personal operating space when there are a plurality of users.

Since each user is assigned with the memory 188 storing programs and data specific to the user, the user can create a personal environment at hand just by attaching the memory 188 to the portable unit 180.

Also, the user is able to employ the banking software 197 while the client terminal 194 is kept off-line from the bank server 5, and data prepared by the user can be stored as the temporary data 194 in the memory 188.

In addition, by installing, in the memory 188, other application software operating in linkage with the banking software 197, the bank can provide services more familiar with the user's daily life.

Even when a plurality of users, e.g., family members, have their own accounts in the bank server 5, the client terminal 194 can provide a personal terminal for each user without installing a plurality of client terminals.

It is to be noted that the present invention is not limited to the seventh embodiment described above, but may be modified in various forms without departing from the scope of the invention defined in claims.

Eighth Embodiment

An eighth embodiment will be described below with reference to FIGS. 26 and 33.

Figure 26:
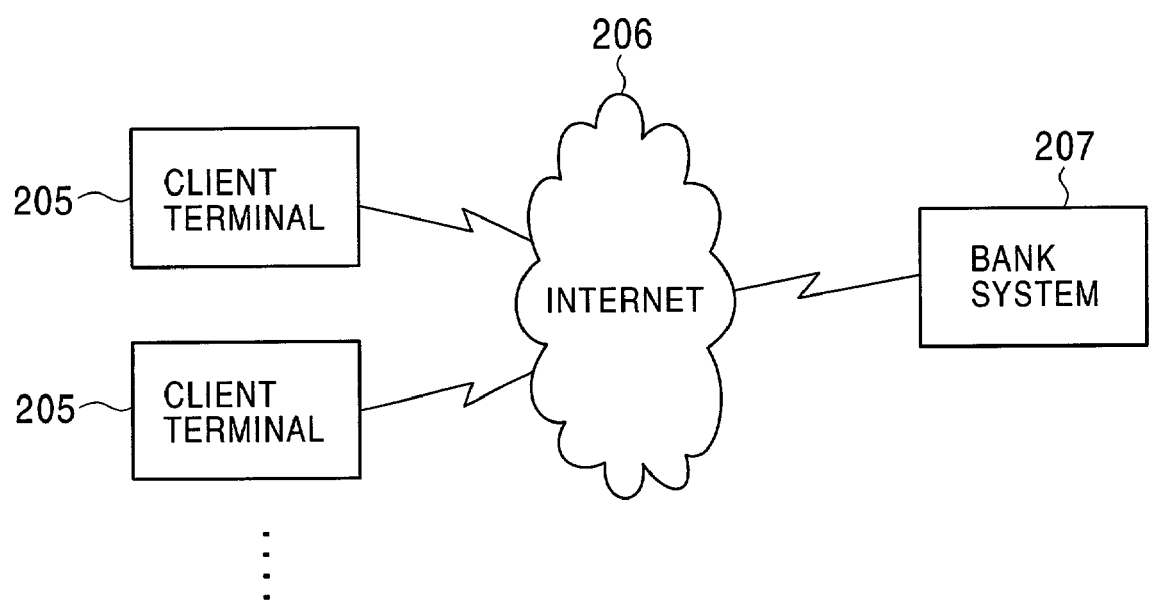
FIG. 26 is a block diagram showing one example of configuration of a network to which client terminals and a bank system according to an eighth embodiment are applied.

FIG. 26 is a block diagram showing one example of configuration of a network to which client terminals 205 and a bank system 207 according to the eighth embodiment are applied.

The bank system 207 comprises an authentication server, a banking business server for executing banking business, a previous log-in information providing server for providing previous log-in information to the client terminal 205, etc. The bank system 207 is connected to the Internet 206.

Also, a plurality of the client terminals 205, 205, . . . are connected to the Internet 206. Those client terminals 205, 205, . . . are each constituted by, e.g., a personal computer (PC).

The bank system 207 manages bank accounts of a number of users and provides various banking services such as confirmation of the deposit balance and transfer.

Each user can log in to the bank system 207 from one of the client terminals 205, 205, . . . via the Internet 206 and receive services provided from the bank.

When logging in to the bank system 207, the user is required to enter data, e.g., a set of user ID and password or a set of log-in account and secret number, based on which the bank system 207 is able to make user authentication.

After authentication of those entered data by the authentication server, the user is allowed to log in to the bank system 207.

Also, each user can register the client terminals 205, 205, . . . up to three for each account in the bank system 207. This enables the user to install the client terminals 205, 205, . . . up to three at home, his or her job site, etc.

While this embodiment is described as enabling each user to set the client terminals 205, 205, . . . up to three with respect to the bank system 207, the present invention is not limited to such an arrangement. Each user may be allowed to set four or more or less than three client terminals. Additionally, the number of client terminals capable of being set may be different for each user.

While this embodiment is described as constituting each of the client terminals 205, 205, . . . by a PC, the client terminal may be constituted by, e.g., a cellular phone, a notebook type PC, another portable terminal, a work station, a digital TV set with the function of two-way communication, or a word processor with the communicating function.

Also, in the following description, the client terminals 205, 205, . . . and the bank system 207 are connected to each other via the Internet 206. However, they may be connected to each other via, e.g., LAN (Local Area Network), WAN (Wide Area Network), a cable TV network with the function of two-way communication, a digital TV network with the function of two-way communication, or a dedicated communication line network.

Further, while a large number of client terminals 205, 205, . . . are connected to the Internet 206, the following description is made in connection with one client terminal 205. Each of the other client terminals 205, 205, . . . also has the same configuration as that of the one client terminal 205 described below.

Figure 27:
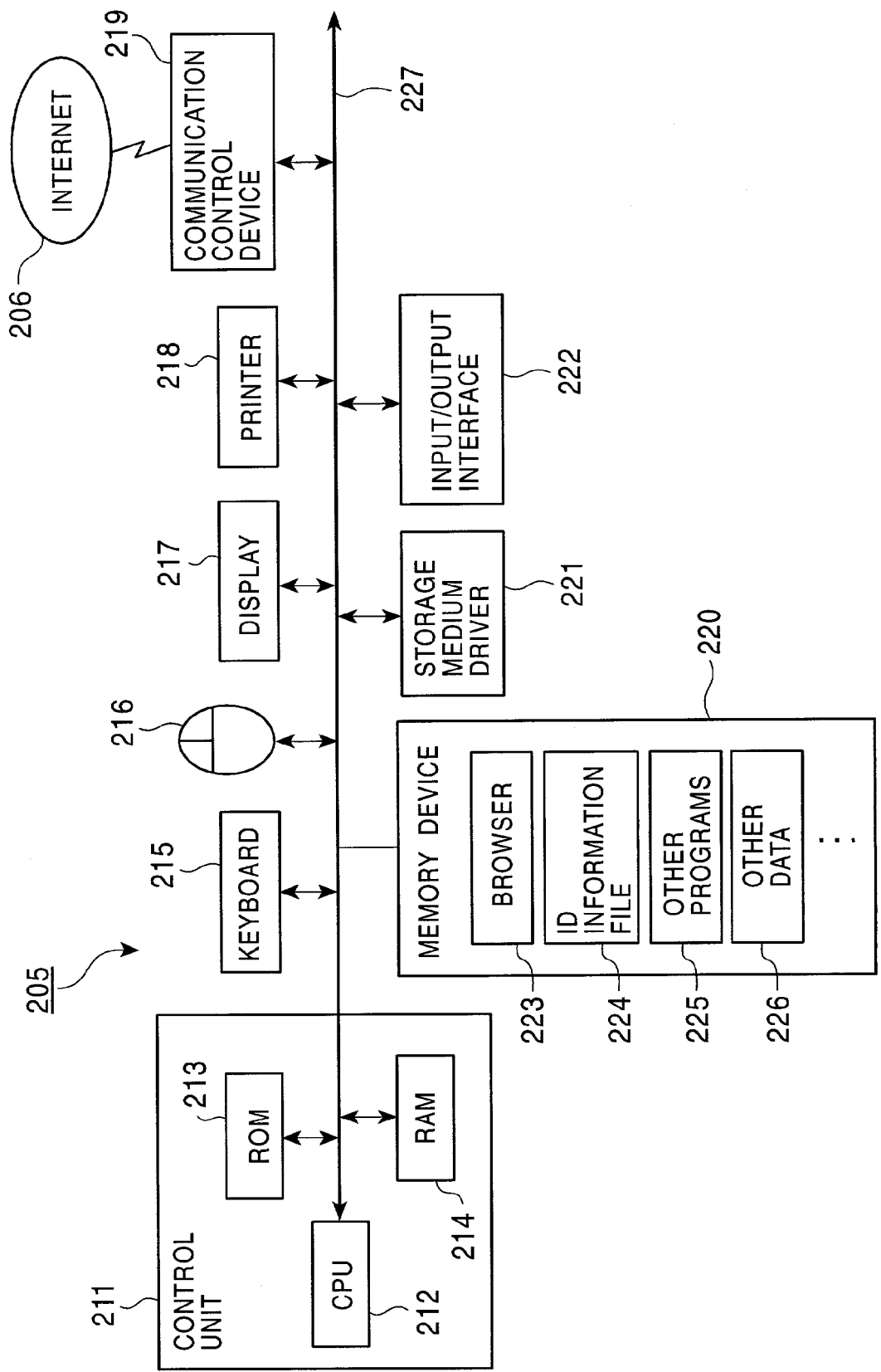
FIG. 27 is a block diagram showing one example of hardware configuration of the client terminal.

FIG. 27 is a block diagram showing one example of hardware configuration of the client terminal 205.

A control unit 211 comprises a CPU (Central Processing Unit) 212, a ROM (Read Only Memory) 213, and a RAM (Random Access Memory) 214, and controls the entirety of the client terminal 205.

The ROM 213 stores therein programs and parameters used by the CPU 212 for various calculations and control.

The RAM 214 is employed to provide a working memory to the CPU 212, and read and load files and programs stored in a memory device 220.

The CPU 212 executes various calculations, condition determinations, and control of various components in accordance with programs stored in the ROM 213 and the RAM 214.

For example, a browser 223 stored in the memory device 220 is loaded in the RAM 214, and a file in the HTML (Hypertext Markup Language) format transmitted from the bank system 207 is displayed on a display 217 in accordance with a browser program. Further, data entered by the user using a keyboard 215 or a mouse 216 is transmitted to the bank system 207 through a communication control unit 219.

HTML is a language for describing home pages residing in WWW (World Wide Web) serves for the Internet, and enables characters, still pictures, mobile pictures, etc. on the display 217 using a browser (software for displaying an HTML file).

The keyboard 215 includes character keys, a ten-key numerical pad, function keys, and so on. By manipulating those keys, the user is able to enter a user ID and a password to the bank system 207, and enter the name of the client terminal 205 for setting.

The mouse 216 is a pointing device and is able to initiate a corresponding function by clicking it with a pointer put on an icon or a button displayed on the display 217.

The display 217 is constituted by, e.g., a CRT (Cathode Ray Tube) display, a liquid crystal display, or a plasma display. The display 217 displays various screens such as a log-in screen transmitted from the bank system 207 as a file in the HTML format, a previous log-in information display screen, and a client terminal registration screen which will be described later. Further, the display 217 displays results entered by the user from the keyboard 215 or the mouse 216.

A printer 218 is a unit for printing data in various forms on paper, and is constituted by, e.g., a laser printer, a dot printer, an ink jet printer, a page printer, a heat sensitive printer, or a heat transfer printer.

In accordance with data received from the CPU 212, the printer 218 is able to print, e.g., previous log-in information indicating the client terminal 205 used in the previous log-in and the date/time of the previous log-in.

A communication control unit 219 is constituted by, e.g., a modem, and operates so as to establish network connection between the client terminal 205 and the bank system 207.

When the client terminal 205 is connected to the Internet 206 via a digital line, an additional device such as TA (Terminal Adapter) may be used in some cases.

A storage medium driver 221 is a driver for enabling the CPU 212 to read programs and other files stored in a storage medium. The storage medium may be, e.g., a magnetic storage medium such as a floppy disk (magnetic disk) or a magnetic tape, a storage medium of the type optically reading information, such as CD-ROM or a magneto-optical disk, a semiconductor storage medium such as a memory chip or an IC card, and a storage medium using paper, such as a paper card or a paper tape.

An input/output interface 222 is constituted as, e.g., a USB (Universal Serial Bus) or RS232C (Recommended Standard 232C) interface, and is employed, for example, when an externally connected device such as a joystick is connected to the client terminal 205.

The memory device 220 comprises a writable/readable storage medium and a driver for writing and reading programs and data with respect to the storage medium. The memory device 220 is constituted by, e.g., a hard disk.

The memory device 220 stores therein a browser 223, an identification (ID) information file 224, other programs 225, other data 226, and so on.

The browser 223 is software for displaying, on the display 217, a screen defined using HTML (one kind of computer language).

The browser 223 displaying, on the display 217, the previous log-in information display screen and the client terminal registration screen (each prepared as a file in the HTML format) which are downloaded from the bank system 207.

The ID information file 224 is a file formed with ID information written in the memory device 220 for enabling the bank system 207 to discriminate and identify the relevant client terminal 205 from the other ones 205.

The other programs 225 are made up of OS (Operating System) as a basic program for operating the client terminal 205, and other programs.

The other data 226 includes various kinds of data such as records of communications between the client terminal 205 and the bank system 207.

A bus line 227 is a transmission line through which data and signals are transferred among the above-mentioned companies.

Each of the other client terminals 205 also has basically the same configuration as that described above.

Figure 28:
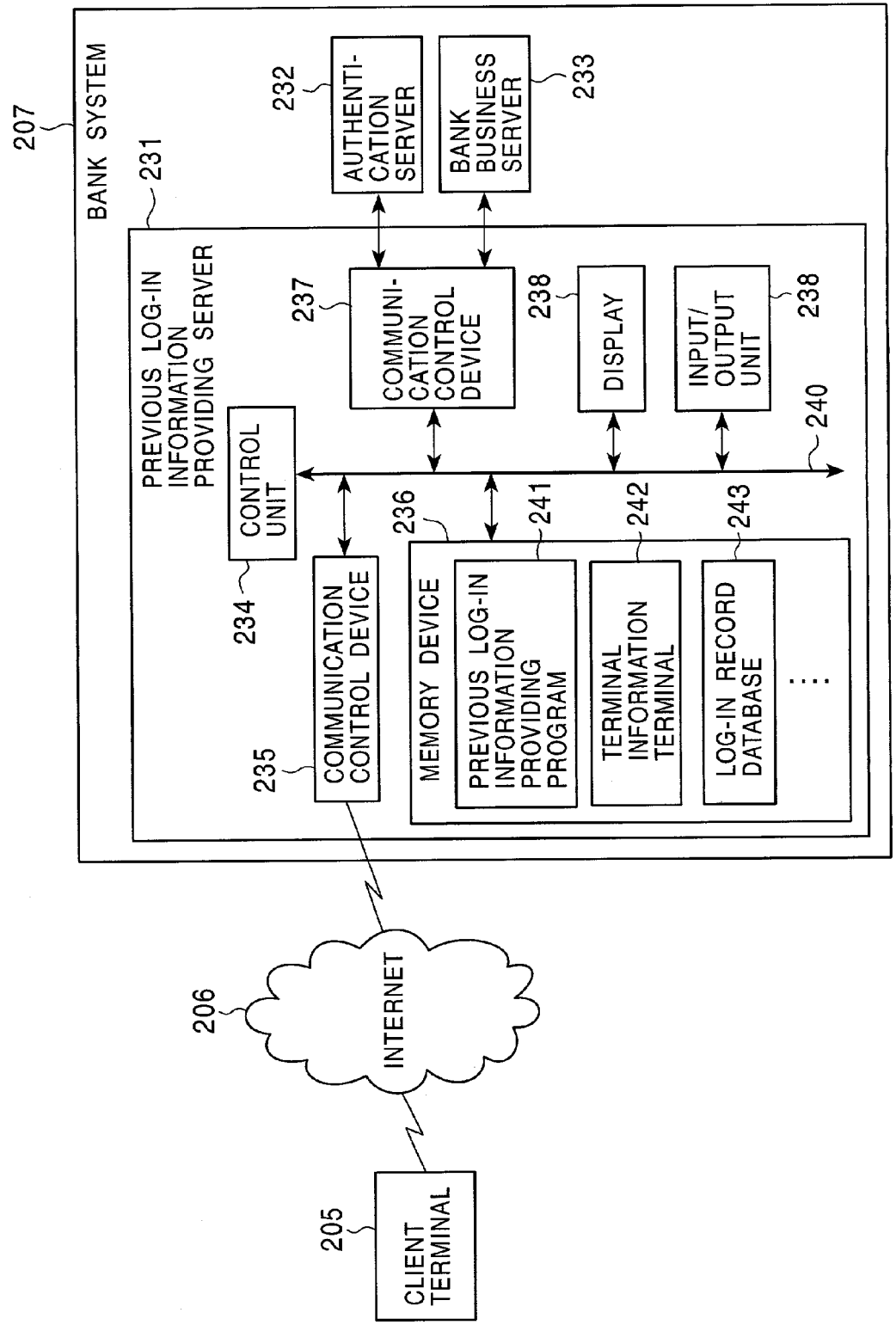
FIG. 28 is a block diagram showing one example of configuration of the bank system.

FIG. 28 is a block diagram showing one example of configuration of the bank system 207.

The bank system 207 mainly comprises a previous log-in information providing server 231, an authentication server 232, a banking business server 233, etc.

The previous log-in information providing server 231 transmits previous log-in information to the client terminal 205 and also relays communication between the authentication server 232 and the banking business server 233 upon receiving a log-in to the bank system 207 from the user.

The network configuration among those servers has been described only by way of example. As a modification, the banking business server 233 may be connected to the Internet 206 via a firewall, or the banking business server 233 may be directly connected to the authentication server 232.

The authentication server 232 acquires a log-in account, a user ID, a password, etc. entered by each user from the client terminal 205, and executes user authentication.

While this embodiment is described as requiring each user to enter a user ID and a password, the present invention is not limited to such an arrangement. Any other suitable data, such as a secret number, a bank account number, and user ID information for identifying each user may also be employed so long as the user who is going to log in to the relevant account can be recognized based on that data.

The banking business server 233 is one for executing banking business, such as transfer, balance inquiry, and opening/closing of an account, in accordance with a user input from the client terminal 205. After the user authentication by the authentication server 232, the banking business server 233 provides services to users.

The function of the log-in information providing server 231 will be described below.

The previous log-in information providing server 231 receives registration of the client terminal up to three per account. The reason why the number of client terminals 205 can be registered per account is set to three at maximum is that there occurs a problem from the security point of view if the number of client terminals 205 capable of accessing one account is increased.

The user can register the client terminal 205 using the name of a PC maker, the model name, and any other suitable name, for example, "Sunny Power PC (at home)".

The name thus registered by the user can be utilized as the name of the client terminal 205 when the user confirms the previous log-in information.

Upon the client terminal 205 logging in to the bank system 207, the previous log-in information providing server 231 checks whether that client terminal 205 is a registered one. If that client terminal 205 is a registered one, the date/time of the previous log-in to the relevant account and the name (name arbitrarily set by the user) of the client terminal 205 used in the previous log-in are displayed on that client terminal 205.

If that client terminal 205 is not a registered one, the client terminal registration screen is displayed on that client terminal 205, thereby prompting the user to register that client terminal.

The user can confirm the date/time of the previous log-in and the name of the client terminal 205 used in the previous log-in each time the user logs in to the bank system 207. It is therefore possible to check unauthorized accesses from third persons.

The configuration of the previous log-in information providing server 231 will be described below.

The previous log-in information providing server 231 comprises a control unit 234, communication control devices 235, 237, a memory device 236, a display 238, an input/output unit 239, etc.

The control unit 234 comprises a CPU, a RAM, a ROM, etc. and serves as a component for controlling the entirety of the previous log-in information providing server 231. The functions of the CPU, the RAM, and the ROM are the same as those of the CPU 212, the RAM 214 and the ROM 213 of the control unit 211 (FIG. 27) in the client terminal 205.

More specifically, the ROM stores therein programs and parameters for use in processing executed by the CPU. The RAM is employed to load a previous log-in information providing program 241 stored in the memory device 236, and to provide a working memory to the CPU. The CPU executes various calculations, condition determinations, and control of various components in accordance with programs stored in the ROM and the previous log-in information providing program 241 loaded in the RAM.

The communication control device 235 is constituted by, e.g., a modem, and operates so as to connection the Internet 206 and the previous log-in information providing server 231 to each other.

The previous log-in information providing server 231 can communicate with the client terminal 205 via the communication control device 235 and the Internet 206.

The communication control device 237 is a device providing an interface of the authentication server 232 and the banking business server 233 with respect to the previous log-in information providing server 231. The authentication server 232 receives, via the communication control device 237, the user ID and the password which have been acquired from the user by the previous log-in information providing server 231, and then authenticates the user ID and the password.

The banking business server 233 acquires, via the communication control device 237, information entered by the user from the client terminal 205 and then executes banking business.

The display 238 is constituted by, e.g., a CRT display, a liquid crystal display, or a plasma display, and displays various screens.

For example, the display 238 displays a maintenance screen when a supervisor of the previous log-in information providing server 231 performs maintenance, an error code when a trouble occurs in the previous log-in information providing server 231, a lift of files stored in the memory device 236, and a screen of application software installed in the previous log-in information providing server 231 when the application software is started up.

The input/output unit 239 is connected to an input device such as a keyboard and a mouse, an output device such as a printer, and an input/output device such as a storage medium driver. These devices have the same functions as those in the client terminal 205.

The memory device 236 comprises a writable/readable storage medium with a large capacity, and a driver for writing and reading programs and data with respect to the storage medium. The memory device 236 is constituted by, e.g., a hard disk with a large capacity.

The memory device 236 stores therein a previous log-in information providing program 241, a terminal information database 242, and a log-in record database 243.

The previous log-in information providing program 241 is loaded in the RAM of the control unit 234 and is then executed by the CPU of the control unit 234. As a result, the previous log-in information providing server 231 can develop various functions such as displaying the previous log-in information on the client terminal 205.

The terminal information database 242 is a database in which terminal information 264 is stored. The terminal information 264 is used for identifying and determining a plurality of client terminals 205 set for each account.

The log-in record database 243 stores therein log-in record data indicating historical log-in records for each account. The log-in records are made up of the date/time of each log-in, the client terminal 205 used in the log-in, etc.

In addition to the log-in records, the log-in record database 243 may also store records of accesses made by the user on the bank system 207.

In that case, the latest log-in record is searched for from among the log-in record database 243 in which various accesses are recorded and stored, and is then provided to the client terminal 205.

The ID information file 224, the terminal information 264, and the log-in record data 267 will be described below with reference to FIGS. 29A to 29C.

Figure 29A:
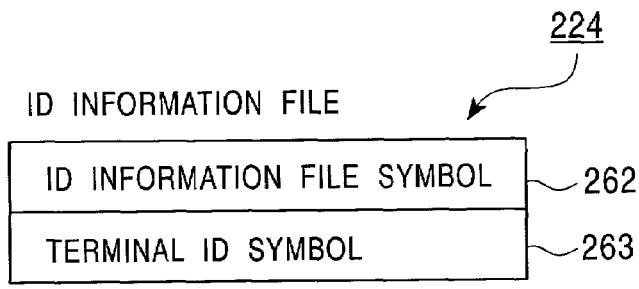
FIG. 29A shows a configuration of an ID information file.

FIG. 29A shows a configuration of the ID information file 224. The ID information file 224 is stored in the memory device 220 of the client terminal 205.

The ID information file 224 is made up of an ID information file symbol 262 and a terminal ID symbol 263.

The ID information file symbol 262 is a symbol uniquely allocated to each account and corresponds to the user ID in a one-to-one relation. When the user has a plurality of accounts, a user ID is issued for each of the accounts.

The terminal ID symbol 263 is terminal number information for discriminating which one of client terminals assigned to one account corresponds to the relevant client terminal 205. The client terminal 205 can be set up to three for each account. The terminal ID symbol 263 is formed by information capable of determining whether the relevant client terminal 205 is a first one, a second one or a third one of the three client terminals.

Upon logging-in from the client terminal 205, the previous log-in information providing server 231 can recognize which user has logged in from which client terminal 205, by reading the ID information file symbol 262 and the terminal ID symbol 263 both stored in the client terminal 205.

Instead of the ID information file symbol 262, the user ID (or the log-in account that is used at the time of logging-in) may also be registered in the ID information file 224. However, it is preferable to employ the ID information file symbol 262 rather than the user ID from the viewpoint of improving security.

Stated otherwise, since the ID information file 224 is left in the client terminal 205, there is a possibility that the ID information file 224 may be fraudulently read by a third person. To prevent unauthorized access based on such fraudulent reading, a value differing from the user ID is employed as the ID information file symbol 262.

Thus, even if the ID information file symbol 262 is read by a third person, the third person cannot log in to the bank system 207 using the read value.

Figure 29B:
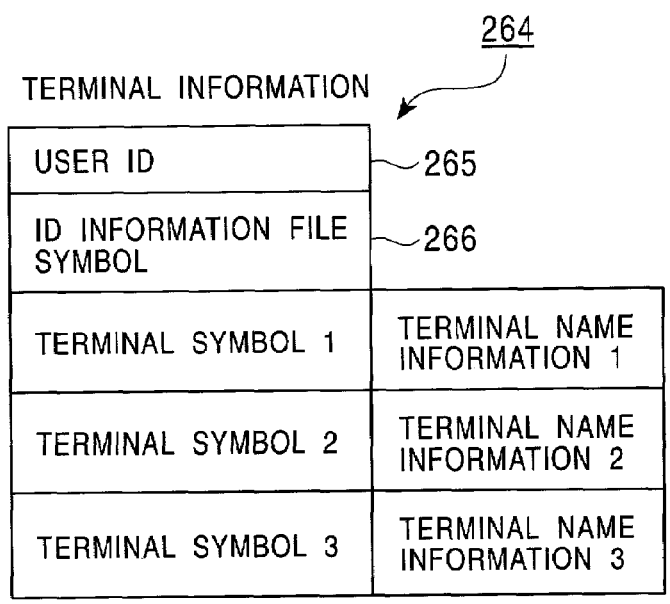
FIG. 29B shows a configuration of terminal information.

FIG. 29B shows a configuration of the terminal information 264. The terminal information 264 is stored in a terminal information database 242 prepared in the previous log-in information providing server 231.

The terminal information 264 is made up of a user ID 265, an ID information file symbol 266, terminal ID symbols 1, 2 and 3, and terminal name information 1, 2 and 3. The user ID 265 may be replaced by another user ID symbol so long as user identification can be made using it.

The terminal information 264 is prepared for each user. When the user has a plurality of accounts, the terminal information 264 is prepared for each account. In that case, a user ID is also issued for each account.

Allocation of user IDS is not limited to the embodiment in which a user ID is issued for each account. For example, one user ID may be used to log in to a plurality of accounts. In such a case, when the user logs in to one of a plurality of accounts, an extension corresponding to each account is added to the user ID, and the terminal information 264 is formed using the user ID added with the extension.

The ID information file symbol 266 is a value set in a one-to-one correspondent relation to the user ID 265 and is similar to the ID information file symbol 262 of the ID information file 224.

The previous log-in information providing server 231 can acquire the user ID 265 of the user, who has logged in to the account, by searching for the ID information file symbol 266 of the terminal information 264 using the ID information file symbol 266 that has been acquired from the client terminal 205.

The terminal ID symbols 1, 2 and 3 are each terminal number information for discriminating which one of three client terminals 205 set by the user corresponds to the relevant client terminal 205.

Each item of the terminal name information 1, 2 and 3 represents the name set and stored when the user has registered the corresponding client terminal 205. The name is arbitrarily selected and registered by the user to recognize each client terminals 205; for example, "first unit—at home" and "notebook PC (in company)".

The previous log-in information providing server 231 can search for the terminal name information (name put by the user) from the terminal ID symbol (indicating which one of the three client terminals) of the terminal information 264.

Figure 29C:
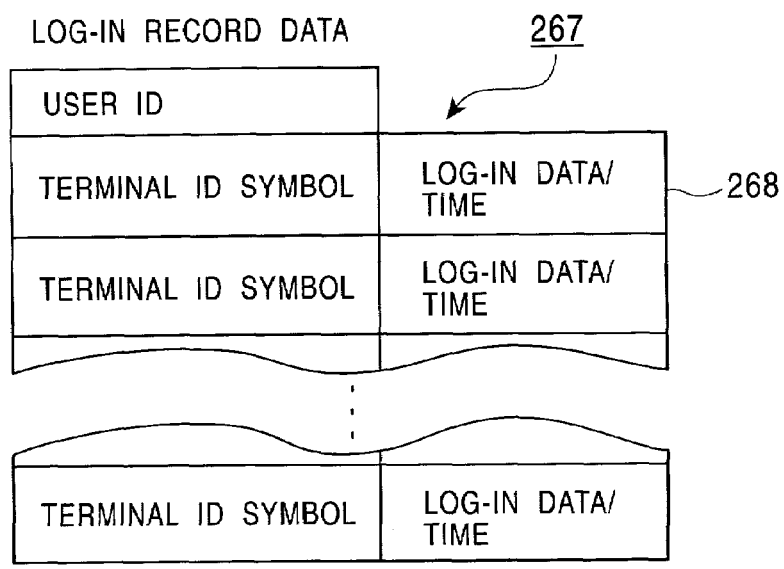
FIG. 29C shows a configuration of log-in records.

FIG. 29C shows a configuration of the log-in record data 267. The log-in record data 267 is stored as the log-in record database 243 in the previous log-in information providing server 231.

The log-in record data 267 is constituted by a set of the user ID, the terminal ID symbol of the client terminal 205 used in each log-in, and the date/time of the log-in. Such a set may be added with information of service provided to the user, e.g., "balance inquiry".

The previous log-in information providing server 231 can determine the date/time of the previous log-in from the user and the client terminal 205 used in the previous log-in by referring to the log-in record data. Further, by checking, based on the terminal information 264, the terminal ID symbol determined from the log-in record data 267, the previous log-in information providing server 231 can acquire the name put by the user on the client terminal 205 used in the previous log-in.

Figure 30:
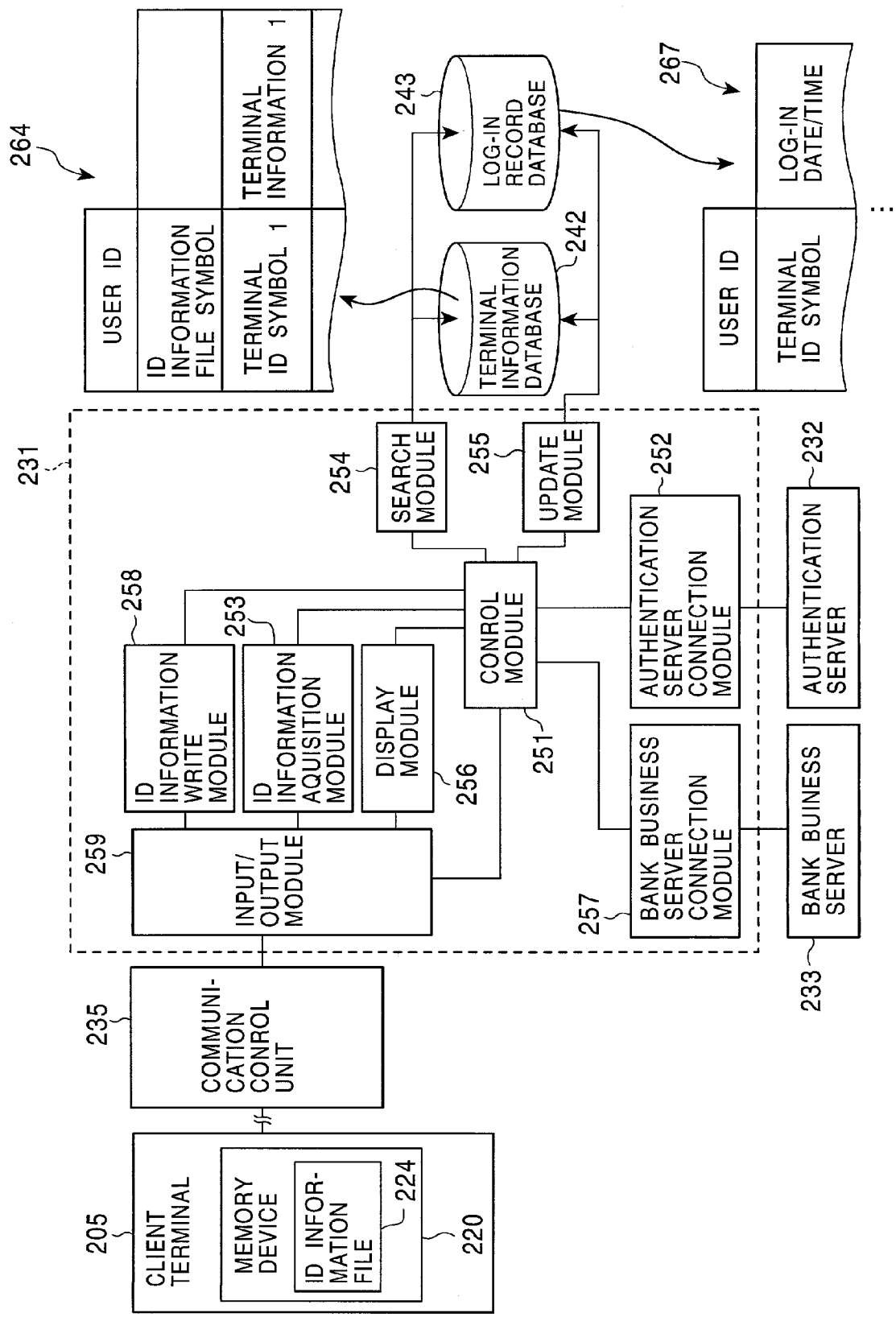
FIG. 30 is a block diagram showing one example of configuration of a previous log-in information providing program.

FIG. 30 is a block diagram showing one example of configuration of modules realized by the previous log-in information providing program 241. Those modules are realized in a software manner with the previous log-in information providing program 241 loaded in the RAM of the control unit 234 (FIG. 28). Those modules cooperate with the hardware, including the CPU, so as to develop the predetermined functions.

A control module 251 is one for controlling and adjusting operations of the other various modules. The control module 251 analyzes signal obtained from the various modules and allocates predetermined processes to the other modules depending on analyzed results.

An input/output module 259 is one for providing an interface of the communication control device 235 with respect to the control module 251, a display module 256, an ID information acquiring module 253, and an ID information write module 258.

The display module 256 displays a log-in screen, a previous log-in information display screen, a client terminal registration screen, etc. on the display 217 of the client terminal 205 via the Internet 206.

The log-in screen is a screen formed such that each user is able to enter, for example, a user ID and a password on it. The log-in screen is displayed on the display 217 of the client terminal 205 when the user logs in to the bank system 207 for the first time.

The previous log-in information display screen is a screen on which the date/time of the previous log-in from the client terminal 205 and the name of the client terminal 205 used in the previous log-in whenever the user logs in to the bank system 207. Details of the previous log-in information display screen will be described later.

The client terminal registration screen is a screen displayed when the user registers the client terminal 205 to be used in linkage with the bank system 207. Details of the client terminal registration screen will be described later.

More specifically, those screens are each defined as a file in the HTML format, and the display module 256 transmits the file to the client terminal 205.

By using the browser 223, the client terminal 205 can display the screen, which is defined by the corresponding file in the HTML format, on the display 217.

An authentication-server connection module 252 is a module for providing an interface between the authentication server 232 and the previous log-in information providing server 231.

When each user enters a user ID and a password on the log-in screen and transmits them to the bank system 207, the user ID and the password are sent to the authentication server 232 via the input/output module 259, the control module 251 and the authentication-server connection module 252 for user authentication.

The authentication server 232 checks whether the entered user ID and password are matched with ones stored in the database beforehand, and then determines whether the entered user ID and the password are registered ones. A determination result is transmitted to the control module 251 via the authentication-server connection module 252.

When the control module 251 receives, from the authentication server 232, a determination result indicating that the entered user ID and the password are not registered ones, it rejects the log-in from the client terminal 205. When a determination result indicates that the entered user ID and the password are registered ones, the control module 251 continues to process subsequent procedures.

The ID information acquiring module 253 is a module for searching the memory device 220 of the client terminal 205 after the user authentication to check the presence or absence of the ID information file 224. Then, if the ID information file 224 is present, the ID information acquiring module 253 acquires the ID information file symbol 262 and the terminal ID symbol 263 (FIG. 29A) both recorded in the ID information file 224.

The ID information acquiring module 253 transmits, to the control module 251, a signal indicating the presence or absence of the ID information file 224. Then, if the ID information file 224 is present, the ID information acquiring module 253 transfers, to the control module 251, the ID information file symbol 262 and the terminal ID symbol 263 both acquired from the ID information file 224.

Upon receiving a signal indicating the absence of the ID information file 224 (i.e., when the client terminal 205 employed by the user is not yet registered), the control module 251 instructs the display module 256 to display the client terminal registration screen on the display 217 of the client terminal 205. Thus, the ID information providing server 231 notifies the user of the fact that the client terminal 205 is not yet registered, and prompts the user to register the client terminal 205. By entering any desired name on the client terminal registration screen, the user can put the name to the client terminal 205. After that, the previous log-in information of the client terminal 205 is presented to the user using the registered name.

The data entered by the user on the client terminal registration screen is sent to the control module 251 via the input/output module 259.

The control module 251 determines, based on the terminal information 264 in the terminal information database 242, which one of three registerable client terminals corresponds to the client terminal 205 newly registered by the user (for example, if it is confirmed from the terminal information 264 that the user has already registered two client terminals, the newly registered client terminal 205 is the third one), and then creates the terminal ID symbol 262. Further, the control module 251 searches for and acquires, based on the user ID acquired upon logging-in from the user, the terminal ID symbol 263 corresponding to that user ID from the terminal information database 242.

The ID information write module 258 acquires both the terminal ID symbol 262 and the terminal ID symbol 263 from the control module 251, and creates the ID information file 224.

Then, the ID information write module 258 writes the created ID information file 224 in the memory device 220 of the client terminal 205.

A cookie is used for writing of the ID information file 224. The cookie is a mechanism for storing user ID information in a user's computer so that a WWW server can identify each user.

A search module 254 is a module for searching the terminal information database 242 and the log-in record database 243.

The search module 254 receives, from the control module 251, both the ID information file symbol 262 and the terminal ID symbol 263 that have been acquired by the ID information acquiring module 253, and searches the terminal information database 242.

Further, the search module 254 determines the user ID from the searched terminal information 264 and searches the log-in record database 243 using the determined user ID. Then, the search module 254 acquires the log-in record data 267 of the relevant user from the log-in record database 243 and transfers, to the control module 251, the log-in record data corresponding to the past four log-ins, for example.

The control module 251 transfers the received log-in record data to the display module 256. By using that log-in record data, the display module 256 creates the previous log-in information screen and displays it on the display 217 of the client terminal 205.

In the case of displaying only the record regarding the last access on the client terminal 205, only the previous log-in record data is transferred to the control module 251.

In this embodiment, since it is assumed to display the log-in record data corresponding to the past four log-ins, the log-in record data corresponding to the past four log-ins is transferred to the control module 251.

An update module 255 is one for updating the terminal information database 242 and the log-in record database 243.

When the client terminal 205 employed by the user for accessing the bank system 207 is a registered one, the update module 255 acquires the ID information file symbol 262 and the terminal ID symbol 263 (both transmitted to the control module 251 from the ID information acquiring module 253) from the control module 251.

Further, the update module 255 searches the terminal information database 242 using the ID information file symbol 262 acquired from the control module 251, thereby acquiring the terminal information 264. Then, the update module 255 determines the user ID from the searched terminal information 264, Subsequently, the update module 255 updates the log-in record data 267 using the determined user ID and the terminal ID symbol 263 acquired from the control module 251.

When the client terminal 205 employed by the user for accessing the bank system 207 is not a registered one, the update module 255 acquires, from the control module 251, the user ID entered by the user upon logging-in, the terminal ID symbol 263 determined from the user ID, and the name of the client terminal 205 entered by the user. Then, the update module 255 updates the terminal information 264, and further updates the log-in record data 267.

Additionally, the update module 255 can also receive information regarding processes (such as balance inquiry and transfer) made on the user's account by the banking business server 233, and add the received information to the log-in record data 267.

A banking-business-server connection module 257 provides an interface for connection between the banking business server 233 and the previous log-in information providing server 231. After presenting the previous log-in information display screen to the user, the control module 251 establishes connection to the client terminal 205 and the banking business server 233 via the banking-business-server connection module 257. After that, the user can utilize various serviced provided by the banking business server 233.

FIG. 31 shows a previous log-in information display screen 271 displayed by the display module 256 on the display 217 of the client terminal 205.

The previous log-in information display screen 271 has a usage information column 272 and a recent transaction column 273.

The usage information column 272 displays the previous log-in information including the date/time of the previous log-in and the name of the client terminal 205 employed in the previous log-in.

The displayed previous log-in information is created from the log-in record data 267 that has been searched for by the search module 254 from the log-in record database 243.

The recent transaction column 273 displays records of transactions made on the user's account with log-ins preceding the last log-in. Those records are displayed by acquiring the past transaction records from the database in the banking business server 233. More specifically, the displayed contents include the transaction date, the transaction item, the client terminal 205 employed in the transaction, the channel employed, etc. The channel means a route employed by the user when accessing the user's account. For example, when the Internet is employed as the route, the channel is denoted by "WEB", and when an ATM is employed as the route, the channel is denoted by "ATM".

Alternatively, the log-in record data 267 may be modified so as to record the transaction item so that the transaction item is also displayed by the display module 256.

A confirmation button 274 is displayed at the bottom of the previous log-in information display screen 271. Upon the user clicking the confirmation button 274, the control module 251 initiates operation of the banking-business-server connection module 257 to establish connection between the banking business server 233 and the client terminal 205.

FIG. 32 shows a client terminal registration screen 291.

This client terminal registration screen 291 is displayed by the display module 256 on the display 217 of the client terminal 205. More specifically, screen data created as a file in the HTML format by the display module 256 is downloaded to the client terminal 205, and then displayed on the display 217 with the browser 223.

The client terminal registration screen 291 is displayed by the display module 256 when the client terminal 205 employed by the user for connection to the bank system 207 is not a registered one (i.e., when the ID information file 224 cannot be found in the memory device 220 of the client terminal 205 by the ID information acquiring module 253).

The client terminal registration screen 291 has a registered-PC column 292 and a registration column 293. The registered-PC column 292 displays the contents recorded in the terminal information 264 that has been searched for by the search module 254 from the terminal information database 242.

In other words, those contents are displayed by acquiring the terminal number information (information indicating which one of the registerable client terminals corresponds to the relevant client terminal) from the terminal ID symbol 263 of the terminal information 264, and acquiring the name of the client terminal 205, which has been put by the user, from the terminal name information.

The registration column 293 is a column in which the name of the client terminal 205 to be newly registered at this time is entered. When the user enters any desired name and clicks a register button 295, the entered name is sent to the control module 251. The control module 251 creates terminal information from the entered name and sends the created terminal information to the update module 255 along with a terminal ID symbol. Then, the update module 255 updates the terminal information database 242 in accordance with the terminal ID symbol and the terminal information. When ceasing the registration, the user depresses a cancel button 294 before clicking the register button 295.

FIG. 33 is a flowchart for explaining operation of the previous log-in information providing server 231.

First, when a user logs in to the bank system 207 from the client terminal 205, the display module 256 displays the log-in screen on the display 217 of the client terminal 205.

Then, when the user enters a user ID and a password on the log-in screen, the control module 251 acquires the log-in information (user ID and password) and sends it to the authentication server 232 via the authentication-server connection module 252 (step 410).

If the user is not successfully authenticated by the authentication server 232 (N in step 420), the control module 251 rejects the log-in from the client terminal 205 (step 430).

If the user is successfully authenticated (Y in step 420), the ID information acquiring module 253 searches for the ID information file 224 in the memory device 220 of the client terminal 205 (step 440).

If the ID information file 224 is present in the memory device 220 (Y in step 440), the ID information acquiring module 253 reads the ID information file 224 and acquires both the ID information file symbol 262 and the terminal ID symbol 263 (step 450).

Then, the search module 254 searches for the log-in record data 267 in the log-in record database 243 using both the ID information file symbol 262 and the terminal ID symbol 263 (step 460).

If the log-in record data 267 is present (Y in step 500), log-in records corresponding to the past several log-ins, which are obtained from the log-in record data 267, are transferred from the search module 254 to the display module 256 via the control module 251. The display module 256 generates the previous log-in information display screen 271 using the obtained log-in records and displays them on the display 217 of the client terminal 205 (step 510).

If the log-in record data 267 is not present (N in step 500), or after the previous log-in information display screen 271 has been displayed in step 110, the update module 255 records the terminal ID symbol and the log-in data/time in the log-in record database 243, thereby updating it (step 520).

Also, if the ID information file 224 is not present in the memory device 220 in step 440 (N in step 440), the display module 256 displays the client terminal registration screen 291 on the display 217 of the client terminal 205 (step 470).

The control module 251 acquires terminal name information, etc. entered by the user from the client terminal 205 and transfers the acquired terminal information, to the update module 255. The update module 255 updates the terminal information database 242 in accordance with the acquired terminal information (step 480).

Then, the control module 251 instructs the search module 254 to search for the terminal ID symbol corresponding to the terminal information just updated, thereby acquiring the corresponding terminal ID symbol, and writes the ID information file 224 in the memory device 220 of the client terminal 205 using the acquired terminal ID symbol.

This eighth embodiment can provide advantages given below.

Where a user sets a plurality of client terminals 205 for his or her bank account, the user can easily know the date/time of the past accesses and the client terminal 205 employed in each access from the previous log-in information display screen 271. Accordingly, even if a third person fraudulently accesses the user's access in the disguise of the genuine user, it is possible to discover such fraudulent access with ease.

Also, where a plurality of client terminals 205 are assigned to one account, the user can put, for each of the client terminals, a name that is easily understandable to the user oneself.

When a user is going to newly register the client terminal 205, the user can easily register the client terminal 205 on the client terminal registration screen 291.

Since the number of settable client terminals 205 is limited to three or less, it is possible to suppress a reduction in security which occurs as the number of client terminals 205 settable for each account increases.

By employing a cookie, the ID information file 224 can be easily written in the client terminal 205.

Further, by employing the ID information file symbol 262, which is in a one-to-one relation to the user ID, in the ID information file 224, a user ID and a password are not needed to remain in the client terminal 205 and hence a security effect can be improved.

The construction and operation of the eighth embodiment have been described above, but the present invention is not limited to that embodiment and may be modified in various forms without departing from the scope of the invention defined in claims.

For example, while an account has been described as a bank account in the eighth embodiment, the present invention is not limited to application to a bank account. The present invention is also applicable to any other suitable account, e.g., a stock transaction account opened in a stock company.

Furthermore, even when a third person logs in to a membership site using a membership number in the disguise of some genuine member, it is possible to easily discover unauthorized access.

While the ID information file 224 is left in the client terminal 205 using a cookie in the eighth embodiment, the ID information file 224 may be left in the client terminal 205 using any other suitable means.

Additionally, the log-in screen, the previous log-in information display screen 271, and the client terminal registration screen 291 may be created using any other suitable language than HTML.

Ninth Embodiment

A ninth embodiment of the present invention will be described below with reference to FIGS. 34 and 37. Communicating connection between a bank server 5 and a client terminal 7 via a network is the same as that shown in FIG. 1. Hardware configurations of the client terminal 7 and the bank server 5 are the same as those shown in FIGS. 2 and 3, respectively.

Figure 34:
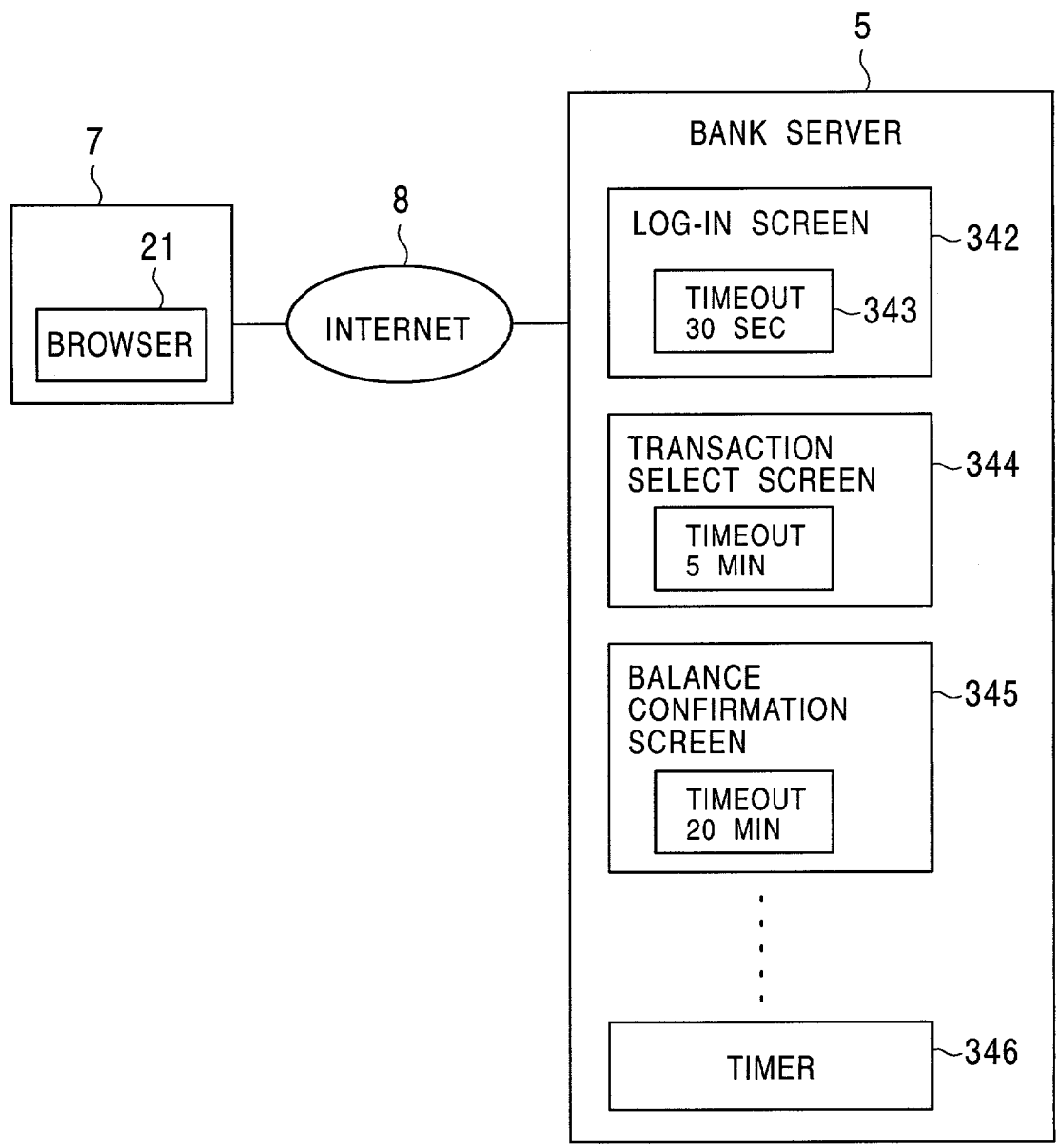
FIG. 34 is a block diagram for explaining the functions of various screen data stored in the bank server.

FIG. 34 is a block diagram for explaining the functions of various screen data stored in the bank server 5.

The bank server 5 includes plural sets of log-in screen data 342, a transaction select screen data 344, balance confirmation screen data 345, etc. Those sets of screen data are described using HTML, for example, and contained in business service software 38 (see FIG. 3) that is installed in the bank server 5.

The bank server 5 selects appropriate screen data in response to a request from each user. For example, e.g., the log-in screen data 342 is selected when the user logs in to the bank server 5, and the balance confirmation screen data 345 is selected when the user confirms the deposit balance. Then, the bank server 5 transmits the selected screen data to the client terminal 7.

More specifically, upon receiving access from the client terminal 7, the bank server 5 selects screen data (HTML file) corresponding to the access and downloads the selected screen data to the client terminal 7.

The client terminal 7 displays the screen data transmitted from the bank server 5 on a display 20 (see FIG. 2) using a browser 21.

A timeout program is written in each set of screen data. The timeout program is described using a computer language called JAVA, for example.

In other words, source code of a timeout program described using JAVA, for example, is built in a HTML-formant file transmitted from the bank server 5 to the client terminal 7. When the HTML-formant file is downloaded to the client terminal 7, the client terminal 7 displays a screen defined by the HTML-formant file on the display 20, and executes the timeout program to start counting of time for display of the relevant screen. When a predetermined time has lapsed, the client terminal 7 erases the relevant screen in accordance with the timeout program. Incidentally, the timeout program cooperates with the browser.

Further, after erasing the screen, the client terminal 7 sends a signal instructing the bank server 5 to log out that client terminal in accordance with the timeout program. Responsive to the signal, the bank server 5 forcibly logs out the client terminal 7 and cuts off the relevant line connection.

In other words, when screen data for, e.g., a balance confirmation screen or a transfer screen, is downloaded from the bank server 5 to the client terminal 7, the timeout program built in the downloaded screen data is executed in the client terminal 7. Upon the lapse of a predetermined time, the screen displayed on the display 20 is erased.

For example, a timeout program 343 built in the log-in screen data 342 is set so as to erase the log-in screen from the client terminal 7 upon the lapse of 30 seconds.

The log-in screen is a screen on which highly secret information, such as a log-in account and a password, is entered, and which requires a relatively short time for entry of necessary data. Therefore, a period of time until the screen is erased (referred to as a "timeout period" hereinafter) is set to a relatively short period.

As other examples, a timeout period of a transaction select screen is set to 5 minutes, and a timeout period of a balance confirmation screen is set to 20 minutes.

Thus, a timeout period in match with a time required for a user to enter necessary data can be set for each kind of screen.

To avoid the screen from being erased without any advance notice while the user is operating the client terminal 7, the timeout program has the function of displaying an alarm window on the display 20 before erasing of the screen (e.g., 10 seconds before the erasing).

An alarm window is displayed as follows.

First, when the screen is displayed on the client terminal 7, the CPU 11 (see FIG. 2) starts counting of time in accordance with the timeout program. Then, when reaching the time 10 seconds before the scheduled time out, the CPU 11 transmits an alarm window display signal to the bank server 5 in accordance with the timeout program.

Upon receiving the alarm window display signal from the client terminal 7, the bank server 5 transmits, to the client terminal 7, a signal for displaying the alarm window on the display 20 of the client terminal 7.

The client terminal 7 receives the above signal and displays the alarm window on the display 20.

As an alternative, a program for displaying the alarm window on the display 20 when reaching the time 10 seconds before the scheduled time out may be built in the timeout program itself so that the alarm window is displayed with the function of the built-in program.

With display of the alarm window, the user is able to recognize that the timeout is coming closer. Further, the alarm window has a button for prolonging the timeout period. Upon the user clicking that button, the timeout program prolongs the timeout period, i.e., the time at which the screen is erased.

On the other hand, the bank server 5 has a timer 346 that start counting of time at the same time as the logging-in from the client terminal 7.

Counting of time is reset to 0 whenever there occurs access from the client terminal 7.

When the counted time reaches a predetermined value (e.g., 1 hour), the timer 346 instructs the CPU to forcibly log out the client terminal 7 and cut off the line connection.

The reason why the timer 346 is provided in spite of the timeout program, built in the screen data, having the function of cutting off the line connection after the lapse of a predetermined time is as follows. For example, even if communication with the client terminal 7 is disabled because of power-down occurred in, e.g., the client terminal 7 or a provider connected to the client terminal 7, the bank server cannot recognize such an event. The provision of the timer 346 enables the client terminal 7 to be logged out promptly in such a case.

A description is now made of a change in contents displayed on the client terminal 7 upon the lapse of the timeout period with reference to FIGS. 35 and 36.

FIG. 35 shows a transferee registration confirming screen 355.

The transferee registration confirming screen 355 is formed by displaying, on the display 20 of the client terminal 7, transferee registration confirming screen data stored in the bank server 5.

Transferee registration confirming screen 355 is made up of various columns.

A registration number column 356 represents a serial number allocated to each of transferees registered by each user. A name-of-transferee-bank column 357 represents a name of a transferee bank. A branch name column 358 represents a branch name of the transferee bank. A deposit type column 359 represents a deposit type of a transferee's account. An account number column 360 represents an account number of the transferee's account. A receiver name column 361 represents a name of a receiver. A transferer name column 362 represents a name of a transferer. A phone number column 363 represents a phone number of the transferer.

When the user clicks a confirmation button 364 after confirming data displayed in those columns, the data is made firm and registered in the bank server 5.

FIG. 36 shows an alarm window 371.

The alarm window 371 is displayed by the bank server 5 when the timeout program cooperating with the browser 21 in the client terminal 7 transmits the alarm window display signal to the bank server 5 before the lapse of the timeout period.

The alarm window 371 has a confirmation button 372 and a cancel button 373. Upon the confirmation button 372 being clicked by the user, the bank server 5 logs out the client terminal 7 and cuts off the line connection.

When the cancel button 373 is clicked, the display time of the transferee registration confirming screen 355 is prolonged for a predetermined time, and the client terminal 7 is maintained in the log-in condition.

Figure 37:
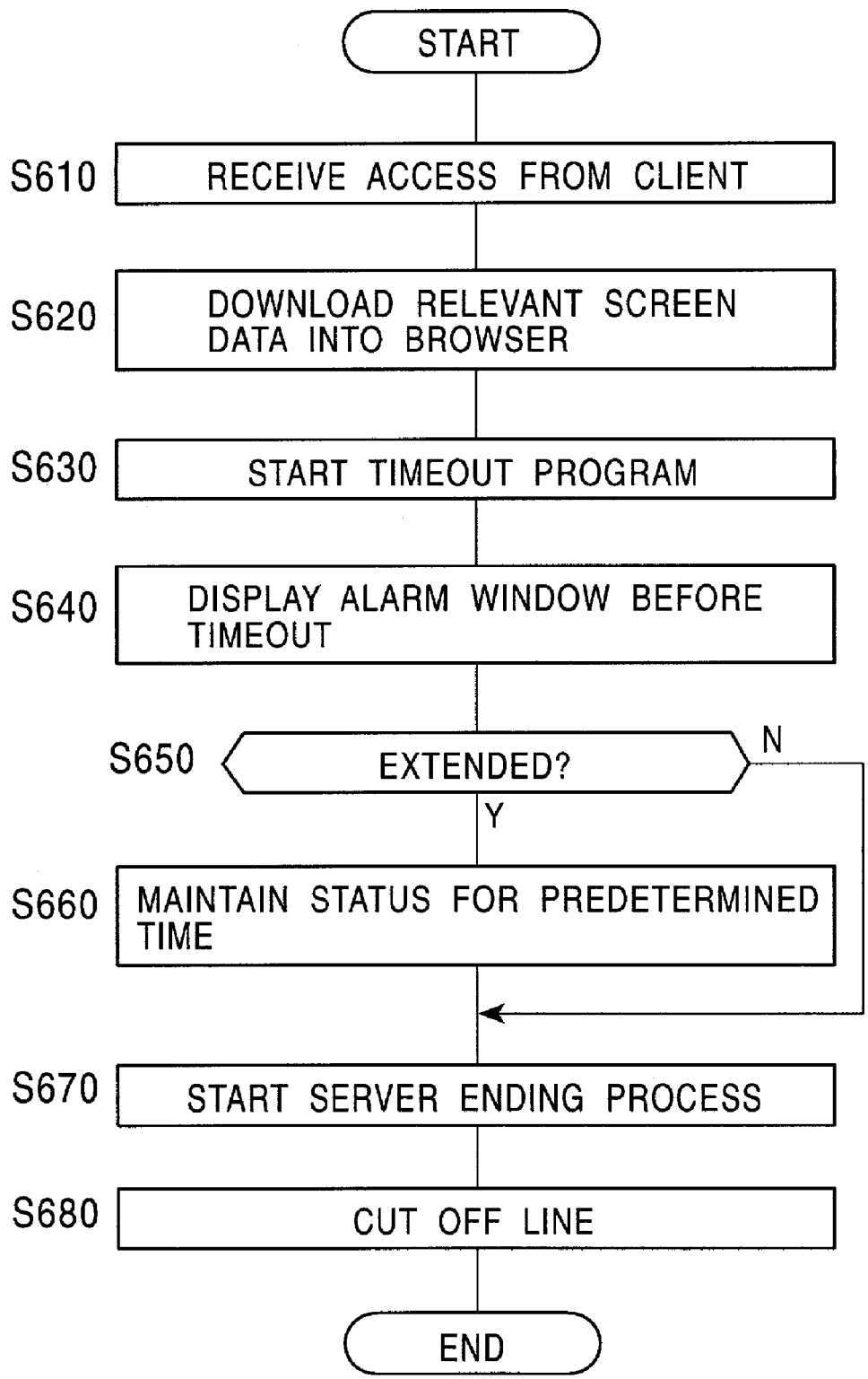
FIG. 37 is a flowchart for explaining operation of a timeout program.

FIG. 37 is a flowchart for explaining operation of the timeout program.

It is here assumed that the client terminal 7 has already logged in to the bank server 5.

First, the bank server 5 receives access from the client terminal 7 (step 610), and downloads screen data corresponding to the access to the client terminal 7 (step 620).

Then, the timeout program downloaded to the client terminal 7 along with the screen data is initiated and starts counting of time after the screen data has been downloaded to the client terminal 7 (step 630).

When reaching the time 10 seconds before the lapse of the timeout period, the timeout program transmits the alarm window display signal to the bank server 5. Upon receiving the alarm window display signal, the bank server 5 displays the alarm window 371 on the display 20 of the client terminal 7 (step 640).

If the user clicks the cancel button 373 and selects extension of the screen display time (Y in step 650), the timeout program prolongs the timeout period for a predetermined time and holds the client terminal 7 to remain in the same state (step 660).

After the lapse of the prolonged timeout period, or if the user clicks the confirmation button 372 and does not select extension of the display time (N in step 650), the timeout program transmits a signal indicating the end of log-in to the bank server 5, whereupon the bank server 5 enters an ending process. Then, the timeout program erases the contents displayed on the display 20 (step 670). The bank server 5 logs out the client terminal 7 and cuts off the line connection between the client terminal 7 and the bank server 5.

When another screen data is downloaded to the client terminal 7 before the timeout, the timeout program built in another screen data is newly initiated, and the timeout program having operated so far before the downloading of another timeout program is erased.

The ninth embodiment described above can provide advantages given below.

The timeout period can be set for each of screens displayed on the client terminal 7. Therefore, the display time of a screen, e.g., the log-in screen, which requires a relatively short time for entry of necessary data and on which highly secret information is entered, can be set to a relatively short time.

Also, after the lapse of the timeout period, the screen displayed on the client terminal 7 can be erased, and the connection between the client terminal 7 and the bank server 5 can be cut off.

Further, before the lapse of the timeout period, the alarm window 371 can be displayed on the client terminal 7 so that the user is able to select whether the timeout period is prolonged or not.

When the user selects extension of the timeout period on the alarm window 371, the connection state between the client terminal 7 and the bank server 5 can be prolonged for a predetermined time.

Moreover, since the display time of each screen displayed on the client terminal 7 is limited to a certain time, it is possible to reduce a risk that the displayed contents are furtively watched by a third person.

In addition, since the line connection between the client terminal 7 and the bank server 5 is cut off after the lapse of the timeout period, a risk of unauthorized access by a third person can be reduced, for example, even when the user moves away from the client terminal 7 during the operation.

The construction and processing operation of the ninth embodiment have been described above, but the present invention is not limited to that embodiment and may be modified in various forms without departing from the scope of the invention defined in claims.

For example, the bank server 5 is not limited to a server for banking business, but may be constituted as, e.g., a stock trading server.

Recently, a customer of stock companies has become able to access a stock trading server in the stock company from a PC at home via the Internet, and to make purchasing/selling of stocks. In such a case, by setting a timeout period for each of various transaction screens displayed on the customer's PC, the display time of each screen can be limited as appropriate. It is hence possible to reduce a risk that items entered in the stock trading server, such as a log-in account, password, stock transaction account, stock brand under transaction, and number of stocks, are furtively watched by a third person.

In the ninth embodiment, after the lapse of the timeout period set for each screen, the line connection between the client terminal 7 and the bank server 5 is cut off. However, the client terminal 7 may be simply logged out instead of cutting off the line connection. In that case, the user can log in to the bank server 5 again if the user wants to continue the procedures on the bank server 5.

Also, the procedure condition just prior to cutting-off of the line connection may be stored in the client terminal 7 using a cookie or the like before the line cut-off. This enables the procedure to be resumed from the condition just prior to the line cut-off by reading the cookie when the user logs in to the bank server 5 again.

Additionally, while the ninth embodiment is described as erasing the whole screen displayed on the display 20, the present invention is not limited to that processing. As an alternative, a part of the displayed contents, e.g., boxes containing items entered by the user and information to be kept secret, may be filled with a predetermined color, for example, so that the relevant data is not discernable.

Tenth Embodiment

A tenth embodiment is intended to automatically allocate a timeout period to each screen based on the number of items to be entered in the screen.

The tenth embodiment of the present invention will be described below in detail with reference to FIGS. 38 and 39.

Communicating connection between a bank server 5 and a client terminal 7 via a network is the same as that shown in FIG. 1. Hardware configurations of the client terminal 7 and the bank server 5 are the same as those shown in FIGS. 2 and 3, respectively.

Figure 38:
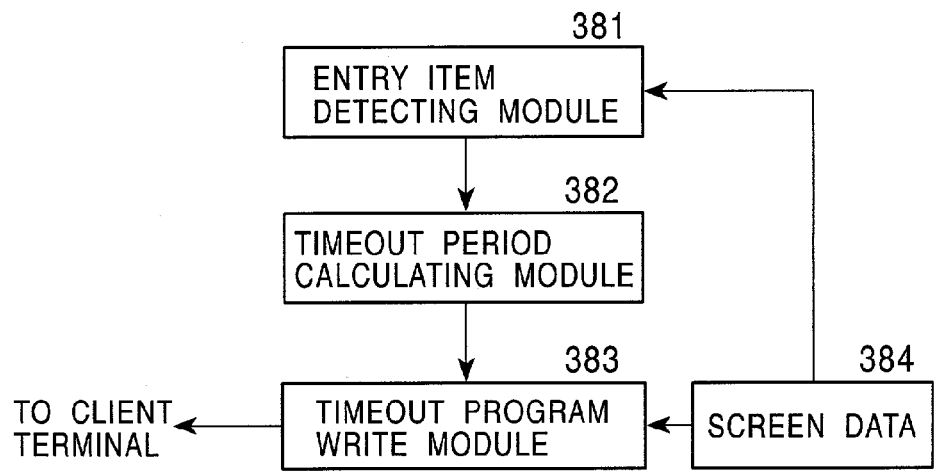
FIG. 38 is a block diagram showing various modules realized in the bank server according to a tenth embodiment.

FIG. 38 is a block diagram showing various modules realized in the bank server 5. Those modules are realized in a software manner with a business service software 38 (see FIG. 3).

Screen data 384 is balance confirmation screen data, transfer screen data, etc., and is transmitted to the client terminal 7 in response to access from the client terminal 7. A timeout program is not built in the transmitted screen data.

An entry item detecting module 381 acquires the number of entry items, an attribute of each entry item, etc. from the screen data transmitted to the client terminal 7.

The attribute of the entry item is given as information indicating, for example, whether the entry item is a log-in number entry column, an account number entry column, an address entry column, a click button, or a check box. As another example, the attribute of the entry item may also be given as information indicating a column in which only Chinese characters (Kanjis) are to be entered, a column in which only numerals are to be entered, or the number of characters to be entered.

A timeout period calculating module 382 acquires the number of entry items, an attribute of each entry item, etc. from the entry item detecting module 381, and calculates a timeout period to be set for the screen data 384 from the acquired data in accordance with a predetermined formula.

The predetermined formula can be defined in various ways. For example, the timeout period may be calculated by multiplying the number of entry items by a certain constant, or totalizing values weighted depending on respective attributes of the entry items over all the entry items.

A timeout program write module 383 writes a timeout program in the screen data 384 in accordance with the timeout period, which has been calculated by the timeout period calculating module 382, using a computer language such as JAVA.

The timeout program has the same function as that of the timeout program described above in connection with the ninth embodiment.

The timeout program is downloaded to the client terminal 7 along with the screen data.

As soon as a screen is displayed on the display 20 with a browser 21 (see FIG. 2) in the client terminal 7, the timeout program starts counting of time.

Then, when the lapse time reaches the time calculated by the timeout period calculating module 382, the timeout program erases the screen on the display 20, logs out the client terminal 7 from the bank server 5, and cuts off the line connection.

Further, an alarm window may be displayed before the lapse of the timeout period.

The tenth embodiment described above has the same construction as the first embodiment except that the timeout program is automatically created from entry items contained in the screen data 384.

Figure 39:
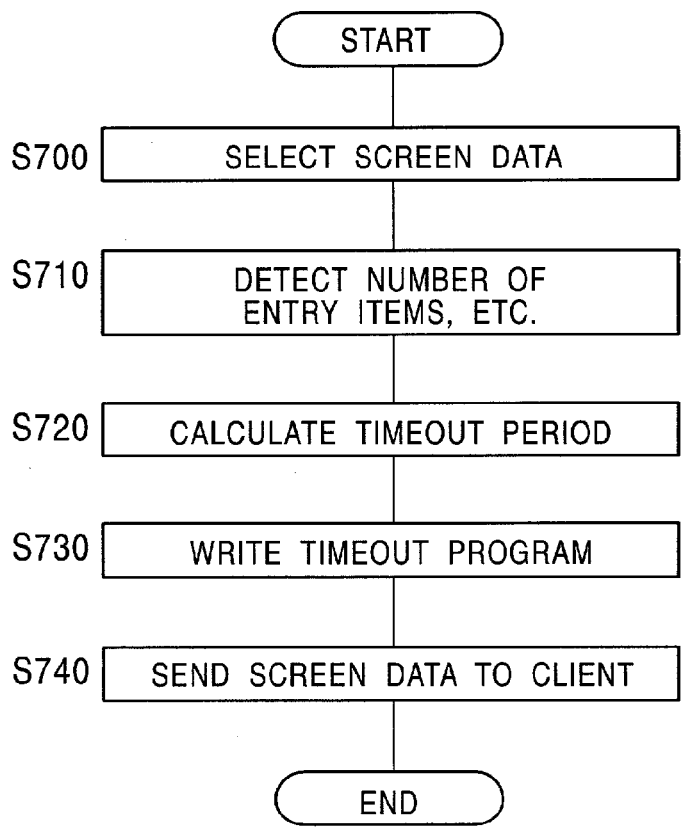
FIG. 39 is a flowchart for explaining operation of writing a timeout program in screen data by the bank server.

FIG. 39 is a flowchart for explaining operation of writing the timeout program in the screen data 384 by the bank server 5.

It is here assumed that a user has already logged in to the bank server 5.

First, responsive to access from the user, the bank server 5 selects screen data to be transmitted to the client terminal 7 (step 700).

Then, the entry item detecting module 381 checks the screen data 384 and acquires the number of entry items, an attribute of each entry item, etc. (step 710).

Subsequently, the timeout period calculating module 382 acquires the number of entry items, the attribute of each entry item, etc. from the entry item detecting module 381, and calculates a timeout period in accordance with a predetermined formula (step 720).

Then, the timeout program write module 383 acquires the calculated timeout period from the timeout period calculating module 382 and writes a timeout program in the screen data 384 (step 730). Thereafter, the timeout program write module 383 transmits, to the client terminal 7, the screen data 384 in which the timeout program has been written (step 740).

The tenth embodiment provides advantages given below.

Since the timeout period is automatically calculated for each screen, the user is no longer required to set the timeout period for each screen.

Also, since the timeout program is automatically written in the screen data 384, the need of writing the timeout program for each screen is eliminated in the process of forming the screen data. Therefore, when the screen data is changed due to, e.g., expansion or modification of banking business, it is only required to prepare the screen data. This results in the improved efficiency of work such as maintenance of the screen data.

Further, in the case of changing the timeout period for all sets of screen data, the calculation formula in the timeout period calculating module 382 is only required to modify, and there is no need of changing the timeout period for the all sets of screen data one by one. As a result, the work efficiency is improved.

Eleventh Embodiment

In an ATM (Automatic Teller Machine) installed in banks, a user sets a cash card and logs in to a bank system by entering a secret number. Then, it is general that if wrong secret numbers are entered three times, the relevant cash card is made no longer usable.

In view of the above situation, an eleventh embodiment is intended to count the number of times of reentry when a user enters input data repetitively in a predetermined entry column, and to erase a screen on the client terminal and cut off the line connection when the number of times of reentry reaches a predetermined value.

An eleventh embodiment of the present invention will be described below in detail with reference to FIGS. 40 and 41.

A network configuration comprising a client terminal 7 and a bank server 5 is the same as that shown in FIG. 1. Hardware configurations of the client terminal 7 and the bank server 5 are the same as those shown in FIGS. 2 and 3, respectively.

Figure 40:
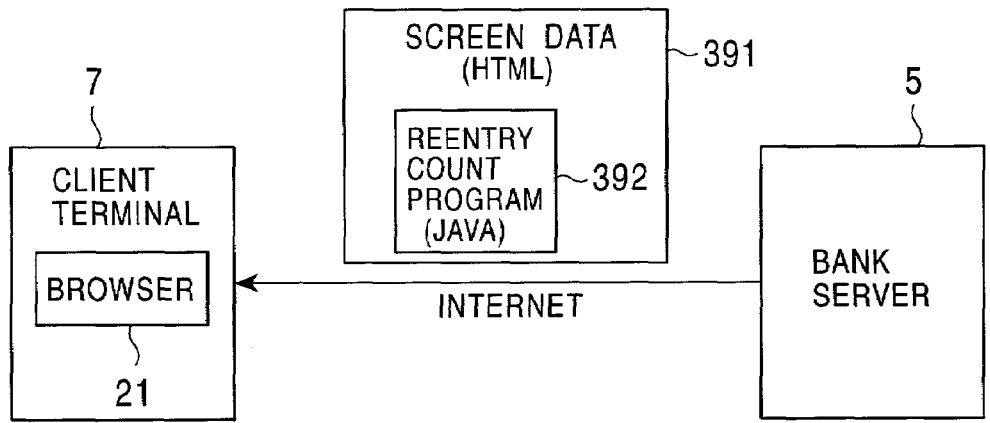
FIG. 40 is a block diagram for explaining a reentry counting program.

FIG. 40 is a block diagram for explaining a reentry counting program 392.

The bank server 5 transmits screen data 391 for each of various screens, such as a transfer screen and a balance confirmation screen, to the client terminal 7 for servicing banking business. In the eleventh embodiment, the reentry counting program 392 is built in the screen data 391.

The screen data 391 is given as a file in the HTML format, for example, and defines the transfer screen, the balance confirmation screen, etc. using HTML.

Upon receiving the screen data 391, the client terminal 7 displays a corresponding screen on a display 20 (see FIG. 2) with a browser 21. The displayed screen is defined using HTML.

The above-described mechanism is the same as that in the ninth or tenth embodiment.

The reentry counting program 392 described using a computer language, such as JAVA, is built in the screen data 391.

The reentry counting program 392 is downloaded from the bank server 5 to the client terminal 7 along with the screen data 391.

After being downloaded to the client terminal 7, the reentry counting program 392 cooperates with the browser 21 installed in the client terminal 7.

Subsequently, a user enters input data in an entry column of the displayed screen. On that occasion, if the user cancels the once entered data and enters input data again, the reentry counting program 392 counts the number of times of reentry for each entry item.

Then, when the number of times of reentry reaches a predetermined value (e.g., 3) that is set beforehand, the reentry counting program 392 erases the screen displayed on the client terminal 7, and sends a signal for requesting the bank server 5 to log out the client terminal 7. In response to the signal, the bank server 5 forcibly logs out the client terminal 7.

Figure 41:
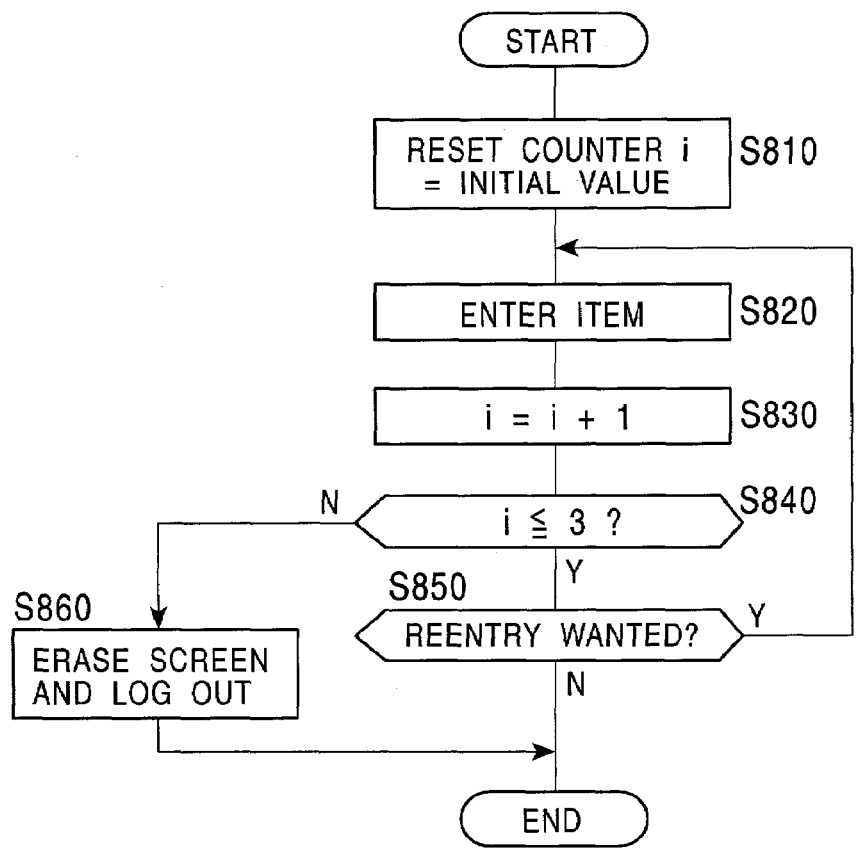
FIG. 41 is a flowchart for explaining operation of the reentry counting program.

FIG. 41 is a flowchart for explaining operation of the reentry counting program 392.

The reentry counting program 392 is executed by the CPU 11 (see FIG. 2) of the client terminal 7.

The reentry counting program 392 counts the number of times of reentry made by the user for each of items such as a log-in account and a transferee's account number. The flowchart of FIG. 41 shows the operation executed when the reentry counting program 392 counts the number of times of reentry made for one certain item.

It is here assumed that a user has already logged in to the bank server 5.

First, when the user puts a focus on one entry item in a screen displayed on the client terminal 7 (i.e., when the user moves a cursor to the relevant entry column for entering data in it), a counter's count i is reset to an initial value (i.e., 0 when the user enters data for the first time after display of the screen) (step 810). Note that the operation described here is executed in accordance with the reentry counting program 392 downloaded from the bank server 5 by the CPU 11 of the client terminal 7 along with the screen data 391.

Then, when the user finishes inputting of data in the entry item (the end of the inputting is determined by sensing that the user has moved the focus to another entry column or has depressed a return key on a keyboard) (step 820), the counter's count i is incremented by one (step 830).

Then, it is determined whether the counter's count i is not larger than 3 (step 840). If the counter's count i is not larger than 3 (Y in step 840), it is further determined whether the user corrects the input data of the entry item (step 850). That determination is made, for example, by sensing that the user makes deletion or addition from or to the input data once confirmed.

If the user wants reentry (Y in step 850), the CPU returns to step 820. Subsequently, the user enters data of the entry item again (step 820), and at the same time the counter's count i is incremented (step 830).

If the user does not want reentry (i.e., if the input data of the entry item has been confirmed)(N in step 850), the counting is ended. The counted number of times of reentry is held as long as the relevant screen is displayed. Then, when the user is going to enter data of the relevant entry item again after entering data of other entry items, the held counted number is employed as the initial value in step 810.

If the counted number of times of reentry is larger than 3 in step 840 (N in step 840), the CPU 11 erases the screen on the display 20 and requests a log-out to the bank server 5 (step 860). In response to the request, the bank server 5 forcibly logs out the client terminal 7 and then cuts off the line connection.

Thus, in step 810, the number of times of reentry so far made by the user is employed as the initial value. Accordingly, for example, when the user enters and confirms a log-in account on the log-in screen, enters and confirms a password, and thereafter returns to the log-in account to correct it, the number of times of reentry is given by adding one to the number of times at which the log-in account has been so far entered by the user.

With the above arrangement, therefore, when a person who has not definite memory about, e.g., the log-in account and the password, the display of the screen is erased and the line connection is cut off if wrong values are entered three times for each entry item.

While the eleventh embodiment has been described as limiting the number of times of reentry for all of the screens such as the log-in screen, the transfer screen and the balance confirmation screen, the present invention is not limited to such an arrangement. The number of times of reentry may be limited only for a particular screen, for example, the log-in screen.

Further, the screen data 391 may include not only the reentry counting program 392, but also the timeout program in the ninth or tenth embodiment. In that case, the functions erasing the screen and logging-out the client terminal 7 are effectuated in addition to the function of limiting the number of times of reentry.

Twelfth Embodiment

A twelfth embodiment is intended to enable the bank server 5 to set a time until cutting-off of the line connection for each of screens displayed on the client terminal 7.

A network configuration comprising a bank server 5 and a client terminal 7 is the same as that shown in FIG. 1. Hardware configurations of the client terminal 7 and the bank server 5 are the same as those shown in FIGS. 2 and 3, respectively.

Figure 42:
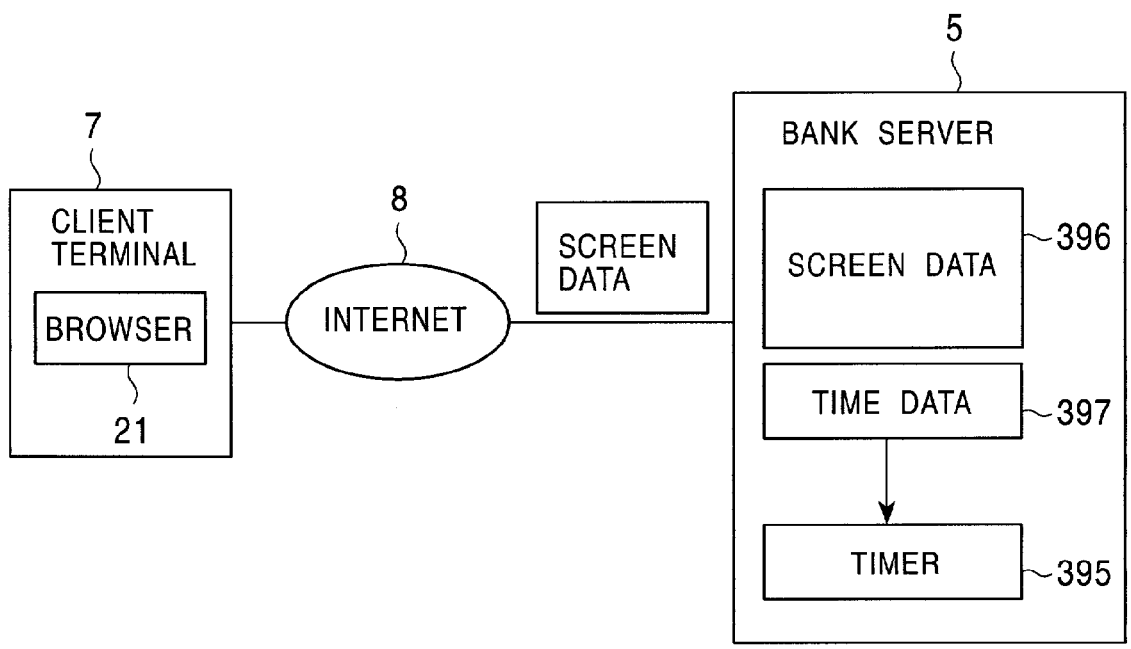
FIG. 42 is a block diagram for explaining a mechanism of the bank server according to a twelfth embodiment.

FIG. 42 is a block diagram for explaining a mechanism of the bank server 5.

The bank server 5 has screen data 396 to be displayed on the client terminal 7. While FIG. 42 shows one set of screen data, plural sets of screen data, such as log-in screen data, transfer screen data and balance confirmation screen data, are prepared in practice.

Time data 397 is associated with the screen data 396. The time data 397 is data specifying a period of time during which the client terminal 7 is maintained in the log-in condition after transmission of the screen data 396 to the client terminal 7.

When the screen data 396 is downloaded to the client terminal 7, the time data 397 is simultaneously transferred to a timer 395.

After the screen data 396 has been transmitted to the client terminal 7, the client terminal 7 is able to display a screen defined by the screen data 396 with a browser 21.

At the same time as when the screen data 396 is transmitted to the client terminal 7, the timer 395 receives the time data 397 and starts counting of time. Upon the lapse of the time specified by the time data 397, the client terminal 7 is forcibly logged out and the line connection is cut off.

When another screen data is transmitted to the client terminal 7 subsequent to the screen data 396 with access from the client terminal 7, time data associated with another screen data is transferred to the timer 395, whereupon the timer 395 newly starts counting of time.

With the construction described above, the bank server 5 can set, for each set of screen data, a period of time during which connection to the client terminal 7 is maintained. Therefore, security in banking transactions can be improved by setting a connection time for, e.g., the log-in screen, to a relatively short time.

Also, since the screen data 396 and the time data 397 are separate from each other, it is possible to manage the screen data and the time data, for example, by preparing a relational database based on a screen data table in which the screen data is collected and a time data table in which the time data is collected.

A program for erasing the screen on the client terminal 7 upon the lapse of a predetermined time may be built in the screen data 396.

In that case, the screen displayed on the client terminal 7 is erased by the program built in the screen data 396 upon the lapse of the predetermined time from the download of the screen data 396, whereas the line connection is cut off by the timer 395.

Further, in that case, since there is a time lag between the time at which the timer 395 starts counting of time and the time at which the program for erasing the screen on the client terminal 7 starts counting of time, the time counted by the timer 395 is set to be longer than the time set by the program. This setting prevents such a trouble that the line connection is cut off in spite of the user being logged on to the screen.

As described above, the present invention provides an Internet banking system which can present services more familiar to daily life of individual users, and a bank server apparatus, etc. which can limit available banking services depending on user attributes. Further, the present invention is able to reduce risks of information leak from a client terminal device to third persons and unauthorized accesses from third persons when servicing bank business via the Internet.

What is claimed is:

1. A server apparatus comprising:
means for transmitting, to a client terminal device, screen data for displaying a screen on a display of the client terminal device;
means for acquiring a number of entry items in a part of the screen and attributes of each one of the entry items;
means for calculating a predetermined time based on the number of the entry items and the attributes of each one of the entry items, wherein the attributes comprise at least one of a type of information to be entered into one of the entry items on the part of the screen, a type of data used to convey the information, and a type of element used to enter the information into one of the entry items on the part of the screen;
means for generating a first program using the predetermined time; and
means for adding the first program to the screen data,
wherein the first program causes the client terminal device to change the part of the screen into an indiscernible state when a predetermined condition is satisfied,
wherein the predetermined condition is satisfied when a lapse of the predetermined time occurs, and
wherein the lapse of the predetermined time occurs when an amount of time since the client terminal device receives the screen data exceeds the predetermined time.

2. The server apparatus according to claim 1, wherein the part of the screen comprises display of input information entered at the client terminal device and displayed on the display.

3. The server apparatus according to claim 2, wherein the screen data further comprises a second program for causing the client terminal device to execute a second method, the second method comprising:
acquiring, from a user, extension information indicating extension of the predetermined time; and
extending the predetermined time when the extension information is acquired.

4. The server apparatus according to claim 1, wherein the predetermined time is set for each set of screen data.

5. The server apparatus according to claim 1, wherein the screen data further comprises a second program for causing the client terminal device to display, on the display, alarm information indicating that the end of the predetermined time is coming closer, after a lapse of an alarm time and before the lapse of the predetermined time.

6. The server apparatus according to claim 1, further comprising:
means for receiving a signal indicating that the predetermined condition is satisfied from the client terminal device;
means for indicating that the predetermined condition is satisfied; and
means for cutting off line connection between the client terminal device and the server apparatus after receiving the signal indicating that the predetermined condition is satisfied.

7. The server apparatus according to claim 1, further comprising:
means for acquiring a connection time set for the screen data;
means for counting time lapsed from transmission of the screen data; and
means for cutting off a line connection between the client terminal device and the server apparatus when the time lapsed reaches the connection time.

8. The server apparatus according to claim 1,
wherein the attributes comprise the type of information, and
wherein the type of information is one of log-in information, account information, and address information.

9. The server apparatus according to claim 1,
wherein the attributes comprise the type of data used to convey the information, and
wherein the type of data used to convey the information is one of a foreign-language, characters, numerals, and a number of characters to be entered.

10. The server apparatus according to claim 1,
   wherein the attributes comprise the type of element used to enter the information, and
   wherein the type of element used to enter the information is one of an entry column, a click-button, and a check-box.

11. The server apparatus according to claim 1, wherein the calculating comprises multiplying the number of entry items by a constant.

12. The server apparatus according to claim 1, wherein the calculating comprises totalizing values weighted based on attributes of the entry items.

13. The server apparatus according to claim 1, wherein the predetermined condition is also satisfied when a number of times of reentry made into the entry items reaches a predetermined number.

\* \* \* \* \*